(12) United States Patent
Yasui et al.

(10) Patent No.: US 6,449,944 B1
(45) Date of Patent: *Sep. 17, 2002

(54) METHOD OF JUDGING DETERIORATION OF EMISSION GAS CONTROL CATALYST DEVICE

(75) Inventors: Yuji Yasui; Shusuke Akazaki; Yoshihisa Iwaki; Tadashi Satoh; Masaki Ueno, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/743,906

(22) PCT Filed: Jul. 5, 1999

(86) PCT No.: PCT/JP99/03621

§ 371 (c)(1),
(2), (4) Date: Jan. 17, 2001

(87) PCT Pub. No.: WO00/04282

PCT Pub. Date: Jan. 27, 2000

(30) Foreign Application Priority Data

Jul. 17, 1998 (JP) ............................................. 10/202579

(51) Int. Cl.[7] ................................................ F01N 3/00
(52) U.S. Cl. ............................ 60/277; 60/274; 60/276; 60/285
(58) Field of Search .......................... 60/274, 276, 277, 60/285; 73/118.1; 123/674; 701/103, 109

(56) References Cited

U.S. PATENT DOCUMENTS

| | | | | |
|---|---|---|---|---|
| 5,400,592 A | * | 3/1995 | Mukaihira et al. | 60/277 |
| 5,557,933 A | * | 9/1996 | Numata et al. | 60/277 |
| 5,673,555 A | * | 10/1997 | Achleitner | 60/277 |
| 5,675,967 A | * | 10/1997 | Ries-Mueller | 60/277 |
| 5,732,551 A | * | 3/1998 | Naber et al. | 60/277 |
| 5,845,490 A | * | 12/1998 | Yasui et al. | 60/276 |
| 6,073,073 A | * | 6/2000 | Kitamura et al. | 60/277 |
| 6,073,440 A | * | 6/2000 | Douta et al. | 60/277 |
| 6,151,888 A | * | 11/2000 | Schneider et al. | 60/277 |

FOREIGN PATENT DOCUMENTS

| | | |
|---|---|---|
| JP | A-6-17640 | 1/1994 |
| JP | A-262384 | 4/1997 |
| JP | A-9-228873 | 9/1997 |
| JP | A-10-61428 | 3/1998 |
| JP | A-10-205376 | 8/1998 |
| JP | A-10-274032 | 10/1998 |

* cited by examiner

Primary Examiner—Thomas Denion
Assistant Examiner—Tu M. Nguyen
(74) Attorney, Agent, or Firm—Arent Fox Kintner Plotkin & Kahn

(57) ABSTRACT

A first exhaust gas sensor 5 (air-fuel ratio sensor) and a second exhaust gas sensor 6 ($O_2$ sensor) are disposed respectively upstream and downstream of a catalytic converter. An exhaust system E which ranges from the exhaust gas sensor 5 to the exhaust gas sensor 6 and includes the catalytic converter 3 is regarded as an object exhaust system E, and a behavior of the object exhaust system E is modeled. When an internal combustion engine 1 is in operation, parameters to be set of the model of the object exhaust system E are sequentially identified based on the data of outputs of the exhaust gas sensors 5, 6. A deteriorated state of the catalytic converter 3 is determined based on the data of the identified values. Concurrent with the determination of the deteriorated state, a target air-fuel ratio for the internal combustion engine 1 is sequentially determined in order to converge the output of the exhaust gas sensor 5 to a given target value, and the air-fuel ratio of the internal combustion engine 1 is controlled to converge the output (the detected value of the air-fuel ratio) of the first exhaust gas sensor 5 to the target air-fuel ratio, for thereby allowing the catalytic converter 3 to achieve an optimum purifying capability. In this manner, the deteriorated state of the catalytic converter 3 can be determined in various operation states of the internal combustion engine 1 while keeping the purifying capability of the catalytic converter 3.

33 Claims, 21 Drawing Sheets

FIG. 20

STEP6

START

STEP6-1: CALCULATE ESTIMATED EXHAUST GAS FLOW RATE ab/SV

STEP6-a: DETERMINE WHETHER $\hat{a}1$, $\hat{a}2$, $\hat{b}1$ ARE APPROPRIATE OR NOT (SET f/pe)

STEP6-b: f/pe = 1 ? — NO → RETURN

YES

STEP6-2: ab/SV ∈ HIGH FLOW RATE ? — YES → STEP6-3

NO

STEP6-4: ab/SV ∈ MEDIUM FLOW RATE ? — NO → STEP6-6

YES

STEP6-5: CALCULATE DETERIORATION DECISION DATA A1/M, A2/M, B1/M

STEP6-3: CALCULATE DETERIORATION DECISION DATA A1/H, A2/H, B1/H

STEP6-6: DETERMINE TEMPORARY DETERIORATION LEVEL LV/A1 BASED ON A1/H, A1/M

STEP6-7: DETERMINE TEMPORARY DETERIORATION LEVEL LV/A2 BASED ON A2/H, A2/M

STEP6-8: DETERMINE TEMPORARY DETERIORATION LEVEL LV/B1 BASED ON B1/H, B1/M

STEP6-9: DETERMINE DETERIORATION LEVEL FROM LV/A1, LV/A2, LV/B1

STEP6-10: CONTROL OPERATION OF DETERIORATION INDICATOR DEPENDING ON DETERIORATION LEVEL

RETURN

METHOD OF JUDGING DETERIORATION OF EMISSION GAS CONTROL CATALYST DEVICE

TECHNICAL FIELD

The present invention relates to a method of determining a deteriorated state of a catalytic converter for purifying an exhaust gas, such as a catalytic converter for use on an automobile or a hybrid vehicle.

BACKGROUND ART

Conventional processes of determining the deteriorated state of a catalytic converter for purifying exhaust gases produced when an air-fuel mixture is combusted, e.g., a catalytic converter disposed in the exhaust passage of an internal combustion engine, are known from Japanese patent publication No. 2,526,640 and Japanese laid-open patent publication No. 7-19033, for example.

The disclosed techniques are based on the fact that when the air-fuel ratio of an air-fuel mixture to be combusted by an internal combustion engine is changed from a leaner value to a richer value or from a richer value to a leaner value, the outputs from oxygen concentration sensors that are positioned respectively upstream and downstream of a catalytic converter combined with the internal combustion engine are inverted. More specifically, under certain operating conditions of the internal combustion engine, i.e., when the power output of the internal combustion engine is increased or the fuel supplied to the internal combustion engine is cut off as disclosed in Japanese patent publication No. 2,526,640 or when certain conditions are satisfied, e.g., the load and rotational speed of the internal combustion engine are in predetermined ranges as disclosed in Japanese laid-open patent publication No. 7-19033, the air-fuel ratio is positively changed from a leaner value to a richer value or from a richer value to a leaner value. At this time, the time consumed after the output of the upstream oxygen concentration sensor is inverted until the output of the downstream oxygen concentration sensor is inverted, and the period at which the output of the downstream oxygen concentration sensor is inverted are measured, and the deteriorated state of the catalytic converter is evaluated based on the measured values.

According to these techniques, when the internal combustion engine is operating under ordinary conditions, i.e., conditions without determining the deteriorated state of the catalytic converter, the air-fuel ratio is feedback-controlled depending on the inversion of the outputs from the oxygen concentration sensors in order to keep the air-fuel ratio of the internal combustion engine in the vicinity of a stoichiometric air-fuel ratio, for thereby allowing the catalytic converter to keep an appropriate purifying capability.

However, the above processes of evaluating the deteriorated state of the catalytic converter have suffered the following difficulties:

In order to determine the deteriorated state of the catalytic converter, the air-fuel ratio of the internal combustion engine needs to be positively changed to a leaner value or a richer value. Therefore, while the air-fuel ratio of the internal combustion engine is being feedback-controlled in order to allow the catalytic converter to keep an appropriate purifying capability, it is not possible to determine the deteriorated state of the catalytic converter. When the deteriorated state of the catalytic converter is determined, it is difficult to keep an appropriate purifying capability of the catalytic converter.

According to the conventional processes, the operating state of the internal combustion engine which is capable of determining the deteriorated state of the catalytic converter or the state in which exhaust gases are generated by the internal combustion engine in that operating state is limited to a certain special state. Specifically, according to the process disclosed in Japanese patent publication No. 2,526,640, the deteriorated state of the catalytic converter can be determined only if the output of the downstream $O_2$ sensor is produced in a leaner air-fuel ratio range when the output power of the internal combustion engine is to be increased and at the time of starting to increase the output power of the internal combustion engine, and only if the output of the downstream $O_2$ sensor is produced in a richer air-fuel ratio range when the supply of fuel to the internal combustion engine is to be cut off and at the time of cutting off the supply of fuel to the internal combustion engine.

According to the process disclosed in Japanese laid-open patent publication No. 7-19033, the deteriorated state of the catalytic converter can be determined only if the load (represented by the intake air rate, the throttle valve opening, the fuel injection quantity, and the intake air pressure) and the rotational speed of the internal combustion engine fall in a predetermined range, the intake air temperature is equal to or higher than a preset value, and the load of the internal combustion engine varies by an amount equal to or greater than a preset value. Therefore, if the internal combustion engine which generates exhaust gases to be supplied to the catalytic converter, which may be disposed in the exhaust passage of the internal combustion engine, operates in various operating states or the exhaust gases are generated in various states, then there are not many opportunities to be able to determine the deteriorated state of the catalytic converter, and the reliability of the determined deteriorated state of the catalytic converter under such conditions is low.

The applicant of the present application has proposed a system having a first exhaust gas sensor disposed upstream of a catalytic converter for generating an output representing the air-fuel ratio of an air-fuel mixture combusted by an internal combustion engine, and a second exhaust gas sensor disposed downstream of the catalytic converter for generating an output representing the concentration of a certain component of exhaust gases, e.g., the concentration of oxygen, the system being arranged to control the air-fuel ratio of the internal combustion engine according to a feedback control process to achieve an optimum purifying capability of the catalytic converter based on outputs from the sensors (see Japanese laid-open patent publication No. 9-324681, U.S. Pat. No. 5,852,930, and Japanese laid-open patent publication No. 11-93740).

The proposed system determines a target air-fuel ratio for the internal combustion engine to cause the output (the detected value of the oxygen concentration) of the second exhaust gas sensor to have a given constant value, and feedback-controls the air-fuel ratio of the internal combustion engine to converge the output (the detected value of the air-fuel ratio) of the first exhaust gas sensor to the target air-fuel ratio, for thereby achieving the optimum purifying capability of the catalytic converter.

Since the system can stably achieve the optimum purifying capability of the catalytic converter according to the above air-fuel ratio control process, it is desirable to be able to evaluate the deteriorated state of the catalytic converter while performing the air-fuel ratio control process.

It is therefore an object of the present invention to provide a method capable of appropriately evaluating a deteriorated state of a catalytic converter for purifying an exhaust gas in various states in which an exhaust gas to be purified by the catalytic converter is generated or in various states in which an internal combustion engine that generates the exhaust gas is operated.

Another object of the present invention is to provide a method capable of appropriately evaluating a deteriorated state of a catalytic converter for purifying an exhaust gas while maintaining a desired purifying capability of the catalytic converter which is disposed in the exhaust passage of an internal combustion engine.

DISCLOSURE OF THE INVENTION

To achieve the above objects, there is provided in accordance with the present invention a method of evaluating a deteriorated state of a catalytic converter for purifying an exhaust gas produced when an air-fuel mixture is combusted, comprising the steps of supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas, detecting data of the outputs of the first exhaust gas sensor and the second exhaust gas sensor when the exhaust gas is supplied to the exhaust passage, identifying the value of at least one parameter to be set of a model that is constructed as representing a behavior of an object exhaust system which ranges from the first exhaust gas sensor to the second exhaust gas sensor and includes the catalytic converter the exhaust passage, based on the detected data of the outputs of the first exhaust gas sensor and the second exhaust gas sensor, and determining a deteriorated state of the catalytic converter based on data of the identified value of the parameter.

Studies made by the inventors indicate that a model expressing the behavior of the object exhaust system including the catalytic converter and ranging from the first exhaust gas sensor to the second exhaust gas sensor is constructed, and when the value of the parameter to be set, i.e., the parameter to be set to a certain value in defining the behavior of the model, is sequentially identified based on the data of the outputs of the exhaust gas sensors that are acquired while the exhaust gas is being supplied to the exhaust passage, the identified value of the parameter has a certain characteristic correlation to the deteriorated state of the catalytic converter (e.g., as the deterioration of the catalytic converter progresses, the magnitude of the identified value of the parameter increases or decreases). The value of the parameter can basically be identified without fail based on the data of the outputs of the exhaust gas sensors in a situation where the outputs of the exhaust gas sensors vary to a certain extent. Therefore, it is possible to identify the value of the parameter when the exhaust gas to be supplied to the catalytic converter is generated in various states or the internal combustion engine operates in various operating states.

Preferably, the first exhaust gas sensor comprises a sensor for producing an output representing the air-fuel ratio of the air-fuel mixture from which the exhaust gas entering the catalytic converter is produced, and the second exhaust gas sensor comprises a sensor for producing an output representing the content of a particular component of the exhaust gas that has passed through the catalytic converter.

When the value of the parameter of the model of the object exhaust system which employs the above sensors as the first and second exhaust gas sensors is identified based on the data of the outputs of the first and second exhaust gas sensors at the time the exhaust gas is supplied to the exhaust passage, a relatively distinct correlation tends to appear easily between the identified value and the deteriorated state of the catalytic converter. Therefore, it is easy to determine the deteriorated state of the catalytic converter based on the data of the identified value of the parameter.

Since it is possible to determine the deteriorated state of the catalytic converter when the exhaust gas to be supplied to the catalytic converter is generated in various states or the internal combustion engine operates in various operating states, the catalytic converter is preferably disposed in the exhaust passage of the internal combustion engine which combusts the air-fuel mixture therein.

If the first exhaust gas sensor comprises a sensor for producing an output representing the air-fuel ratio of the air-fuel mixture, and the second exhaust gas sensor comprises a sensor for producing an output representing the content of a particular component of the exhaust gas that has passed through the catalytic converter, then the method preferably further comprises the step of controlling the air-fuel ratio of the internal combustion engine in order to converge the output of the second exhaust gas sensor to a predetermined target value when the exhaust gas is supplied to the exhaust passage upon operation of the internal combustion engine, wherein the value of the parameter is identified and the deteriorated state of the catalytic converter is determined concurrent with the step of controlling the air-fuel ratio of the internal combustion engine.

By controlling the air-fuel ratio of the internal combustion engine, or more specifically the air-fuel ratio of the air-fuel mixture combusted in the internal combustion engine, to converge the output of the second exhaust gas sensor which represents the content of the particular component of the exhaust gas having pass through the catalytic converter, it is possible to achieve a desired purifying capability of the catalytic converter for purifying the exhaust gas emitted from the internal combustion engine. When the value of the parameter is identified and the deteriorated state of the catalytic converter is determined concurrent with the step of controlling the air-fuel ratio of the internal combustion engine, the deteriorated state of the catalytic converter can be determined while maintaining the desired purifying capability of the catalytic converter during operation of the internal combustion engine.

If an oxygen concentration sensor ($O_2$ sensor) is used as the second exhaust gas sensor, then an optimum purifying capability of the catalytic converter is achieved by controlling the air-fuel ratio of the internal combustion engine to keep the output of the sensor at a given constant level.

The step of controlling the air-fuel ratio of the internal combustion engine preferably comprises the steps of calculating a target air-fuel ratio of the internal combustion engine in order to converge the output of the second exhaust gas sensor to the target value, and controlling the air-fuel ratio of the internal combustion engine according to a feedback control process in order to converge the air-fuel ratio represented by the output of the first exhaust gas sensor to the target air-fuel ratio.

By thus controlling the air-fuel ratio of the internal combustion engine, the air-fuel ratio detected by the first exhaust gas sensor can stably be controlled at an air-fuel ratio suitable to achieve the desired purifying capability of the catalytic converter, i.e., the target air-fuel ratio. Since the air-fuel ratio of the internal combustion engine is stably controlled, the behavior of the data of the outputs of the first and second exhaust gas sensors which are used to identify the value of the parameter is made smooth. As a result, the effect of disturbances other than the deteriorated state of the catalytic converter on the identified value of the parameter is reduced. Consequently, the deteriorated state of the catalytic converter can appropriately be evaluated based on the deterioration evaluating parameter which represents the degree of variation of time-series data of the identified value of the parameter.

While the target air-fuel ratio can be calculated using a PID controller, it is preferably calculated by a sliding mode controller.

Specifically, the sliding mode controller is advantageous in that it is more resistant to disturbances than the PID controller. The target air-fuel ratio calculated by the sliding mode controller makes stable the process of controlling the air-fuel ratio of the internal combustion engine. As a result, the desired purifying capability of the catalytic converter can be achieved more reliably. At the same time, the identified value of the parameter is made reliable. Thus, the deteriorated state of the catalytic converter can be determined more adequately based on the data of the identified value.

In controlling the air-fuel ratio of the internal combustion engine concurrent with determining the deteriorated state of the catalytic converter, the target air-fuel ratio is preferably calculated by an algorithm determined in advance using the identified data of the parameter.

Specifically, since the identified value of the parameter reflects the actual behavioral characteristics of the object exhaust system, when the target air-fuel ratio for converging the output of the second exhaust gas sensor to the target value is calculated using the identified value, the accuracy of the target air-fuel ratio is increased. As a consequence, the desired purifying capability of the catalytic converter can be achieved more reliably. At the same time, the stability of the identified value of the parameter is increased, and the deteriorated state of the catalytic converter can be determined more adequately based on the data of the identified value.

While the air-fuel ratio of the internal combustion engine can be feedback-controlled by a PID controller, it is preferably controlled by a recursive-type controller.

When the air-fuel ratio of the internal combustion engine is feedback-controlled by a recursive-type controller, or specifically an adaptive controller, it is possible to feedback-control the air-fuel ratio detected by the first exhaust gas sensor more accurately at the target air-fuel ratio while suppressing the effect of characteristic changes of the internal combustion engine than if a PID controller is used. The desired purifying capability of the catalytic converter can be achieved more reliably, and the reliability of the identified value of the parameter is increased, so that the deteriorated state of the catalytic converter can be determined more adequately based on the deterioration evaluating parameter.

The recursive-type controller determines a new manipulated variable according to a given recursive formula including time-series data in the past prior to the present of a manipulated variable for the air-fuel ratio of the internal combustion engine, or more specifically a manipulated variable for the fuel supply quantity of the internal combustion engine, for example, in order to converge the air-fuel ratio represented by the output of the first exhaust gas sensor to the target air-fuel ratio, and controls the air-fuel ratio of the internal combustion engine with the manipulated variable.

The model comprises a model expressing the object exhaust system as a discrete-time system for generating the output of the second exhaust gas sensor from the output of the first exhaust gas sensor via a response delay element and/or a dead time element, and includes, as the parameter, at least one of a coefficient relative to the output of the first exhaust gas sensor and a coefficient relative to the output of the second exhaust gas sensor.

By thus constructing the model of the object exhaust system and the values of the coefficients used in the model as the parameter are identified based on the data of the outputs of the first and second exhaust gas sensors, the identified value of the parameter (coefficients) of the model accurately reflects the actual behavioral characteristics of the catalytic converter included in the exhaust system. As a result, the correlation between the identified value and the deteriorated state of the catalytic converter is increased. Therefore, the deteriorated state of the catalytic converter can be determined adequately based on the identified value of the parameter (coefficients). By modeling the object exhaust system as a discrete time system, the value of the parameter (coefficients) can be identified on a real-time basis.

With the object exhaust system being thus modeled, the step of identifying the value of the parameter comprises the steps of sequentially identifying the value of the parameter according to an algorithm for sequentially updating and identifying the value of the parameter in order to minimize an error between the output of the second exhaust gas sensor in the model and an actual output of the second exhaust gas sensor, and filtering the output of the second exhaust gas sensor in the model and the actual output of the second exhaust gas sensor with the same frequency passing characteristics in calculating the error.

It is thus possible to identify the value of the parameter (coefficients) in a manner to cause the frequency characteristics of the actual object exhaust system including the catalytic converter and the model, or more specifically the frequency characteristics of changes of the output of the second exhaust gas sensor (corresponding to the output of the model) with respect to changes of the output of the first exhaust gas sensor (corresponding to the input of the model), to match each other. Thus, the identified value of the parameter is highly reliable, and the deteriorated rated state of the catalytic converter can be determined more adequately based on the identified value.

The step of identifying the value of the parameter preferably comprises the step of identifying the value of the parameter depending on a particular behavior of the object exhaust system.

Depending on the behavior of the object exhaust system, the identified value of the parameter may lack reliability. By identifying the value of the parameter in a certain behavior of the object exhaust system, i.e., a behavior in which air-fuel ratio of the air-fuel mixture recognized by the oxygen concentration in the exhaust gas changes from a leaner value to a richer value, the identified value of the parameter is made highly reliable as reflecting the behavioral characteristics of the object exhaust system. Thus, the reliability of the identified value of the parameter is increased, and the deteriorated state of the catalytic converter can be determined highly reliably based on the identified value.

The step of identifying the value of the parameter preferably comprises the step of recognizing the particular behavior of the object exhaust system based on the value of a function that is determined by a predetermined number of time-series data prior to the present of the output of the second exhaust gas sensor.

The step of identifying the value of the parameter preferably comprises the step of limiting the identified value of the parameter.

The above process makes it possible to prevent the deteriorated state of the catalytic converter from being determined based on an unduly identified value of the parameter and a less reliable identified value of the parameter, with the result that the reliability of the determined deteriorated state of the catalytic converter is increased. If the air-fuel ratio of the internal combustion engine is controlled using the identified value of the parameter, then the stability of the process of controlling the air-fuel ratio of the internal combustion engine is increased.

The step of identifying the value of the parameter preferably comprises the step of calculating the identified value of the parameter based on the difference between an actual output of the first exhaust gas sensor and a predetermined reference value and the difference between an actual output of the second exhaust gas sensor and a predetermined reference value, which differences are used as the data of the outputs of the first and second exhaust gas sensors.

In calculating the identified value of the parameter, the difference between the actual output of the first exhaust gas sensor and the predetermined reference value and the difference between the actual output of the second exhaust gas sensor and the predetermined reference value are used as the data of the outputs of the first and second exhaust gas sensors. In this manner, an algorithm for calculating the identified value can be constructed relatively easily, and the accuracy of the identified value is increased.

As described above, for controlling the air-fuel ratio of the internal combustion engine in order to converge the output of the first exhaust gas sensor to a given target value, the reference value relative to the first exhaust gas sensor is preferably set to the above target value.

The above techniques according to the present invention described above with respect to the construction of the model and the identifying step may be combined with the technology of types of the first and second exhaust gas sensors and the various technologies relative to the air-fuel ratio control of the internal combustion engine.

The deteriorated state of the catalytic converter may be determined based on the identified value of the parameter by comparing the identified value with a suitable decision value. Preferably, the step of determining the deteriorated state of the catalytic converter comprises the step of using data generated by effecting a predetermined filtering process on the data of the identified value of the parameter as data for determining the deteriorated state of the catalytic converter.

The identified value of the parameter itself may fluctuate even if the deteriorated state of the catalytic converter remains the same due to a disturbance. By using the data produced by effecting a predetermined filtering process on the data of the identified value of the parameter as data for determining the deteriorated state of the catalytic converter, the deteriorated state of the catalytic converter can be determined highly reliably.

The filtering process may be a process for determining an average or a weighted average of the identified value of the parameter as the determining data. However, it is particularly preferable that the filtering process comprise a process of determining a central value of the least square of the data of the identified value of the parameter. When the above filtering process is carried out, the determining data is more distinctly correlated to the deteriorated state of the catalytic converter, and hence the deteriorated state of the catalytic converter can be determined more adequately based on the determining data.

The method which uses the above determining data should further comprise the step of classifying and recognizing the flow rate of the exhaust gas supplied to the exhaust passage when the value of the parameter is identified, according to a plurality of regions, wherein the step of determining the deteriorated state of the catalytic converter comprises the steps of effecting the filtering process on the data of the identified value of the parameter in each of the regions to generate the data for determining the deteriorated state of the catalytic converter, and determining the deteriorated state of the catalytic converter using the data, which is generated in at least one of the regions, for determining the deteriorated state of the catalytic converter.

Specifically, the identified value of the parameter is somewhat affected by the flow rate of the exhaust gas passing through the catalytic converter 3, e.g., the magnitude of the identified value of the parameter is somewhat increased or decreased as the flow rate of the exhaust gas increases. Therefore, the flow rate of the exhaust gas is classified into a plurality of ranges, e.g., a large flow rate range and a small flow rate range, and determining data are generated respectively for the flow rate ranges that are recognized when the identified value of the parameter is determined. The deteriorated state of the catalytic converter is determined using the determining data that is generated with respect to at least one of the flow rate ranges. In this manner, the reliability of the determined result is increased, and the deteriorated state can be determined irrespective of the flow rate of the exhaust gas.

More specifically, the step of determining the deteriorated state of the catalytic converter comprises the step of determining the deteriorated state of the catalytic converter based on the magnitude of the data of the identified value of the parameter and/or the characteristics of changes of the value of the data, the changes attending on the progress of the deterioration of the catalytic converter Alternatively, if the deterioration determining data is generated by effecting a filtering process on the data of the identified value of the parameter, then the step of determining the deteriorated state of the catalytic converter comprises the step of determining the deteriorated state of the catalytic converter based on the magnitude of the data for determining the deteriorated state of the catalytic converter and/or the characteristics of changes of the value of the data for determining the deteriorated state of the catalytic converter, the changes attending on the progress of the deterioration of the catalytic converter.

Specifically, the data of the identified value of the parameter or the deterioration determining data generated from the data of the identified value of the parameter has the magnitude of its value or the pattern of its changes characteristically correlated to the deteriorated state of the catalytic converter, and the correlation is basically determined depending on the type of the catalytic converter or the type of the parameter that is identified. Therefore, the deteriorated state of the catalytic converter can appropriately be determined by taking into account the magnitude of the value of the above data and the characteristics of its changes.

More specifically, if a model is constructed which expresses the object exhaust system as a discrete-time system for generating the output of the second exhaust gas sensor from the output of the first exhaust gas sensor via a response delay element and/or a dead time element, and if the parameter includes the coefficient relative to the output of the first exhaust gas sensor, then the data of the identified value of the coefficient or the magnitude of the value of data generated by effecting a predetermined filtering process on the data of the identified value exhibits an increasing tendency or a decreasing tendency as the deterioration of the catalytic converter progresses until the deterioration of the catalytic converter progresses to a certain extent. Thereafter, the tendencies are reversed, and hence the data exhibits a decreasing or increasing tendency as the deterioration of the catalytic converter progresses. Thus, when the deterioration of the catalytic converter progresses to a certain extent, the value of the above data becomes an extremal value (maximum or minimum value). In this case, therefore, the step of determining the deteriorated state of the catalytic converter comprises the step of determining the deteriorated state of the catalytic converter based on the data of the identified value of the coefficient relative to the output of the first exhaust gas sensor or the magnitude of the value of data generated by effecting a predetermined filtering process on the data of the identified value, and information about an extremal value (maximum or minimum value) occurring in the value of the data as the deterioration of the catalytic converter progresses, e.g., information indicative of whether the extremal value is produced or not.

If the above model of the object exhaust system is constructed and if the parameter includes the coefficient relative to the output of the second exhaust gas sensor, then the data of the identified value of the coefficient or the magnitude of the value of data generated by effecting the above filtering process on the data of the identified value exhibits a monotonous increasing tendency or a monotonous decreasing tendency as the deterioration of the catalytic converter progresses. In this case, therefore, the step of determining the deteriorated state of the catalytic converter comprises the step of determining the deteriorated state of the catalytic converter based on the data of the identified value of the coefficient relative to the output of the first exhaust gas sensor or the magnitude of the value of data generated by effecting a predetermined filtering process on the data of the identified value.

If the model has a plurality of parameters to be identified, then the step of determining the deteriorated state of the catalytic converter comprises the step of determining the deteriorated state of the catalytic converter based on data of identified values of the parameters.

With this arrangement, the reliability of the determined result is higher than if the deteriorated state of the catalytic converter is determined based on the data of the identified value of a single parameter.

More specifically, the step of determining the deteriorated state of the catalytic converter comprises the steps of temporarily determining deteriorated states of the catalytic converter based on the respective data of the identified values of the parameters, and thereafter determining the deteriorated state of the catalytic converter based on a combination of the temporarily determined deteriorated states. Consequently, the deteriorated state of the catalytic converter can easily be determined highly reliably based on the data of the respective identified values of the plural parameters.

The step of determining the deteriorated state of the catalytic converter preferably comprises the step of classifying and determining the deteriorated state of the catalytic converter in a plurality of degrees of deterioration. The degree of deterioration of the catalytic converter can thus be recognized stepwise.

The step of determining the deteriorated state of the catalytic converter preferably comprises the steps of determining whether the identified value of the parameter is appropriate for determining the deteriorated state of the catalytic converter or not based on at least one of the data of the output of the first exhaust gas sensor and the data of the output of the second exhaust gas sensor, and determining the deteriorated state of the catalytic converter based on the identified value of the parameter which is determined as being appropriate.

Alternatively, if the catalytic converter is disposed in the exhaust passage of the internal combustion engine, then the step of determining the deteriorated state of the catalytic converter preferably comprises the steps of determining whether the identified value of the parameter is appropriate for determining the deteriorated state of the catalytic converter or not based on at least one of the data of the output of the first exhaust gas sensor, the data of the output of the second exhaust gas sensor, and an intake quantity of the internal combustion engine, and determining the deteriorated state of the catalytic converter based on the identified value of the parameter which is determined as being appropriate.

If the internal combustion engine is mounted as propulsive source on a motor vehicle, then the step of determining the deteriorated state of the catalytic converter preferably comprises the steps of determining whether the identified value of the parameter is appropriate for determining the deteriorated state of the catalytic converter or not based on at least one of the data of the output of the first exhaust gas sensor, the data of the output of the second exhaust gas sensor, an intake quantity of the internal combustion engine, and a vehicle speed of the motor vehicle, and determining the deteriorated state of the catalytic converter based on the identified value of the parameter which is determined as being appropriate.

In a situation where the output of the first exhaust gas sensor and the output of the second exhaust gas sensor are steadily substantially constant, and variations of these outputs are extremely small, it is difficult to determine the data of the parameter highly accurately from those output data, and the identified value tends to suffer an error. A situation where the outputs of the exhaust gas sensors are substantially constant is liable to take place if the internal combustion engine is operating such that the intake quantity of the internal combustion engine with the object exhaust system disposed in the exhaust passage, or more accurately the intake quantity per combustion cycle, or if the vehicle speed of the motor vehicle on which the internal combustion engine is mounted as propulsive source is steadily substantially constant.

According to the present invention, it is determined whether the identified value of the parameter is appropriate for determining the deteriorated state of the catalytic converter based on at least one (preferably a plurality of) of the data of the output of the first exhaust gas sensor, the data of the output of the second exhaust sensor, the intake quantity of the internal combustion engine, and the vehicle speed of the motor vehicle, and the deteriorated state of the catalytic converter is determined based on the identified value of the parameter that is determined as appropriate. Therefore, the reliability of the identified value of the parameter can be increased, and hence the reliability of the determined deteriorated state of the catalytic converter can be increased.

The step of determining whether the identified value of the parameter is appropriate for determining the deteriorated state of the catalytic converter or not may comprise the step of determining whether the identified value of the parameter is appropriate for determining the deteriorated state of the catalytic converter or not, based on whether at least one of the output of the first exhaust sensor and the output of the second exhaust sensor is maintained at a substantially constant level when the data of the outputs of the first and second exhaust gas sensors used to determine the identified value of the parameter are detected. In a situation where the output of the first exhaust gas sensor, etc. is kept substantially constant at the time the data of the outputs of the first and second exhaust gas sensors used to determine the identified value are acquired, the identified value of the parameter may be determined as being not appropriate. Otherwise, preferably in a situation a plurality of the output of the first exhaust gas sensor, etc. vary to a certain extent, the identified value of the parameter may be determined as being appropriate.

The above techniques according to the present invention described above with respect to the deterioration determining step may be combined with the technology of types of the first and second exhaust gas sensors, the technologies relative to the air-fuel ratio control of the internal combustion engine, and the techniques relative to the construction of the model or the processing of the identifying step.

The method according to the present invention described above preferably further comprises the step of indicating the determined deteriorated state-of the catalytic converter for thereby presenting a prompt to replace the catalytic converter.

BRIEF DESCRIPTION OF THE DRAWINGS

FIGS. 20 and 21 are flowcharts of a method of determining a deteriorated state of a catalytic converter for purifying an exhaust gas, according to a second embodiment of the present invention.

BEST MODE FOR CARRYING OUT THE INVENTION

A first embodiment of the present invention will be described below with reference to FIGS. 1 through 19.

Figure 1:
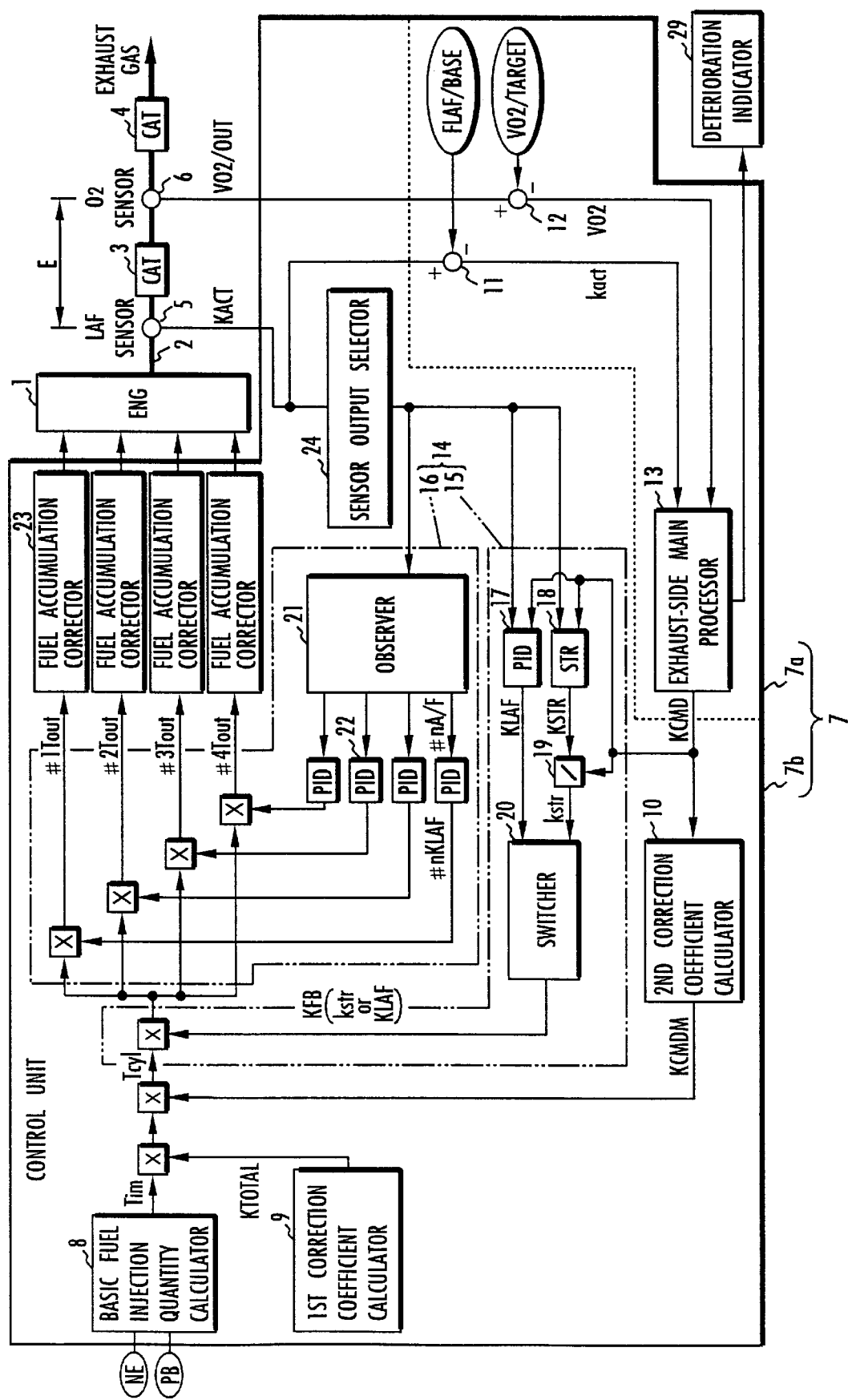
FIG. 1 is a block diagram of an overall system for carrying out a method of determining a deteriorated state of a catalytic converter for purifying an exhaust gas, according to a first embodiment of the present invention.
Figure 2:
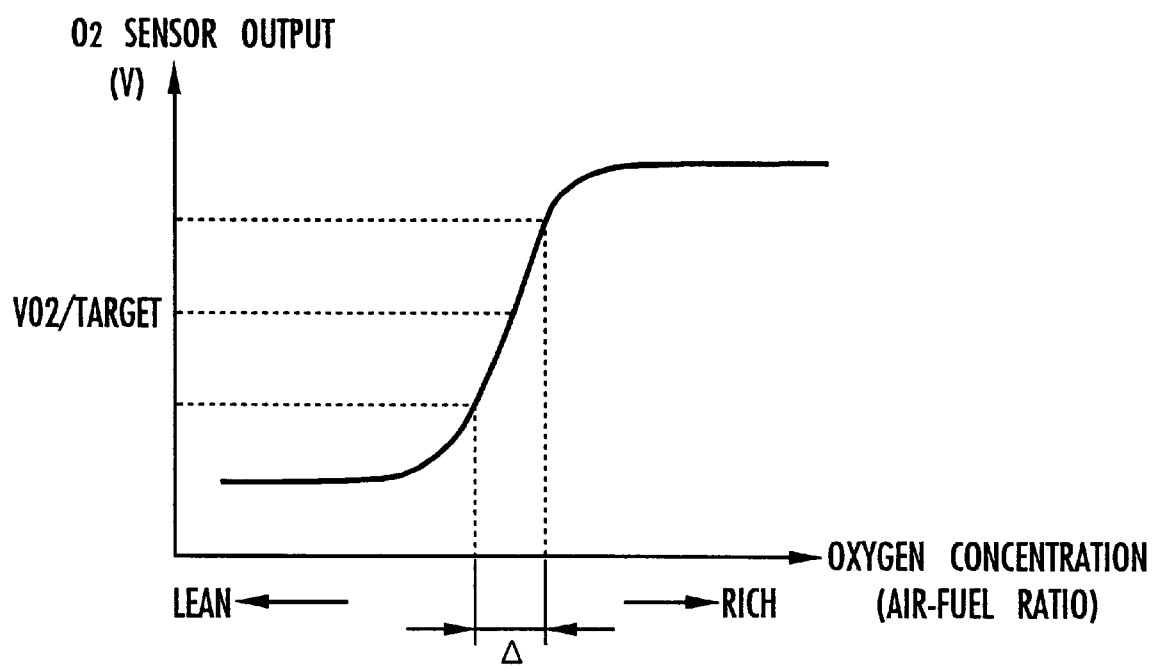
FIG. 2 is a diagram showing output characteristics of an $O_2$ sensor used in the system shown in FIG. 1.

FIG. 1 shows in block form the apparatus for carrying out the method according to the present invention. As shown in FIG. 1, an internal combustion engine 1 such as a four-cylinder internal combustion engine is mounted as a propulsion source on an automobile or a hybrid vehicle, for example. When a mixture of fuel and air is combusted in each cylinder of the internal combustion engine 1, an exhaust gas is generated and emitted from each cylinder into a common discharge pipe 2 positioned near the internal combustion engine 1, from which the exhaust gas is discharged into the atmosphere. Two three-way catalytic converters 3, 4 are mounted in the common exhaust pipe 2 at successively downstream locations thereon. The upstream catalytic converter 3 is evaluated for its deteriorated state according to the present invention. The downstream catalytic converter 4 may be dispensed with.

The system serves to control the air-fuel ratio of the internal combustion engine 1, i.e., the air-fuel ratio of an air-fuel mixture combusted by the internal combustion engine 1, and determine the deteriorated state of the catalytic converter 3. In order to perform such processing, the system has a wide-range air-fuel ratio sensor 5 mounted as a first exhaust gas sensor on the exhaust pipe 2 upstream of the catalytic converter 3, or more precisely at a position where exhaust gases from the cylinders of the internal combustion engine 1 are put together, an $O_2$ sensor (oxygen concentration sensor) 6 mounted as a second exhaust gas sensor on the exhaust pipe 2 downstream of the catalytic converter 3 and upstream of the catalytic converter 4, and a control unit 7 for carrying out a control process (described later on) based on detected outputs from the sensors 5, 6. The control unit 7 is supplied with detected outputs from the wide-range air-fuel ratio sensor 5 and the $O_2$ sensor 6 and also detected outputs from various other sensors (not shown) for detecting operating conditions of the internal combustion engine 1, including an engine speed sensor, an intake pressure sensor, a coolant temperature sensor, etc.

The wide-range air-fuel ratio sensor 5 is in the form of an $O_2$ sensor, and outputs a signal having a level depending on the air-fuel ratio of the air-fuel mixture combusted by the internal combustion engine 1 (the air-fuel ratio is recognized according to the concentration of oxygen in the exhaust gas generated when the air-fuel mixture is combusted). The output signal from the wide-range air-fuel ratio sensor 5 (hereinafter referred to as an LAF sensor 5) is processed by a detecting circuit such as a linearizer (not shown) into a signal having an output signal KACT having a level which is proportional to the air-fuel ratio of the internal combustion engine in a wide range of air-fuel ratios thereof, i.e., an output signal KACT representative of a detected value of the air-fuel ratio. The LAF sensor 5 is disclosed in detail in Japanese laid-open patent publication No. 4-369471 and U.S. Pat. No. 5,391,282, and will not be described below.

The $O_2$ sensor 6 disposed downstream of the catalytic converter 3 generates an output signal VO2/OUT having a level depending on the oxygen concentration of the exhaust gas that has passed through the catalytic converter 3, i.e., an output signal VO2/OUT representing a detected value of the oxygen concentration of the exhaust gas, as with ordinary $O_2$ sensors. The output signal VO2/OUT from the $O_2$ sensor 6 will change with high sensitivity in proportion to the oxygen concentration of the exhaust gas that has passed through the catalytic converter 3, with the air-fuel ratio recognized as the oxygen concentration in the exhaust gas that has passed through the catalytic converter 3 being in a range A close to a stoichiometric air-fuel ratio.

The control unit 7 comprises a control unit 7a (hereinafter referred to as an "exhaust-side control unit 7a") for performing a process of calculating a target air-fuel ratio KCMD for the internal combustion engine and a process of determining the deteriorated state of the catalytic converter 3, and a control unit 7b (hereinafter referred to as an "engine-side control unit 7b") for carryout a process of controlling the air-fuel ratio of the internal combustion engine 1 based on the target air-fuel ratio KCMD.

The engine-side control unit 7b has, as its functions, a basic fuel injection quantity calculator 8 for determining a basic fuel injection quantity Tim to be injected into the internal combustion engine 1, a first correction coefficient calculator 9 for determining a first correction coefficient KTOTAL to correct the basic fuel injection quantity Tim, and a second correction coefficient calculator 10 for determining a second correction coefficient KCMDM to correct the basic fuel injection quantity Tim.

The basic fuel injection quantity calculator 8 determines a reference fuel injection quantity (fuel supply quantity) from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

The first correction coefficient KTOTAL determined by the first correction coefficient calculator 9 serves to correct the basic fuel injection quantity Tim in view of an exhaust gas recirculation ratio of the internal combustion engine 1, i.e., the proportion of an exhaust gas contained in an air-fuel mixture introduced into the internal combustion engine 1, an amount of purged fuel supplied to the internal combustion engine 1 when a canister (not shown) is purged, a coolant temperature, an intake temperature, etc.

The second correction coefficient KCMDM determined by the second correction coefficient calculator 10 serves to correct the basic fuel injection quantity Tim in view of the charging efficiency of an air-fuel mixture due to the cooling effect of fuel flowing into the internal combustion engine 1 depending on a target air-fuel ratio KCMD determined by the exhaust-side control unit 7a, as described later on.

The engine-side control unit 7b corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 and U.S. Pat. No. 5,253,630, and will not be described below.

The engine-side control unit 7b also has, in addition to the above functions, a feedback controller 14 for feedback-controlling the air-fuel ratio of the air-fuel mixture to be combusted in the internal combustion engine 1 by adjusting a fuel injection quantity of the internal combustion engine 1 so as to equalize (converge) the output KACT of the LAF sensor 5 (the detected air-fuel ratio of the internal combustion engine 1) to the target air-fuel ratio KCMD which is calculated by the exhaust-side control unit 7a.

The feedback controller 14 comprises a general feedback controller 15 for feedback-controlling a total fuel injection quantity for all the cylinders of the internal combustion engine 1 and a local feedback controller 16 for feedback-controlling a fuel injection quantity for each of the cylinders of the internal combustion engine 1.

The general feedback controller 15 sequentially determines a feedback correction coefficient KFB to correct the demand fuel injection quantity Tcyl (by multiplying the demand fuel injection quantity Tcyl) so as to converge the output KACT from the LAF sensor 5 toward the target air-fuel ratio KCMD.

The general feedback controller 15 comprises a PID controller 17 for generating a feedback manipulated variable KLAF as the feedback correction coefficient KFB depending on the difference between the output KACT from the LAF sensor 5 and the target air-fuel ratio KCMD according to a known PID control process, and an adaptive controller 18 (indicated by "STR" in FIG. 1) for adaptively determining a feedback manipulated variable KSTR for determining the feedback correction coefficient KFB in view of changes in operating conditions of the internal combustion engine 1 or characteristic changes thereof from the output KACT from the LAF sensor 5 and the target air-fuel ratio KCMD.

In the present embodiment, the feedback manipulated variable KLAF generated by the PID controller 17 is of "1" and can be used directly as the feedback correction coefficient KFB when the output KACT (the detected air-fuel ratio) from the LAF sensor 5 is equal to the target air-fuel ratio KCMD. The feedback manipulated variable KSTR generated by the adaptive controller 18 becomes the target air-fuel ratio KCMD when the output KACT from the LAF sensor 5 is equal to the target air-fuel ratio KCMD. A feedback manipulated variable kstr(=KSTR/KCMD) which is produced by dividing the feedback manipulated variable KSTR by the target air-fuel ratio KCMD with a divider 19 can be used as the feedback correction coefficient KFB.

The feedback manipulated variable KLAF generated by the PID controller 17 and the feedback manipulated variable kstr which is produced by dividing the feedback manipulated variable KSTR from the adaptive controller 18 by the target air-fuel ratio KCMD are selected one at a time by a switcher 20. A selected one of the feedback manipulated variable KLAF and the feedback manipulated variable kstr is used as the feedback correction coefficient KFB. The demand fuel injection quantity Tcyl is corrected by being multiplied by the feedback correction coefficient KFB. Details of the general feedback controller 15 (particularly, the adaptive controller 18) will be described later on.

The local feedback controller 16 comprises an observer 21 for estimating real air-fuel ratios #nA/F (n=1, 2, 3, 4) of the respective cylinders from the output KACT from the LAF sensor 5, and a plurality of PID controllers 22 (as many as the number of the cylinders) for determining respective feedback correction coefficients #nKLAF for fuel injection quantities for the cylinders from the respective real air-fuel ratios #nA/F estimated by the observer 21 according to a PID control process so as to eliminate variations of the air-fuel ratios of the cylinders.

Briefly stated, the observer 21 estimates a real air-fuel ratio #nA/F of each of the cylinders as follows: A system from the internal combustion engine 1 to the LAF sensor 5 (where the exhaust gases from the cylinders are combined) is considered to be a system for generating an air-fuel ratio detected by the LAF sensor 5 from a real air-fuel ratio #nA/F of each of the cylinders, and is modeled in view of a detection response delay (e.g., a time lag of first order) of the LAF sensor 5 and a chronological contribution of the air-fuel ratio of each of the cylinders to the air-fuel ratio detected by the LAF sensor 5. Based on the modeled system, a real air-fuel ratio #nA/F of each of the cylinders is estimated from the output KACT from the LAF sensor 5.

Details of the observer 21 are disclosed in Japanese laid-open patent publication No. 7-83094 and U.S. Pat. No. 5,531,208, and will not be described below.

Each of the PID controllers 22 of the local feedback controller 16 divides the output signal KACT from the LAF sensor 5 by an average value of the feedback correction coefficients #nKLAF determined by the respective PID controllers 22 in a preceding control cycle to produce a quotient value, and uses the quotient value as a target air-fuel ratio for the corresponding cylinder. Each of the PID controllers 22 then determines a feedback correction coefficient #nKLAF in a present control cycle so as to eliminate any difference between the target air-fuel ratio and the corresponding real air-fuel ratio #nA/F determined by the observer 21.

The local feedback controller 16 multiplies a value, which has been produced by multiplying the demand fuel injection quantity Tcyl by the selected feedback correction coefficient KFB produced by the general feedback controller 15, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a fuel accumulation corrector 23 in the engine-side control unit 7b. The corrected output fuel injection quantity #nTout is applied to each of fuel injectors (not shown) of the internal combustion engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, and will not be described in detail below.

A sensor output selector 24 shown in FIG. 1 serves to select the output KACT from the LAF sensor 5, which is suitable for the estimation of a real air-fuel ratio #nA/F of each cylinder with the observer 21, depending on the operating conditions of the internal combustion engine 1. Details of the sensor output selector 24 are disclosed in detail in Japanese laid-open patent publication No. 7-259588 and U.S. Pat. No. 5,540,209, and will not be described in detail below.

The exhaust-side control unit 7a has a subtractor 11 for determining a difference kact (=KACT−FLAF/BASE) between the output signal KACT from the LAF sensor 5 and a predetermined reference value FLAF/BASE and a subtractor 12 for determining a difference VO2 (=VO2/OUT−VO2/TARGET) between the output signal VO2/OUT from the $O_2$ sensor 6 and a target value VO2/TARGET therefor. The reference value FLAF/BASE is established as about "1" (constant value) converted as an air-fuel ratio in present embodiment. The target value VO2/TARGET is established as a constant value for achieving optimum exhaust gas purifying performance of the catalytic converter 3 in present embodiment.

The differences kact, VO2 determined respectively by the subtractors 11, 12 are referred to as a differential output kact of the LAF sensor 5 and a differential output VO2 of the $O_2$ sensor 6, respectively.

The exhaust-side control unit 7a also has an exhaust-side main processor 13 which is supplied with the data of the differential Outputs kact, VO2 as the data of the output from the LAF sensor 5 and the output of the $O_2$ sensor 6.

The exhaust-side main processor 13 has a function (hereinafter referred to as "target air-fuel ratio calculating function) for sequentially calculating a target air-fuel ratio KCMD for the internal combustion engine 1, or more specifically a target value for the air-fuel ratio detected by the LAF sensor 5, based on the data of the differential outputs kact, VO2, and a function (hereinafter referred to as "deterioration determining function) for sequentially determining the deteriorated state of the catalytic converter 3.

The target air-fuel ratio calculating function serves to control an object exhaust system (denoted by E in FIG. 1) including the catalytic converter 3, which ranges from the LAF sensor 5 to the $O_2$ sensor 6 along the exhaust pipe 2. The target air-fuel ratio calculating function sequentially determines the target air-fuel ratio KCMD for the internal combustion engine 1 so as to converge the output VO2/OUT of the $O_2$ sensor 6 to the target value VO2/TARGET therefor, or so as to converge the differential output VO2 of the $O_2$ sensor 6 to "0", according to an adaptive sliding mode control process, in view of a dead time present in the object exhaust system E to be controlled, a dead time present in the internal combustion engine 1 and the engine-side control unit 7b, and behavioral changes of the object exhaust system E.

The deterioration determining function serves to sequentially determine the deteriorated state of the catalytic converter 3 using the data of identified values of parameters of a model, described later on, that are sequentially obtained in the process of calculating the target air-fuel ratio KCMD, and control the operation of a deterioration indicator 29 connected to the apparatus depending on the determination of the deteriorated state of the catalytic converter 3. The deterioration indicator 29 may comprise a lamp, a buzzer, or a display unit for displaying characters, a graphic image, etc. to indicate the deteriorated state of the catalytic converter 3.

In order to perform the target air-fuel ratio calculating function and the deteriorated state evaluating function, the object exhaust system E is regarded as a system for generating the output VO2/OUT of the $O_2$ sensor 6 (the detected value of the oxygen concentration of the exhaust gas having passed through the catalytic converter 3) from the output KACT of the LAF sensor 5 (the detected value of the air-fuel ratio) via a dead time element and a response delay element, and the behavior of the system is modeled as a discrete time system.

In addition, for the target air-fuel ratio calculating function, the system comprising the internal combustion engine 1 and the engine-side control unit 7b is regarded as a system (hereinafter referred to as "air-fuel ratio manipulating system") for generating the output KACT of the LAF sensor 5 from the target air-fuel ratio KCMD via a dead time element, and the behavior of this system is modeled as a discrete time system.

The model (hereinafter referred to as "exhaust system model") in which the behavior of the object exhaust system E is expressed as a discrete time system is expressed, using the differential output kact (=KACT−FLAF/BASE) from the LAF sensor 5 and the differential output VO2 (=VO2/OUT−VO2/TARGET) from the $O_2$ sensor 6, instead of the output KACT of the LAF sensor 5 and the output VO2/OUT of the $O_2$ sensor 6, according to the following equation (1):

$$VO2(k+1)=a1 \cdot VO2(k)+a2 \cdot VO2(k-1)+b1 \cdot kact(k-d1) \quad (1)$$

According to the equation (1), the object exhaust system E is regarded as a system for generating the differential output VO2 from the $O_2$ sensor 6 from the differential output kact from the LAF sensor 5 via a dead time element and a response delay element, and the behavior of the object exhaust system E is expressed by the model of a discrete time system (more specifically, an autoregressive model having a dead time).

In the equation (1), "k" represents the ordinal number of a discrete-time control cycle of the exhaust-side control unit 7a, and "d1" the dead time of the object exhaust system E as represented by the number of control cycles. The dead time of the object exhaust system E (more specifically, the dead time required until the air-fuel ratio detected at each point of time by the LAF sensor 5 is reflected in the output VO2/OUT of the $O_2$ sensor 6) is generally equal to the time of 3–10 control cycles (d1=3–10) if the period (constant in the present embodiment) of control cycles of the exhaust-side control unit 7a ranges from 30 to 100 ms. In the present embodiment, a preset constant value (d1=7, for example) which is equal to or slightly longer than the actual dead time of the object exhaust system E is used as the dead time d1 in the discrete-system model of the object exhaust system E as represented by the equation (1).

The first and second terms of the right side of the equation (1) correspond to a response delay element of the object exhaust system E, the first term being a primary autoregressive term and the second term being a secondary autoregressive term. In the first and second terms, "a1", "a2" represent respective gain coefficients of the primary autoregressive term and the secondary autoregressive term. Stated otherwise, these gain coefficients a1, a2 are relative to the differential output VO2 of the $O_2$ sensor 6 as an output of the control system E.

The third term of the right side of the equation (1) represents the output of the LAF sensor 5 as an input to the object exhaust system E and the exhaust system model, including the dead time d1 of the object exhaust system E. In the third term, "b1" represents a gain coefficient relative to the input to the object exhaust system E, i.e., the output of the LAF sensor 5.

These gain coefficients "a1", "a2", "b1" are parameters which define the behavior of the exhaust system model, and are sequentially identified by an identifier which will be described later on.

The model (hereinafter referred to as "air-fuel ratio manipulating system model") of the discrete time system of the air-fuel ratio manipulating system which comprises the internal combustion engine 1 and the engine-side control unit 7b is expressed, using the differential output kact (=KACT−FLAF/BASE) from the LAF sensor 5 instead of the output KACT from the LAF sensor 5 and also using a difference kcmd (=KCMD−FLAF/BASE, which corresponds to a target value for the differential output kact of the LAF sensor 5, and will be referred to as "target differential air-fuel ratio kcmd") between the target air-fuel ratio KCMD and the reference value FLAF/BASE instead of the target air-fuel ratio KCMD, according to the following equation (2):

$$kact(k)=kcmd(k-d2) \quad (2)$$

The equation (2) expresses the air-fuel ratio manipulating system as the model of a discrete time system, regarding the air-fuel ratio manipulating system as a system for generating the differential output kact from the LAF sensor 5 from the target differential air-fuel ratio kcmd via a dead time element, i.e., a system in which the differential output kact in each control cycle is equal to the target differential air-fuel ratio kcmd prior to the dead time.

In the equation (2), "d2" represents the dead time of the air-fuel ratio manipulating system in terms of the number of control cycles of the exhaust-side control unit 7a. The dead time of the air-fuel ratio manipulating system varies (more specifically, the time required until the target air-fuel ratio KCMD at each point of time is reflected in the output signal KACT of the LAF sensor 5) varies with the rotational speed NE of the internal combustion engine 1, and is longer as the rotational speed NE of the internal combustion engine 1 is lower. In the present embodiment, in view of the above characteristics of the dead time of the air-fuel ratio manipulating system, a preset constant value (for example, d2=3) which is equal to or slightly longer than the actual dead time of the air-fuel ratio manipulating system at an idling rotational speed of the internal combustion engine 1, which is a rotational speed in a low speed range of the internal combustion engine 1 (the actual dead time is a maximum dead time which can be taken by the air-fuel ratio manipulating system at an arbitrary rotational speed of the internal combustion engine 1), is used as the value of the dead time d2 in the air-fuel ratio manipulating system model expressed by the equation (2).

The air-fuel ratio manipulating system actually includes a dead time element and a response delay element of the internal combustion engine 1. Since a response delay of the output KACT of the LAF sensor 5 with respect to the target air-fuel ratio KCMD is basically compensated for by the feedback controller 14 (particularly the adaptive controller 18) of the engine-side control unit 7b, there will arise no problem if a response delay element of the internal combustion engine 1 is not taken into account in the air-fuel ratio manipulating system as viewed from the exhaust-side control unit 7a.

The exhaust-side main processor 13 performs the target air-fuel ratio calculating function based on the exhaust system model and the air-fuel ratio manipulating system model expressed respectively by the equations (1), (2) and the deterioration determining function based on the exhaust system model expressed by the equation (1) in constant control cycles of the exhaust-side control unit 7a. In order to performs the above functions, the exhaust-side main processor 13 has its functions as shown in FIG. 3.

Figure 3:
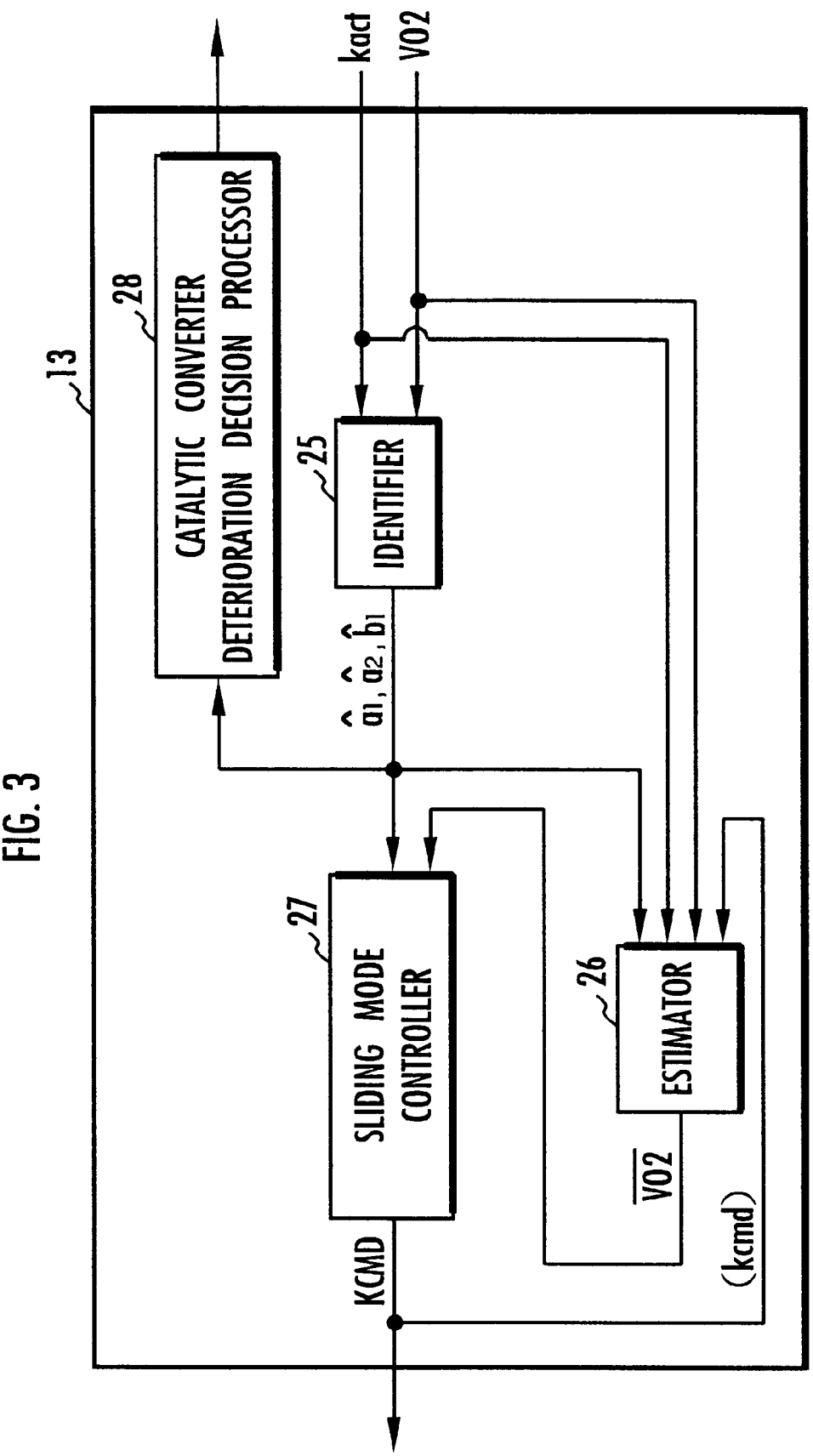
FIG. 3 is a block diagram showing a basic arrangement of a central portion of the system shown in FIG. 1.

As shown in FIG. 3, the exhaust-side main processor 13 has an identifier 25 for sequentially identifying in each control cycle the gain coefficients a1, a2, b1 that are parameters to be established for the exhaust system model (the equation (1)), an estimator 26 for sequentially determining in each control cycle an estimated value VO2 bar of the differential output VO2 from the $O_2$ sensor 6 (hereinafter referred to as "estimated differential output VO2 bar") after the total dead time d (=d1+d2) which is the sum of the dead time d1 of the object exhaust system E and the dead time d2 of the air-fuel ratio manipulating system, from the data of the differential output kact of the LAF sensor 5, the differential output VO2 of the $O_2$ sensor 6, and the target air-fuel ratio KCMD (more accurately, the target differential air-fuel ratio kcmd) determined in the past by a sliding mode controller 27, using identified values a1 hat, a2 hat, b1 hat of the gain coefficients a1, a2, b1 (hereinafter referred to as "identified gain coefficients a1 hat, a2 hat, b1 hat") calculated by the identifier 25, a sliding mode controller 27 for sequentially determining in each control cycle a target air-fuel ratio KCMD according to an adaptive slide mode control process from the data of the estimated differential output VO2 bar of the $O_2$ sensor 6 determined by the estimator 26, using the identified gain coefficients a1 hat, a2 hat, b1 hat, and a catalytic converter deterioration decision processor 28 for determining the deteriorated state of the catalytic converter 3 using the data of the identified gain coefficients a1 hat, a2 hat, b1 hat.

The algorithm of a processing operation to be carried out by the identifier 25, the estimator 26, and the sliding mode controller 27 is constructed as follows:

The identifier 25 serves to identify the gain coefficients a1, a2, b1 sequentially on a real-time basis for the purpose of minimizing a modeling error of the exhaust system model expressed by the equation (1) with respect to the actual object exhaust system E. The identifier 25 carries out its identifying process as follows:

In each control cycle, the identifier 25 determines an identified value VO2 (k) hat of the differential output VO2 (the output of the exhaust system model) from the $O_2$ sensor 6 (hereinafter referred to as "identified differential output VO2(k) hat") on the exhaust system model, using the data of the present values of the identified gain coefficients a1 hat, a2 hat, b1 hat of the exhaust system model, i.e., the values of identified gain coefficients a1(k-1) hat, a2(k-1) hat, b1(k-1) hat determined in a preceding control cycle, and the data of the past values of the differential output kact from the LAF sensor 5 and the differential output VO2 from the $O_2$ sensor 6, according to the following equation (3):

$$V\hat{O}2(k) = \hat{a}1(k-1) \cdot VO2(k-1) + \quad (3)$$
$$\hat{a}2(k-1) \cdot VO2(k-2) + \hat{b}1(k-1) \cdot kact(k-d1-1)$$

The equation (3) corresponds to the equation (1) which is shifted into the past by one control cycle with the gain coefficients a1, a2, b1 being replaced with the respective identified gain coefficients a1(k-1) hat, a2(k-1) hat, b1(k-1) hat. The constant value (d1=7) established as described above is used as the value of the dead time d1 of the object exhaust system E in the third term of the equation (3).

If vectors $\Theta, \xi$ defined by the following equations (4), (5) are introduced (the letter T in the equations (4), (5) represents a transposition), then the equation (3) is expressed by the equation (6):

$$\Theta^T(k) = [\hat{a}1(k)\hat{a}2(k)\hat{b}1(k)] \quad (4)$$

$$\xi^T(k) = [VO2(k-1)VO2(k-2)kact(k-d1-1)] \quad (5)$$

$$V\hat{O}2(k) = \Theta^T(k-1) \cdot \xi(k) \quad (6)$$

The identifier 25 also determines a difference id/e(k) between the identified differential output VO2(k) hat from the $O_2$ sensor 6 which is determined by the equation (3) or (6) and the present differential output VO2(k) from the $O_2$ sensor 6, as representing a modeling error of the exhaust system model with respect to the actual object exhaust system E (hereinafter the difference id/e will be referred to as "identified error id/e"), according to the following equation (7):

$$id/e(k) = VO2(k) - V\hat{O}2(k) \quad (7)$$

The identifier 25 further determines new identified gain coefficients a1(k) hat, a2(k) hat, b1(k) hat, stated otherwise, a new vector $\Theta(k)$ having these identified gain coefficients as elements (hereinafter the new vector $\Theta(k)$ will be referred to as "identified gain coefficient vector $\Theta$"), in order to minimize the identified error id/e, according to the equation (8) given below. That is, the identifier 25 varies the identified gain coefficients a1 hat (k-1), a2 hat (k-1), b1 hat (k-1) determined in the preceding control cycle by a quantity proportional to the identified error id/e for thereby determining the new identified gain coefficients a1(k) hat, a2(k) hat, b1(k) hat.

$$\Theta(k) = \Theta(k-1) + K\theta(k) \cdot id/e(k) \text{tm} \quad (8)$$

where $K\theta$ represents a cubic vector determined by the following equation (9), i.e., a gain coefficient vector for determining a change depending on the identified error id/e of the identified gain coefficients a1 hat, a2 hat, b1 hat):

$$K\theta(k) = \frac{P(k-1) \cdot \xi(k)}{1 + \xi^T(k) \cdot P(k-1) \cdot \xi(k)} \quad (9)$$

where P represents a cubic square matrix determined by a recursive formula expressed by the following equation (10):

$$P(k) = \frac{1}{\lambda_1(k)} \cdot \left[ I - \frac{\lambda_2(k) \cdot P(k-1) \cdot \xi(k) \cdot \xi^T(k)}{\lambda_1(k) + \lambda_2(k) \cdot \xi^T(k) \cdot P(k-1) \cdot \xi(k)} \right] \cdot P(k-1) \quad (10)$$

where I represents a unit matrix.

In the equation (10), $\lambda_1, \lambda_2$ are established to satisfy the conditions $0 < \lambda_1 \leq 1$ and $0 \leq \lambda_2 < 2$, and an initial value P(0) of P represents a diagonal matrix whose diagonal components are positive numbers.

Depending on how $\lambda_1, \lambda_2$ in the equation (10) are established, any one of various specific algorithms including a fixed gain method, a degressive gain method, a method of weighted least squares, a method of least squares, a fixed tracing method, etc. may be employed. According to the present embodiment, a method of least squares ($\lambda_1 = \lambda_2 = 1$), for example, is employed.

Basically, the identifier 25 sequentially determines in each control cycle the identified gain coefficients a1 hat, a2 hat, b1 hat in order to minimize the identified error id/e according to the above algorithm (calculating operation). Through this operation, it is possible to sequentially obtain the identified gain coefficients a1 hat, a2 hat, b1 hat which match the actual object exhaust system E.

The algorithm described above is the basic algorithm that is carried out by the identifier 25. The identifier 25 performs additional processes such as a limiting process, on the identified gain coefficients a1 hat, a2 hat, b1 hat in order to determine them. Such operations of the identifier 25 will be described later on.

The estimator 26 sequentially determines in each control cycle the estimated differential output VO2 bar which is an estimated value of the differential output VO2 from the $O_2$ sensor 6 after the total dead time d (=d1+d2) in order to compensate for the effect of the dead time d1 of the object exhaust system E and the effect of the dead time d2 of the air-fuel ratio manipulating system for the calculation of the target air-fuel ratio KCMD with the sliding mode controller 27 as described in detail later on. The algorithm for the estimator 26 to determine the estimated differential output VO2 bar is constructed as described below. Since the estimator 26 has no direct bearing on the present invention and its details are disclosed in Japanese patent application No. 10-130864, the estimator 26 will briefly be described below.

If the equation (2) expressing the model of the air-fuel ratio manipulating system is applied to the equation (1) expressing the model of the object exhaust system E, then the equation (1) can be rewritten as the following equation (11):

$$VO2(k+1) = a1 \cdot VO2(k) + a2 \cdot VO2(k-1) + \quad (11)$$
$$b1 \cdot kcmd(k - d1 - d2)$$
$$= a1 \cdot VO2(k) + a2 \cdot VO2(k-1) +$$
$$b1 \cdot kcmd(k - d)$$

The equation (11) expresses a system which is a combination of the object exhaust system E and the air-fuel manipulating system as the model of a discrete time system, regarding such a system as a system for generating the differential output VO2 from the $O_2$ sensor 6 from the target differential air-fuel ratio kcmd via dead time elements of the object exhaust system E and the air-fuel manipulating system and a response delay element of the object exhaust system E.

By using the equation (11), the estimated differential output VO2(k+d) bar which is an estimated value of the differential output VO2(k+d) of the $O_2$ sensor 6 after the total dead time d in each control cycle can be expressed using time-series data VO2(k), VO2(k−1) of the differential output VO2 of the $O_2$ sensor 6 and time-series data kcmd (k−j) (j=1, 2, . . . , d) of the past values of the target differential air-fuel ratio kcmd (=KCMD−FLAF/BASE) which corresponds to the target air-fuel ratio KCMD determined by the sliding mode controller 27 (its specific process of determining the target air-fuel ratio KCMD will be described later on), according to the following equation (12):

$$\overline{VO2}(k+d) = a1 \cdot VO2(k) + a2 \cdot VO2(k-1) + \sum_{j=1}^{d} \beta j \cdot kcmd(k-j) \quad (12)$$

where
$\alpha 1$=the first-row, first-column element of $A^d$,
$\alpha 2$=the first-row, second-column element of $A^d$,
$\beta j$=the first-row elements of $A^{j-1} \cdot B$ $$A = \begin{bmatrix} a1 & a2 \\ 1 & 0 \end{bmatrix}$$
$$B = \begin{bmatrix} b1 \\ 0 \end{bmatrix}$$

In the equation (12), "$\alpha 1$", "$\alpha 2$" represent the first-row, first-column element and the first-row, second-column element, respectively, of the dth power $A^d$ (d: total dead time) of the matrix A defined as described above with respect to the equation (12), and "$\beta j$" (j=1, 2, . . . , d) represents the first-row elements of the product $A^{j-1} \cdot B$ of the (j−1)th power $A^{j-1}$ (j=1, 2, . . . , d) of the matrix A and the vector B defined as described above with respect to the equation (12).

Of the time-series data kcmd(k−j) (j=1, 2, . . . , d) of the past values of the target combined differential air-fuel ratio kcmd according to the equation (12), the time-series data kcmd(k−d2), kcmd(k−d2−1), . . . , kcmd(k−d) from the present prior to the dead time d2 of the air-fuel manipulating system can be replaced respectively with data kact(k), kact(k−1), . . . , kact(k−d+d2) obtained prior to the present time of the differential output kact of the LAF sensor 5 according to the equation (2). When the time-series data are thus replaced, the following equation (13) is obtained:

$$\overline{VO2}(k+d) = a1 \cdot VO2(k) + a2 \cdot VO2(k-1) + \quad (13)$$
$$\sum_{j=1}^{d2-1} \beta j \cdot kcmd(k-j) + \sum_{i=0}^{d-d2} \beta i + d2 \cdot kact(k-i)$$
$$= a1 \cdot VO2(k) + a2 \cdot VO2(k-1) +$$
$$\sum_{j=1}^{d2-1} \beta j \cdot kcmd(k-j) + \sum_{i=0}^{d1} \beta i + d2 \cdot kact(k-i)$$

The equation (13) is a basic formula for the estimator 26 to determine the estimated differential output VO2(k+d) bar. Stated otherwise, the estimator 26 determines, in each control cycle of the exhaust-side control unit 7a, the estimated differential output VO2(k+d) bar of the $O_2$ sensor 6 according to the equation (13), using the time-series data VO2(k), VO2(k−1) of the differential output VO2 of the $O_2$ sensor 6, the time-series data kcmd(k−j) (j=1, . . . , d2−1) of the past values of the target differential air-fuel ratio kcmd which represents the target air-fuel ratio KCMD determined in the past by the sliding mode controller 27, and the time-series data kact(k−i) (i=0, . . . , d1) of the differential output kact of the LAF sensor 5.

In the present embodiment, the values of the coefficients $\alpha 1$, $\alpha 2$, $\beta j$ (j=1, 2, . . . , d) required to calculate the estimated differential output VO2(k+d) bar according to the equation (13) are basically calculated using the identified gain coefficients a1 hat, a2 hat, b1 hat which are the identified values of the gain coefficients a1, a2, b1 (which are elements of the vectors A, B defined with respect to the equation (12)). The values of the dead times d1, d2 required in the equation (13) comprise the preset values as described above.

The estimated differential output VO2(k+d) bar may be determined according to the equation (12) without using the data of the differential output kact of the LAF sensor 5. For increasing the reliability of the estimated differential output VO2(k+d) bar, however, it is preferable to determine the estimated differential output VO2(k+d) bar according to the equation (13) using the data of the differential output kact of the LAF sensor 5 which reflects the actual behavior of the internal combustion engine 1. If the dead time d2 of the air-fuel ratio manipulating system can be set to "1", all the time-series data kcmd(k−j) (j=1, 2, . . . , d) of the past values of the target differential air-fuel ratio kcmd in the equation (12) may be replaced with the time-series data kact(k), kact(k−1), . . . , kact(k−d+d2 ), respectively, prior to the present time of the differential output kact of the LAF sensor 5. In this case, the estimated differential output VO2(k+d) bar can be determined according to the following equation (14) which does not include the data of the target differential air-fuel ratio kcmd:

$$\overline{VO2}(k+d) = a1 \cdot VO2(k) + a2 \cdot VO2(k-1) + \sum_{j=0}^{d-1} \beta j + 1 \cdot kact(k-j) \quad (14)$$

The sliding mode controller 27 will be described in detail below. Since the details of the sliding mode controller 27 are disclosed in Japanese patent application No. 10-130864, the sliding mode controller 27 will briefly be described below.

The sliding mode controller 27 determines an input quantity to be given to the object exhaust-system E (which is specifically a target value for the difference between the output KACT of the LAF sensor 5 (the detected value of the air-fuel ratio) and the reference value FLAF/BASE, which target value is equal to the target differential air-fuel ratio kcmd) (the input quantity will be referred to as "SLD manipulating input Usl") in order to cause the output VO2/OUT of the $O_2$ sensor 6 to settle on the target value VO2/TARGET, i.e., to converge the differential output VO2 of the $O_2$ sensor 6 to "0" according to an adaptive sliding mode control process which incorporates an adaptive control law for minimizing the effect of a disturbance, in a normal sliding mode control process, and determines the target air-fuel ratio KCMD from the determined SLD manipulating input Usl. An algorithm for carrying out the adaptive sliding mode control process is constructed as follows:

The construction of a hyperplane (also referred to as a slip plane) required for the adaptive sliding mode control process carried out by the sliding mode controller 27 will first be described below.

According to a basic concept of the sliding mode control process, the differential output VO2(k) of the $O_2$ sensor 6 obtained in each control cycle and the differential output VO2(k−1) obtained in a preceding control cycle are used as a state quantity to be controlled, and a linear function a (also referred to as a switching function) for defining a hyperplane for the sliding mode control process is defined according to the following equation (15):

$$\sigma(k) = s1 \cdot VO2(k) + s2 \cdot VO2(k-1) \qquad (15)$$
$$= S \cdot X$$

where
S=[s1 s2], $$X = \begin{bmatrix} VO2(k) \\ VO2(k-1) \end{bmatrix}$$

A vector X defined above with respect to the equation (15) as a vector whose elements are represented by the differential outputs VO2(k), VO2(k−1) will hereinafter be referred to as a state quantity X.

The coefficients s1, s2 of the linear function σ is set in order to meet the condition of the following equation (16):

$$-1 < \frac{s2}{s1} < 1 \qquad (16)$$

(when s1=1, −1<s2<1)

In the present embodiment, for the sake of brevity, the coefficient s1 is set to s1=1 (s2/s1=s2), and the coefficient s2 is established to satisfy the condition: −1<s2<1.

Figure 4:
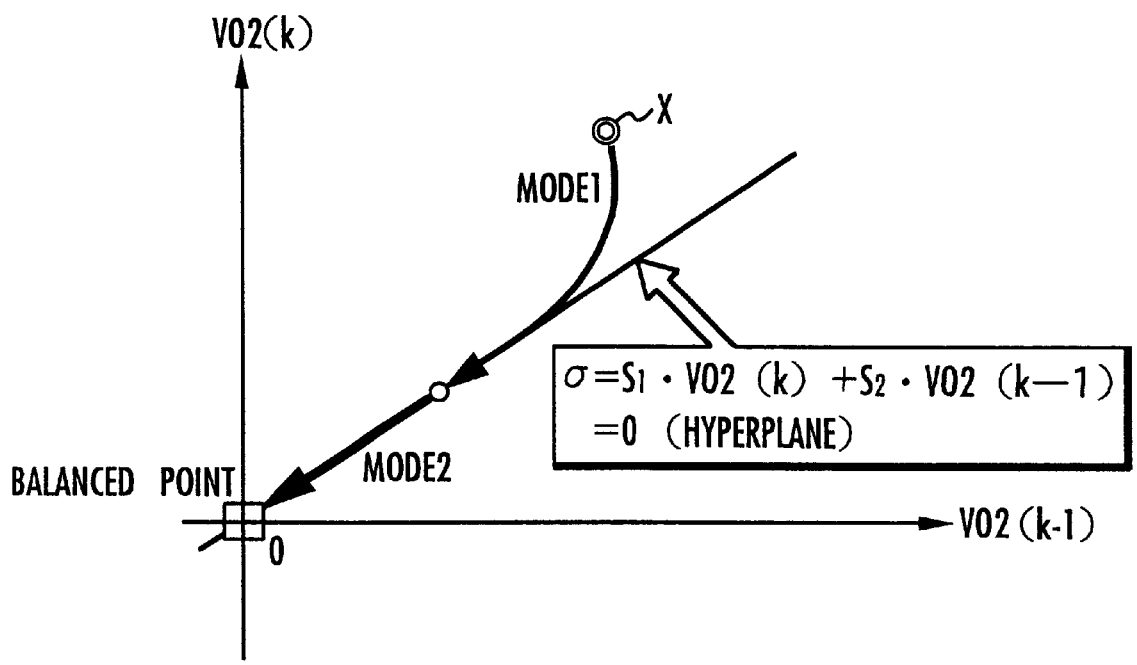
FIG. 4 is a diagram illustrative of a sliding mode control process employed by the system shown in FIG. 1.

With the switching function σ thus defined, the hyperplane for the sliding mode control process is defined by the equation σ=0. Since the state quantity X is of the second degree, the hyperplane σ=0 is represented by a straight line as shown in FIG. 4. At this time, the hyperplane is also called a switching line.

In the present embodiment, the time-series data of the estimated differential output VO2 bar determined by the estimator 24 is actually used as the variable components of the switching function for the sliding mode control process, as described later on.

The adaptive sliding mode control process serves to converge the state quantity X onto the hyperplane σ=0 according to a reaching control law which is a control law for converging the state quantity X (=VO2(k), VO2(k−1)) onto the hyperplane σ=0, and an adaptive control law which is a control law for compensating for the effect of a disturbance in converging the state quantity X onto the hyperplane σ=0 (mode 1 in FIG. 4). While holding the state quantity X onto the hyperplane σ=0 according to an equivalent control input, the state quantity X is converged to a balanced point on the hyperplane σ=0 where VO2(k)=VO2(k−1)=0, i.e., a point where time-series data VO2/OUT(k), VO2/OUT(k−1) of the output VO2/OUT of the $O_2$ sensor 6 are equal to the target value VO2/TARGET (mode 2 in FIG. 4).

The SLD manipulating input Usl (=the target differential air-fuel ratio kcmd) to be generated by the sliding mode controller 27 for converging the state quantity X toward the balanced point on the hyperplane σ=0 is expressed as the sum of an equivalent control input Ueq to be applied to the object exhaust system E according to the control law for converging the state quantity X onto the hyperplane σ=0, an input Urch (hereinafter referred to as "reaching control law input Urch") to be applied to the object exhaust system E according to the reaching control law, and an input Uadp (hereinafter referred to as "adaptive control law Uadp") to be applied to the object exhaust system E according to the adaptive control law (see the following equation (17)).

$$Usl = Ueq + Urch + Uadp \qquad (17)$$

The equivalent control input Ueq, the reaching control law input Urch, and the adaptive control law input Uadp are determined on the basis of the model of the discrete time system expressed by the equation (11), i.e., the model in which the differential output kact(k−d1) of the LAF sensor 5 in the equation (1) is replaced with the target differential air-fuel ratio kcmd(k−d) using the total dead time d, as follows:

The equivalent control input Ueq which is an input component to be applied to the object exhaust system E for converging the state quantity X onto the hyperplane σ=0 is the target differential air-fuel ratio kcmd which satisfies the condition: σ(k+1)=σ(k)=0. Using the equations (11), (15), the equivalent control input Ueq which satisfies the above condition is given by the following equation (18):

$$Ueq(k) = -(S \cdot B)^{-1} \cdot \{S \cdot (A-1)\} \cdot X(k+d) = \frac{-1}{s1b1} \cdot \qquad (18)$$
$$\{[s1 \cdot (a1-1) + s2] \cdot VO2(k+d) + (s1 \cdot a2 - s2) \cdot VO2(k+d-1)\}$$

The equation (18) is a basic formula for determining the equivalent control law input Ueq(k) in each control cycle.

According to the present embodiment, the reaching control law input Urch is basically determined according to the following equation (19):

$$Urch(k) = -(S \cdot B)^{-1} \cdot F \cdot \sigma(k+d) = \frac{-1}{s1b1} \cdot F \cdot \sigma(k+d) \qquad (19)$$

Specifically, the reaching control law input Urch is determined in proportion to the value σ(k+d) of the switching function σ after the total dead time d, in view of the effect of the total dead time d.

The coefficient F in the equation (19) which determines the gain of the reaching control law is established to satisfy the condition expressed by the following equation (20):

$$0 < F < 2 \qquad (20)$$

The value of the linear function a may possibly vary in an oscillating fashion (so-called chattering) with respect to the hyperplane σ=0. In order to suppress such chattering, it is preferable that the coefficient F relative to the reaching control law input Urch be established to further satisfy the condition of the following equation (21):

$$0 < F < 1 \tag{21}$$

The adaptive control law input Uadp is basically determined according to the following equation (22) (ΔT in the equation (22) represents the period of the control cycles of the exhaust-side main processor 13):

$$Uadp(k) = -(S \cdot B)^{-1} \cdot G \cdot \sum_{i=0}^{k+d} (\sigma(i) \cdot \Delta T) = \frac{-1}{s1 \cdot b1} \cdot G \cdot \sum_{i=0}^{k+d} (\sigma(i) \cdot \Delta T) \tag{22}$$

The adaptive control law input Uadp is determined in proportion to an integrated value (which corresponds to an integral of the values of the linear function σ) over control cycles of the product of values of the linear function a until after the total dead time d, in view of the effect of the total dead time d.

The coefficient G (which determines the gain of the adaptive control law) in the equation (22) is established to satisfy the condition of the following equation (23):

$$G = J \cdot \frac{2-F}{\Delta T} \qquad (0 < J < 2) \tag{23}$$

A specific process of deriving conditions for establishing the equations (16), (20), (21), (23) is described in detail in Japanese patent application No. 9-251142, etc., and will not be described in detail below.

In the present embodiment, the sliding mode controller 27 determines the sum (ueq+Urch+Uadp) of the equivalent control input Ueq, the reaching control law input Urch, and the adaptive control law Uadp determined according to the respective equations (18), (19), (22) as the SLD manipulating input Usl to be applied to the object exhaust system E. However, the differential outputs VO2 (K+d), VO2(k+d−1) of the O₂ sensor 6 and the value σ(k+d) of the linear function σ, etc. used in the equations (18), (19), (22) cannot directly be obtained as they are values in the future.

According to the present embodiment, therefore, the sliding mode controller 27 actually uses the estimated differential outputs VO2(k+d) bar, VO2(k+d−1) bar determined by the estimator 26, instead of the differential outputs VO2(K+d), VO2(k+d−1) from the O₂ sensor 6 for determining the equivalent control input Ueq according to the equation (18), and calculates the equivalent control input Ueq in each control cycle according to the following equation (24):

$$Ueq(k) = \frac{-1}{s1 b1} \{[s1 \cdot (a1-1) + s2] \cdot \overline{VO2}(k+d) + (s1 \cdot a2 - s2) \cdot \overline{VO2}(k+d-1)\} \tag{24}$$

According to the present embodiment, furthermore, the sliding mode controller 27 actually uses time-series data of the estimated differential output VO2 bar sequentially determined by the estimator 26 as described above as a state quantity to be controlled, and defines a linear function σ bar according to the following equation (25) (the linear function a bar corresponds to time-series data of the differential output VO2 in the equation (15) which is replaced with time-series data of the estimated differential output VO2 bar), in place of the linear function σ established according to the equation (25):

$$\overline{\sigma(k)} = s1 \cdot \overline{VO2}(k) + s2 \cdot \text{fheight} \overline{VO2}(k-1) \tag{25}$$

The sliding mode controller 27 calculates the reaching control law input Urch in each control cycle according to the following equation (26), using the linear function σ bar represented by the equation (25), rather than the value of the linear function σ for determining the reaching control law input Urch according to the equation (19):

$$Urch(k) = \frac{-1}{s1 \cdot b1} \cdot F \cdot \overline{\sigma}(k+d) \tag{26}$$

Similarly, the sliding mode controller 27 calculates the adaptive control law input Uadp in each control cycle according to the following equation (27), using the value of the linear function a bar represented by the equation (25), rather than the value of the linear function σ for determining the adaptive control law input Uadp according to the equation (22):

$$Uadp(k) = \frac{-1}{s1 \cdot b1} \cdot G \cdot \sum_{i=0}^{k+d} (\overline{\sigma}(i) \cdot \Delta T) \tag{27}$$

The latest identified gain coefficients a1(k) hat, a2(k) hat, b1(k) hat which have been determined by the identifier 25 are basically used as the gain coefficients a1, a1, b1 that are required to calculate the equivalent control input Ueq, the reaching control law input Urch, and the adaptive control law input Uadp according to the equations (24), (26), (27).

The sliding mode controller 27 determines the sum of the equivalent control input Ueq, the reaching control law input Urch, and the adaptive control law input Uadp determined according to the equations (24), (26), (27), as the SLD manipulating input Usl to be applied to the object exhaust system E (see the equation (17)). The conditions for establishing the coefficients s1, s2, F, G used in the equations (24), (26), (27) are as described above.

The above process is a basic algorithm for determining the SLD manipulating input Usl (=target differential air-fuel ratio kcmd) to be applied to the object exhaust system E with the sliding mode controller 27. According to the above algorithm, the SLD manipulating input Usl is determined to converge the estimated differential output VO2 bar from the O₂ sensor 6 toward "0", and as a result, to convert the output VO2/OUT from the O₂ sensor 6 toward the target value VO2/TARGET.

The sliding mode controller 27 eventually sequentially determines the target air-fuel ratio KCMD in each control cycle. The SLD manipulating input Usl determined as described above signifies a target value for the difference between the air-fuel ratio of the exhaust gas detected by the LAF sensor 5 and the reference value FLAF/BASE, i.e., the target differential air-fuel ratio kcmd. Consequently, the sliding mode controller 27 eventually determines the target air-fuel ratio KCMD by adding the reference value FLAF/BASE to the determined SLD manipulating input Usl in each control cycle according to the following equation (28):

$$KCMD(k) = Us1(k) + FLAF/BASE \qquad (28)$$

$$= Ueq(k) + Urch(k) + Uadp(k) + FLAF/BASE$$

The above process is a basic algorithm for determining the target air-fuel ratio KCMD with the sliding mode controller 27 according to the present embodiment.

In the present embodiment, the stability of the adaptive sliding mode control process carried out by the sliding mode controller 27 is checked for limiting the value of the SLD manipulating input Usl. Details of such a checking process will be described later on.

The catalytic converter deterioration decision processor 28 will be described below. Processing details of the catalytic converter deterioration decision processor 28 will be described later on. A basic principle for determining the deteriorated state of the catalytic converter 3 with the catalytic converter deterioration decision processor 28 will be described below.

Various studies conducted by the inventors of the present invention have revealed that the values of the identified gain coefficients a1 hat, a2 hat, b1 hat calculated by the identifier 25 exhibit a characteristic correlation to the deteriorated state of the catalytic converter 3.

Figure 5:
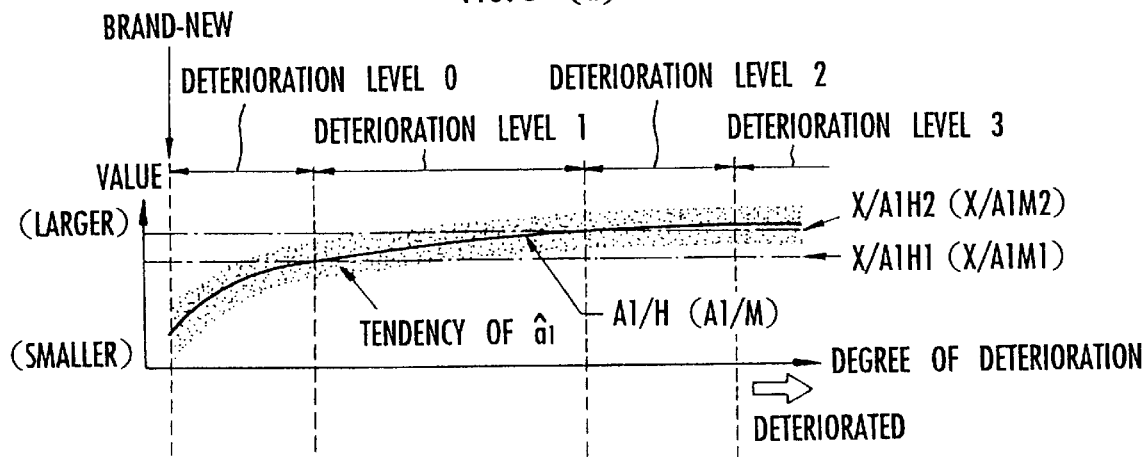
FIGS. 5 and 6 are diagrams illustrative of a process of determining the deteriorated state of a catalytic converter employed by the system shown in FIG. 1.
Figure 5:
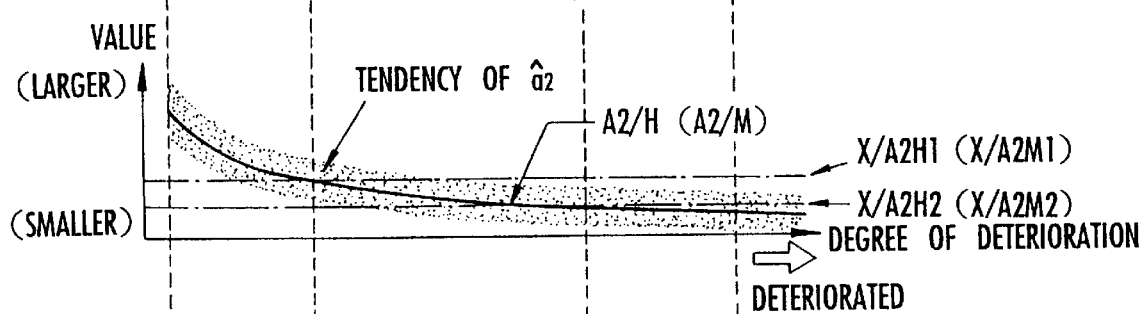
Figure 5:
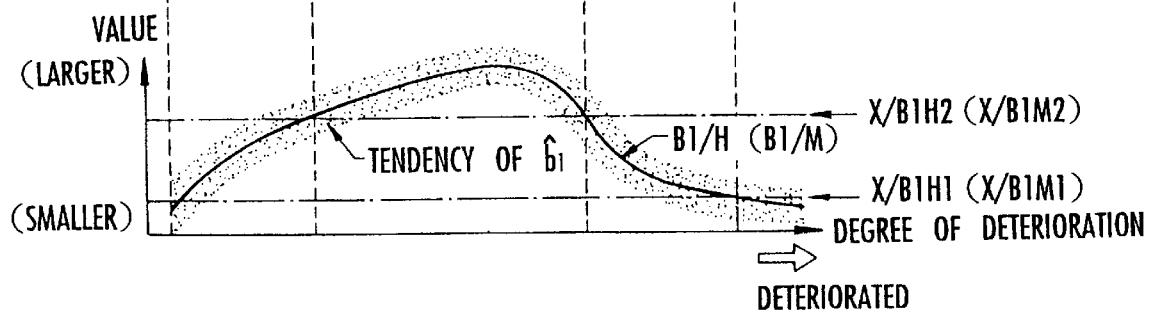

For example, the value of the identified gain coefficient a1 hat basically tends to increase monotonously as the deterioration of the catalytic converter 3 progresses, as indicated by a stippled area in FIG. 5(*a*).

The value of the identified gain coefficient a2 hat basically tends to decrease monotonously as the deterioration of the catalytic converter 3 progresses, as indicated by a stippled area in FIG. 5(*b*).

The value of the identified gain coefficient b1 hat basically tends to increase as the deterioration of the catalytic converter 3 progresses to a certain extent, and thereafter decrease as the deterioration of the catalytic converter 3 progresses, as indicated by a stippled area in FIG. 5(*c*).

If an exhaust system model is constructed such that the polarities (positive or negative) of the terms corresponding to the identified gain coefficients a1 hat, a2 hat, b1 hat on the right side of the equation (1) which expresses the exhaust system model are opposite to those in the present embodiment, then the tendencies of the identified gain coefficients a1 hat, a2 hat, b1 hat to increase and decrease as the deterioration of the catalytic converter 3 progresses are opposite to those described above.

Since the values of the identified gain coefficients a1 hat, a2 hat, b1 hat have a tendency to have a characteristic correlation to the deteriorated state of the catalytic converter 3, it is possible to determine the deteriorated state of the catalytic converter 3 based on the data of the values of the identified gain coefficients a1 hat, a2 hat, b1 hat. This is the basic idea for the determination of the deteriorated state of the catalytic converter 3.

The above tendencies of the values of the identified gain coefficients a1 hat, a2 hat, b1 hat to vary as described above as the deterioration of the catalytic converter 3 progresses. Generally, the values of the identified gain coefficients a1 hat, a2 hat, b1 hat that are sequentially calculated by the identifier 25 suffer certain fluctuations due to the effect of disturbances even if the deteriorated state of the catalytic converter 3 remains the same.

The actual values of the identified gain coefficients a1 hat, a2 hat, b1 hat are somewhat affected by the flow rate of the exhaust gas (the flow rate of the exhaust gas flowing through the catalytic converter 3) from the internal combustion engine 1 at the time the values of the identified gain coefficients a1 hat, a2 hat, b1 hat are calculated.

Figure 6:
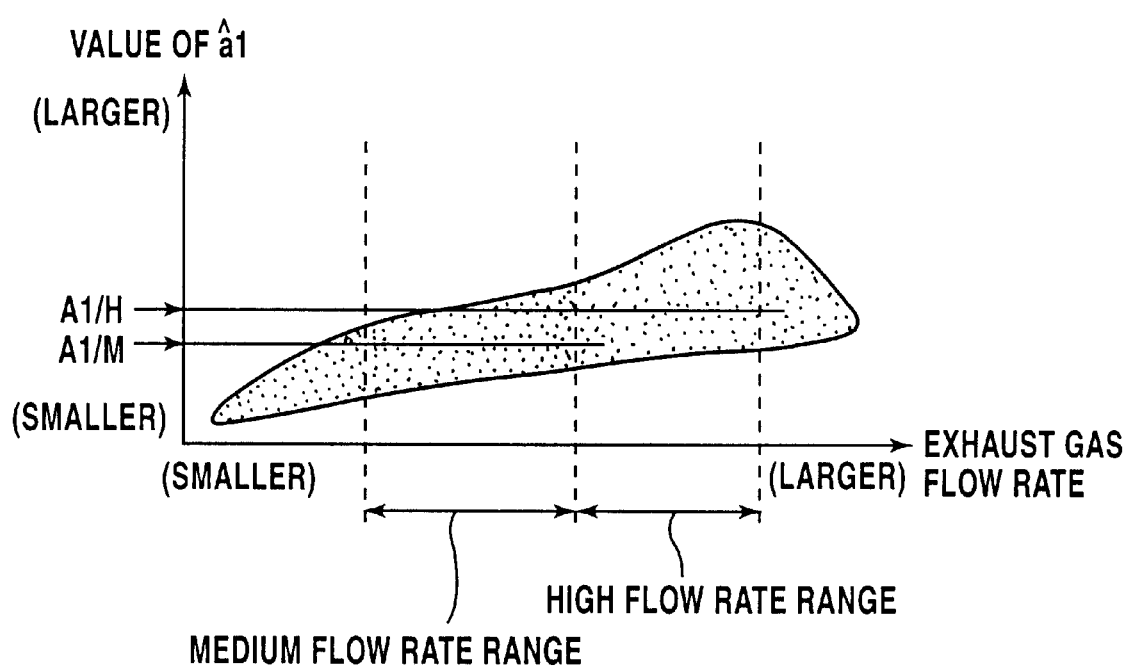

Specifically, when the identified gain coefficients a1 hat, a2 hat, b1 hat are sequentially calculated by the identifier 25 while the flow rate of the exhaust gas from the internal combustion engine 1 is being varied at a certain deteriorated state of the catalytic converter 3, the data of the value of the identified gain coefficient a1 hat, for example, has a distribution expressed by a stippled range in FIG. 6. The magnitude of the value of the identified gain coefficient a1 hat has fluctuations at each flow rate of the exhaust gas and tends to be varied by the flow rate of the exhaust gas. This holds true for the other identified gain coefficients a2 hat, b1 hat.

The value of the identified gain coefficient a1 hat tends to become larger as the flow rate of the exhaust gas is higher, and the value of the identified gain coefficient a2 hat tends to become smaller as the flow rate of the exhaust gas is higher. The value of the identified gain coefficient b1 hat tends to become larger as the flow rate of the exhaust gas is higher.

In view of the above tendencies, the catalytic converter deterioration decision processor 28 performs a filtering process (statistic process) according to a sequential method of least squares on the data of each of the values of the identified gain coefficients a1 hat, a2 hat, b1 hat that are sequentially calculated by the identifier 25, for thereby determining a central value of the least square of the data of each of the identified gain coefficients a1 hat, a2 hat, b1 hat. For determining such a central value of the least square, the flow rate of the exhaust gas that flows through the catalytic converter 3 upon operation of the internal combustion engine 1 is classified in a high flow rate range where the flow rate of the exhaust gas is relatively high, and a medium flow rate range where the flow rate of the exhaust gas is medium, as shown in FIG. 6. A central value of the least square of the data of each of the identified gain coefficients a1 hat, a2 hat, b1 hat is determined in each of those flow rate ranges.

Stated otherwise, if the flow rate of the exhaust gas flowing through the catalytic converter 3 is in the high flow rate range, then the catalytic converter deterioration decision processor 28 determines a central value of the least square of the data of each of the identified gain coefficients a1 hat, a2 hat, b1 hat that are sequentially calculated by the identifier 25, and if the flow rate of the exhaust gas flowing through the catalytic converter 3 is in the medium flow rate range, then the catalytic converter deterioration decision processor 28 also determines a central value of the least square of the data of each of the identified gain coefficients a1 hat, a2 hat, b1 hat that are sequentially calculated by the identifier 25.

The catalytic converter deterioration decision processor 28 actually determines the deteriorated state of the catalytic converter 3 using the central value of the least square determined, in each of the flow rate ranges, of the data of each of the identified gain coefficients a1 hat, a2 hat, b1 hat, as deterioration determining data.

The deterioration determining data (central values of the least squares) determined in the respective high and low flow rate ranges with respect to the identified gain coefficient a1 hat are denoted by A1/H and A1/M, respectively. The deterioration determining data (central values of the least squares) determined in the respective high and low flow rate ranges with respect to the identified gain coefficient a2 hat are denoted by A2/H and A2/M, respectively. The deterioration determining data (central values of the least squares) determined in the respective high and low flow rate ranges with respect to the identified gain coefficient b1 hat are denoted by B1/H and B1/M, respectively.

A specific process of calculating the above deterioration determining data A1/H, A1/M, A2/H, A2/M, B1/H, B1/M will be described later on. These deterioration determining data A1H, A1/M, A2/H, A2/M, B1/H, B1/M have a more distinct correlation to the deteriorated state of the catalytic converter 3.

Specifically, the value of the deterioration determining data A1/H or A1/M relative to the identified gain coefficient a1 hat is correlated to the degree of deterioration (deteriorated state) of the catalytic converter 3 as indicated by the curve shown in FIG. 5($a$), distinctly representing the above tendency (see the stippled area shown in FIG. 5($a$)) with respect to the value of the identified gain coefficient a1 hat.

In FIG. 5($a$), the characteristics of changes of the deterioration determining data A1/H, A1/M with respect to the degree of deterioration of the catalytic converter 3 are expressed by a common curve for illustrative purposes. However, because the value of the identified gain coefficient a1 hat tends to increase as the flow rate of the exhaust gas is higher, as described above, the value of the deterioration determining data A1/H in the high flow rate range is actually slightly greater than the value of the deterioration determining data A1/M in the medium flow rate range at each degree of deterioration of the catalytic converter 3.

Similarly, the value of the deterioration determining data A2/H or A2/M relative to the identified gain coefficient a2 hat is correlated to the degree of deterioration of the catalytic converter 3 as indicated by the curve shown in FIG. 5($b$), distinctly representing the above tendency (see the stippled area shown in FIG. 5($b$)) with respect to the value of the identified gain coefficient a2 hat.

In FIG. 5($b$), the characteristics of changes of the deterioration determining data A2/H, A2/M with respect to the degree of deterioration of the catalytic converter 3 are expressed by a common curve for illustrative purposes. However, because the value of the identified gain coefficient a2 hat tends to decrease as the flow rate of the exhaust gas is higher, as described above, the value of the deterioration determining data A2/H in the high flow rate range is actually slightly smaller than the value of the deterioration determining data A2/M in the medium flow rate range at each degree of deterioration of the catalytic converter 3.

Furthermore, the value of the deterioration determining data B1/H or B1/M relative to the identified gain coefficient b1 hat is correlated to the degree of deterioration of the catalytic converter 3 as indicated by the curve shown in FIG. 5($c$), distinctly representing the above tendency (see the stippled area shown in FIG. 5($c$)) with respect to the value of the identified gain coefficient b1 hat.

In FIG. 5($c$), the characteristics of changes of the deterioration determining data B1/H, B1/M with respect to the degree of deterioration of the catalytic converter 3 are expressed by a common curve for illustrative purposes. However, because the value of the identified gain coefficient b1 hat tends to increase as the flow rate of the exhaust gas is higher, as described above, the value of the deterioration determining data B1/H in the high flow rate range is actually slightly greater than the value of the deterioration determining data B1/M in the medium flow rate range.

As described above, the deterioration determining data A1/H, A1/M, A2/H, A2/M, B1/H, B1/M have a distinct and characteristic correlation to the deteriorated state (degree of deterioration) of the catalytic converter 3.

The catalytic converter deterioration decision processor 28 determines the deteriorated state of the catalytic converter 3 using the deterioration determining data A1/H, A1/M, A2/H, A2/M, B1/H, B1/M.

The process of determining the deteriorated state of the catalytic converter 3 with the catalytic converter deterioration decision processor 28 has briefly been described above.

In the present embodiment, the deteriorated state of the catalytic converter 3 is determined by being classified in degrees of deterioration in levels 0–3, as shown in FIGS. 5($a$)–5($c$), according to a process which will specifically be described later on. As the level of the degree of deterioration (hereinafter referred to as a deterioration level) is higher, it signifies the deterioration in greater progress.

The general feedback controller 15 of the engine-side control unit 7$b$, particularly, the adaptive controller 18, will further be described below.

In FIG. 1, the general feedback controller 15 effects a feedback control process to converge the output KACT (the detected value of the air-fuel ratio) from the LAF sensor 5 toward the target air-fuel ratio KCMD as described above. If such a feedback control process were carried out under the known PID control only, it would be difficult keep stable controllability against dynamic behavioral changes including changes in the operating conditions of the internal combustion engine 1, characteristic changes due to aging of the internal combustion engine 1, etc.

Figure 7:
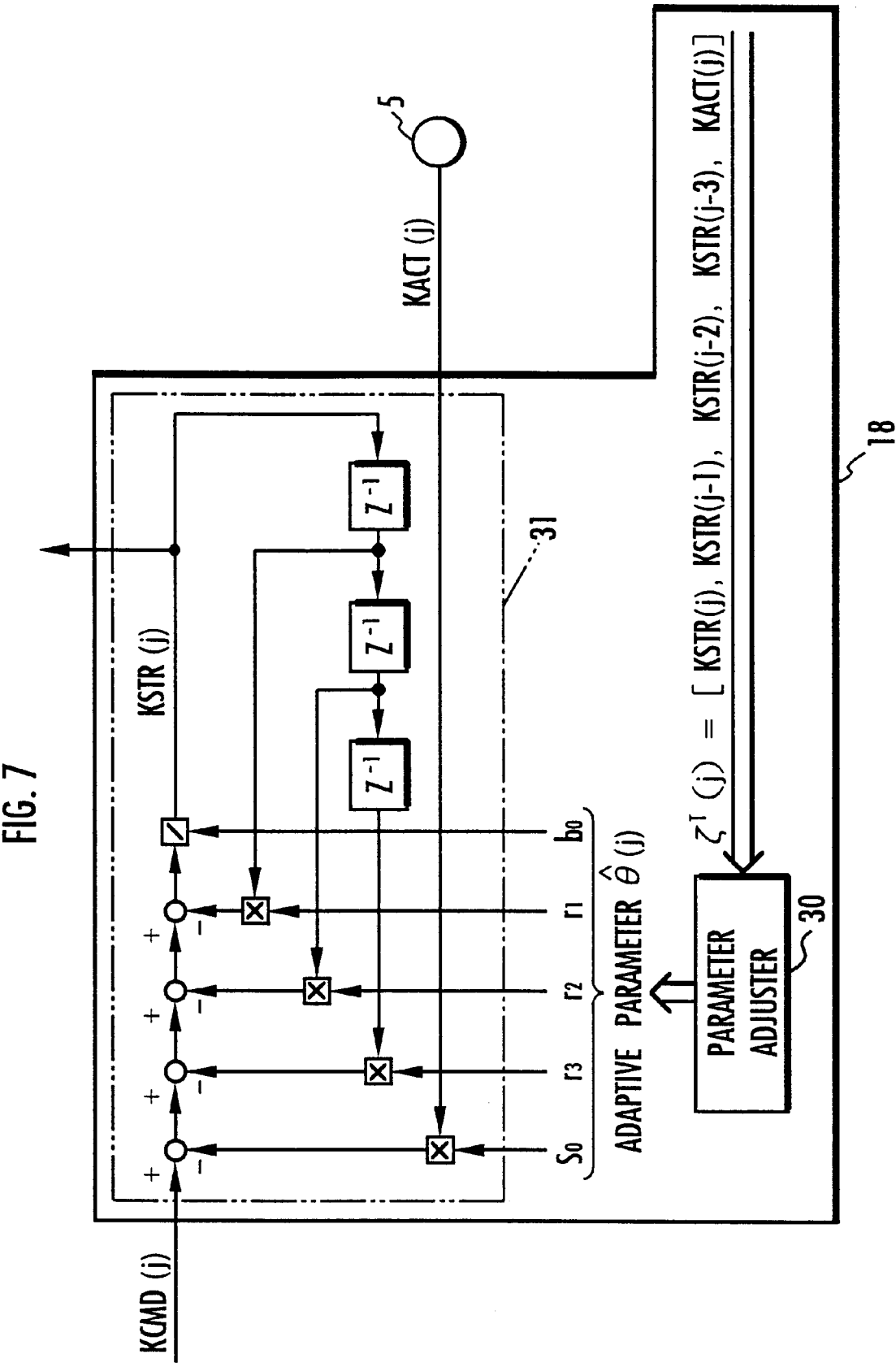
FIG. 7 is a block diagram of an adaptive controller employed in the system shown in FIG. 1.

The adaptive controller 18 is a recursive-type controller which makes it possible to carry out a feedback control process while compensating for dynamic behavioral changes of the internal combustion engine 1. As shown in FIG. 7, the adaptive controller 18 comprises a parameter adjuster 30 for establishing a plurality of adaptive parameters using the parameter adjusting law proposed by I. D. Landau, et al., and a manipulated variable calculator 31 for calculating the feedback manipulated variable KSTR using the established adaptive parameters.

The parameter adjuster 30 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (29), (30), given below, an adaptive parameter θ hat (j) (j indicates the ordinal number of a control cycle) established by the parameter adjuster 30 is represented by a vector (transposed vector) according to the equation (31) given below. An input ζ(j) to the parameter adjuster 30 is expressed by the equation (32) given below. In the present embodiment, it is assumed that the internal combustion engine 1, which is an object to be controlled by the general feedback controller 15, is considered to be a plant of a first-order system having a dead time dp corresponding to the time of three combustion cycles of the internal combustion engine 1, and m=n=1, dp=3 in the equations (29)–(32), and five adaptive parameters s0, r1, r2, r3, b0 are established (see FIG. 7). In the upper and middle expressions of the equation (32), us, ys generally represent an input (manipulated variable) to the object to be controlled and an output (controlled variable) from the object to be controlled. In the present embodiment, the input is the feedback manipulated variable KSTR and the output from the object (the internal combustion engine 1) is the output KACT (detected air-fuel ratio) from the LAF sensor 5, and the input ζ(j) to the parameter adjuster 30 is expressed by the lower expression of the equation (32) (see FIG. 7).

$$A(Z^{-1})=1+a1Z^{-1}+ \ldots +anZ^{-n} \quad (29)$$

$$B(Z^{-1})=b0+b1Z^{-1}+ \ldots +bmZ^{-m} \quad (30)$$

$$\hat{\theta}^T(j) = [\hat{b0}(j), \hat{BR}(Z^{-1}, j), \hat{S}(Z^{-1}, j)] \quad (31)$$
$$= [b0(j), r1(j), \ldots, rm+dp-1(j), s0(j), \ldots, sn-1(j)]$$
$$= [b0(j), r1(j), r2(j), r3(j), s0(j)]$$

$$\zeta^T(j) = [us(j), \ldots, us(j-m-dp+1), ys(j), \ldots, ys(j-n+1)] \quad (32)$$
$$= [us(j), us(j-1), us(j-2), us(j-3), ys(j)]$$
$$= [KSTR(j), KSTR(j-1), KSTR(j-2), KSTR(j-3), KACT(j)]$$

The adaptive parameter θ hat expressed by the equation (31) is made up of a scalar quantity element b0 hat (j) for determining the gain of the adaptive controller 18, a control element BR hat ($Z^{-1}$, j) expressed using a manipulated variable, and a control element S ($Z^{-1}$, j) expressed using a controlled variable, which are expressed respectively by the following equations (33)~(35) (see the block of the manipulated variable calculator 31 shown in FIG. 7):

$$\hat{b0}^{-1}(j) = \frac{1}{b0} \quad (33)$$

$$\hat{BR}(Z^{-1}, j) = r1Z^{-1} + r2Z^{-2} + \ldots + rm+dp-1Z^{-(n+dp-1)} \quad (34)$$
$$= r1Z^{-1} + r2Z^{-2} + r3Z^{-3}$$

$$\hat{S}(Z^{-1}, j) = s0 + s1Z^{-1} + \ldots + sn-1Z^{-(n-1)} \quad (35)$$
$$= s0$$

The parameter adjuster 30 establishes coefficients of the scalar quantity element and the control elements, described above, and supplies them as the adaptive parameter θ hat expressed by the equation (31) to the manipulated variable calculator 31. The parameter adjuster 30 calculates the adaptive parameter θ hat so that the output KACT from the LAF sensor 5 will agree with the target air-fuel ratio KCMD, using time-series data of the feedback manipulated variable KSTR from the present to the past and the output KACT from the LAF sensor 5.

Specifically, the parameter adjuster 30 calculates the adaptive parameter θ hat according to the following equation (36):

$$\hat{\theta}(j) = \hat{\theta}(j-1) + \Gamma(j-1) \cdot \zeta(j-dp) \cdot e^*(j) \quad (36)$$

where Γ(j) represents a gain matrix (whose degree is indicated by m+n+dp) for determining a rate of establishing the adaptive parameter θ hat, and e*(j) an estimated error of the adaptive parameter θ hat. Γ(j) and e*(j) are expressed respectively by the following recursive formulas (37), (38):

$$\Gamma(j) = \quad (37)$$
$$\frac{1}{\lambda 1(j)} \cdot \left[ \Gamma(j-1) - \frac{\lambda 2(j) \cdot \Gamma(j-1) \cdot \zeta(j-dp) \cdot \zeta^T(j-dp) \cdot \Gamma(j-1)}{\lambda 1(j) + \lambda 2(j) \cdot \zeta^T(j-dp) \cdot \Gamma(j-1) \cdot \zeta(j-dp)} \right]$$

where $0 < \lambda 1(j) \leq 1$, $0 \leq \lambda 2(j) < 2$, $\Gamma(0) > 0$.

$$e^*(j) = \frac{D(Z^{-1}) \cdot KACT(j) - \hat{\theta}^T(j-1) \cdot \zeta(j-dp)}{1 + \zeta^T(j-dp) \cdot \Gamma(j-1) \cdot \zeta(j-dp)} \quad (38)$$

where $D(Z^{-1})$ represents an asymptotically stable polynomial for adjusting the convergence. In the present embodiment, $D(Z^{-1}) = 1$.

Various specific algorithms including the degressive gain algorithm, the variable gain algorithm, the fixed tracing algorithm, and the fixed gain algorithm are obtained depending on how λ1(j), λ2(j) in the equation (37) are selected. For a time-dependent plant such as a fuel injection process, an air-fuel ratio, or the like of the internal combustion engine 1, either one of the degressive gain algorithm, the variable gain algorithm, the fixed gain algorithm, and the fixed tracing algorithm is suitable.

Using the adaptive parameter θ hat (s0, r1, r2, r3, b0) established by the parameter adjuster 30 and the target air-fuel ratio KCMD determined by the exhaust-side main processor 13, the manipulated variable calculator 31 determines the feedback manipulated variable KSTR according to a recursive formula expressed by the following equation (39):

$$KSTR = \frac{KCMD(j) - s0 \cdot KACT(j) - r1 \cdot KSTR(j-1) - r2 \cdot KSTR(j-2) - r3 \cdot KSTR(j-3)}{b0} \quad (39)$$

The manipulated variable calculator 31 shown in FIG. 7 represents a block diagram of the calculations according to the equation (39).

The feedback manipulated variable KSTR determined according to the equation (39) becomes the target air-fuel ratio KCMD insofar as the output KACT of the LAF sensor 5 agrees with the target air-fuel ratio KCMD. Therefore, the feedback manipulated variable KSTR is divided by the target air-fuel ratio KCMD by the divider 19 for thereby determining the feedback manipulated variable kstr that can be used as the feedback correction coefficient KFB.

As is apparent from the foregoing description, the adaptive controller 18 thus constructed is a recursive-type controller taking into account dynamic behavioral changes of the internal combustion engine 1 which is an object to be controlled. Stated otherwise, the adaptive controller 18 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 18 constructed as described above is suitable for compensating for dynamic behavioral changes of the internal combustion engine 1.

The details of the adaptive controller 18 have been described above.

The PID controller 17, which is provided together with the adaptive controller 18 in the general feedback controller 15, calculates a proportional term (P term), an integral term (I term), and a derivative term (D term) from the difference between the output KACT of the LAF sensor 5 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 5 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed NE and intake pressure PB of the internal combustion engine 1 using a predetermined map.

The switcher 20 of the general feedback controller 15 outputs the feedback manipulated variable KLAF determined by the PID controller 17 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 5 is not reliable due to a response delay of the LAF sensor 5 as when the target air-fuel ratio KCMD changes largely or immediately after the air-fuel ratio feedback control process has started, or if the internal combustion engine 1 operates highly stably as when it is idling and hence no high-gain control process by the adaptive controller 18 is required. Otherwise, the switcher 20 outputs the feedback manipulated variable kstr which is produced by dividing the feedback manipulated variable KSTR determined by the adaptive controller 18 by the target air-fuel ration KCMD, as the feedback correction coefficient KFB for correcting the fuel injection quantity. This is because the adaptive controller 18 effects a high-gain control process and functions to converge the output KACT of the LAF sensor 5 quickly toward the target air-fuel ratio KCMD, and if the feedback manipulated variable KSTR determined by the adaptive controller 18 is used when the combustion in the internal combustion engine 1 is unstable or the output KACT of the LAF sensor 5 is not reliable, then the air-fuel ratio control process tends to be unstable.

Such operation of the switcher 20 is disclosed in detail in Japanese laid-open patent publication No. 8-105345, and will not be described in detail below.

Operation of the entire system according to the present embodiment will be described below.

First, control cycles of the processing sequence carried out by the control unit 7 will be described below. The process of controlling the air-fuel ratio of the internal combustion engine 1, i.e., the process of adjusting the fuel injection quantity, needs to be in synchronism with the rotational speed of the internal combustion engine 1. Therefore, the processing sequence carried out by the engine-side control unit 7b is performed in control cycles in synchronism with the crankshaft angle period (so-called TDC) of the internal combustion engine 1. The output data from various sensors including the LAF sensor 5 and the $O_2$ sensor 6 are also read in control cycles in synchronism with the crankshaft angle period (so-called TDC).

It is preferable that the process performed by the exhaust-side control unit 7a for calculating the target air-fuel ratio KCMD and determining the deteriorated state of the catalytic converter 3 be carried out in control cycles of a constant period in view of the dead time present in the catalytic converter 3, calculating loads, etc. In the present embodiment, the above process of the exhaust-side control unit 7a is carried out in control cycles of a constant period (e.g., 30–100 ms).

The constant period may be determined depending on the type, reaction rate, volume, etc. of the catalytic converter 3 to be controlled. In the present embodiment, the time interval of the above constant period is selected to be greater than the time interval of the crankshaft angle period (TDC) in a general operating state, i.e., at a general rotational speed of the internal combustion engine 1.

Figure 8:
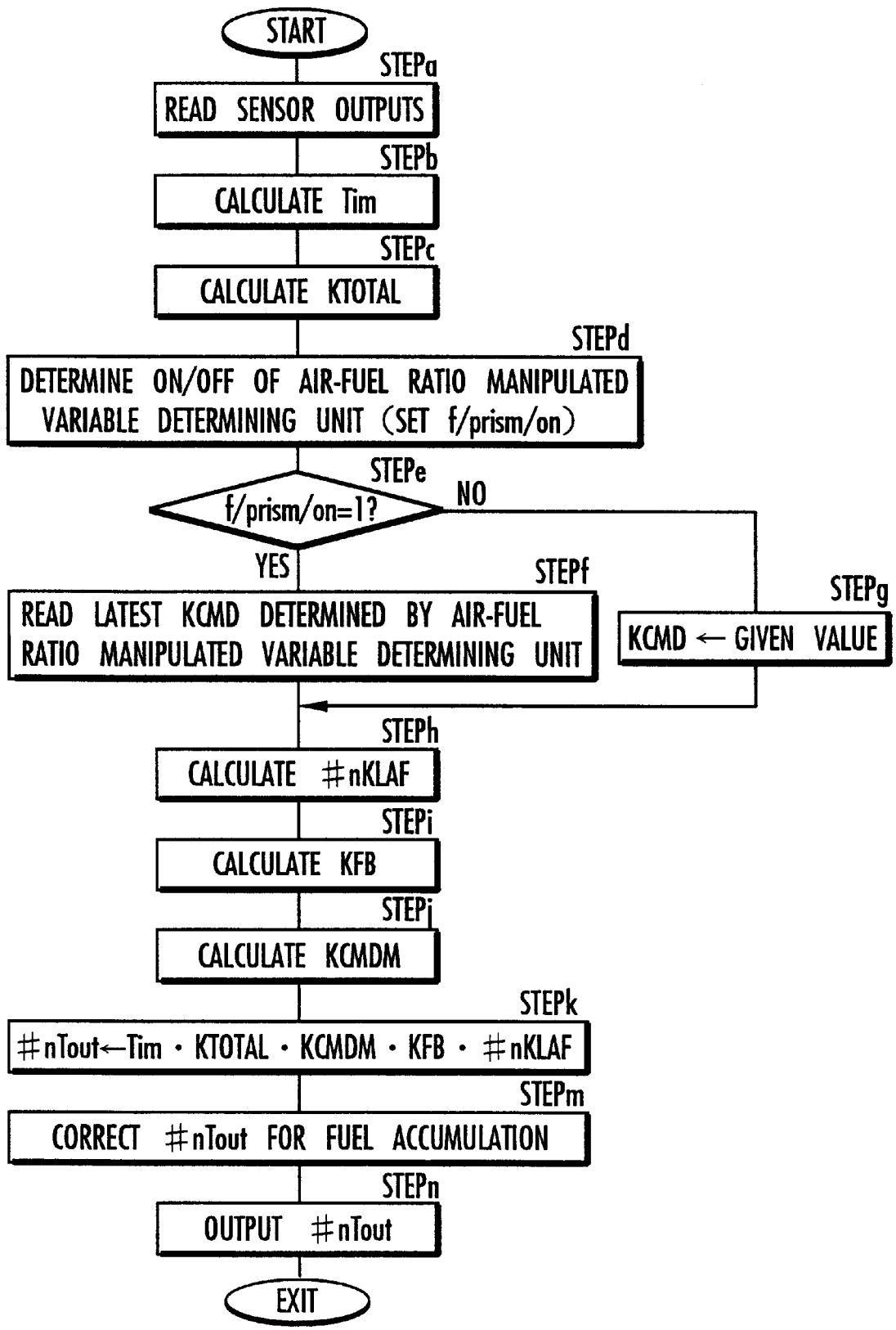
FIG. 8 is a flowchart of a process of controlling fuel in an internal combustion engine with the system shown in FIG. 1.

First, a process, carried out by the engine-side control unit 7b, of calculating an output fuel injection quantity #nTout (n=1, 2, 3, 4) for each of the cylinders of the internal combustion engine 1 for controlling the air-fuel ratio of the internal combustion engine 1 will be described below with reference to FIG. 8. The engine-side control unit 7b calculates an output fuel injection quantity #nTout (n=1, 2, 3, 4) for each of the cylinders in synchronism with, a crankshaft angle period (TDC) of the internal combustion engine 1 as follows:

In FIG. 8, the engine-side control unit 7b reads outputs from various sensors including the LAF sensor 5 and the $O_2$ sensor 6 in STEPa. At this time, the output KACT of the LAF sensor 5 and the output VO2/OUT of the $O_2$ sensor 6, including data obtained in the past, are stored in a time-series fashion in a memory (not shown).

Then, the basic fuel injection quantity calculator 8 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 9 calculates a first correction coefficient KTOTAL depending on the coolant temperature and the amount by which the canister is purged in STEPc.

The engine-side control unit 7b decides whether the target air-fuel ratio KCMD generated by the exhaust-side main processor 13 is to be used or not, i.e., determines ON/OFF of the exhaust-side main processor 13, and sets a value of a flag f/prism/on which represents ON/OFF of the exhaust-side main processor 13 in STEPd. When the value of the flag f/prism/on is "0", it means that the target air-fuel ratio KCMD generated by the exhaust-side main processor 13 is not to be used (OFF), and when the value of the flag f/prism/on is "1", it means that the target air-fuel ratio KCMD generated by the exhaust-side main processor 13 is to be used (ON).

In the above deciding step, activated states of the $O_2$ sensor 6 and the LAF sensor 5 and an operating state (operating mode) of the internal combustion engine 1 are determined. If these states satisfy given conditions, then the value of the flag f/prism/on is set to "1" in order to use the target air-fuel ratio KCMD generated by the exhaust-side main processor 13 for controlling the supply of fuel to the internal combustion engine 1. If the above states do not satisfy given conditions, e.g., if the $O_2$ sensor 6 or the LAF sensor 5 is not sufficiently activated, or the supply of fuel to the internal combustion engine 1 is being cut off, then the value of the flag f/prism/on is set to "0". Basically, the value of the flag f/prism/on is set to "1" while the internal combustion engine 1 is normally operating.

After the value of the flag f/prism/on has been set, the engine-side control unit 7b determines the value of the flag f/prism/on in STEPe. If f/prism/on=1, then the engine-side control unit 7b reads the target air-fuel ratio KCMD generated by the exhaust-side main processor 13 in STEPf. If f/prism/on=0, then the engine-side control unit 7b sets the target air-fuel ratio KCMD to a predetermined value in STEPg. The predetermined value to be established as the target air-fuel ratio KCMD is determined from the rotational speed NE and intake pressure PB of the internal combustion engine 1 using a predetermined map, for example.

In the local feedback controller 16, the PID controllers 22 calculate respective feedback correction coefficients nKLAF in order to eliminate variations between the cylinders, based on actual air-fuel ratios #nA/F of the respective cylinders which have been estimated from the output KACT of the LAF sensor 5 by the observer 21, in STEPh. Then, the general feedback controller 15 calculates a feedback correction coefficient KFB in STEPi.

Depending on the operating conditions of the internal combustion engine 1, the switcher 20 selects either the feedback manipulated variable KLAF determined by the PID controller 17 or the feedback manipulated variable kstr which has been produced by dividing the feedback manipulated variable KSTR determined by the adaptive controller 18 by the target air-fuel ratio KCMD (normally, the switcher 20 selects the feedback manipulated variable kstr). The switcher 20 then outputs the selected feedback manipulated variable KLAF or kstr as a feedback correction coefficient KFB for correcting the fuel injection quantity.

When switching the feedback correction coefficient KFB from the feedback manipulated variable KLAF from the PID controller 17 to the feedback manipulated variable kstr from the adaptive controller 18, the adaptive controller 18 determines a feedback manipulated variable KSTR in a manner to hold the correction coefficient KFB to the preceding correction coefficient KFB (=KLAF) as long as in the control cycle for the switching. When switching the feedback correction coefficient KFB from the feedback manipulated variable kstr from the adaptive controller 18 to the feedback manipulated variable KLAF from the PID controller 17, the PID controller 17 calculates a present correction coefficient KLAF in a manner to regard the feedback manipulated variable KLAF determined by itself in the preceding cycle time as the preceding correction coefficient KFB (=kstr).

After the feedback correction coefficient KFB has been calculated, the second correction coefficient calculator 10 calculates in STEPj a second correction coefficient KCMDM depending on the target air-fuel ratio KCMD determined in STEPf or STEPg.

Then, the engine-side control unit 7b multiplies the basic fuel injection quantity Tim determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation corrector 23 in STEPm. The corrected output fuel injection quantities #nTout are applied to the non-illustrated fuel injectors of the internal combustion engine 1 in STEPn.

In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycle times synchronous with the crankshaft angle period of the internal combustion engine 1 for controlling the air-fuel ratio of the internal combustion engine 1 in order to converge the output KACT of the LAF sensor 5 (the detected air-fuel ratio) toward the target air-fuel ratio KCMD. While the feedback manipulated variable kstr from the adaptive controller 18 is being used as the feedback correction coefficient KFB, the output KACT of the LAF sensor 5 is quickly converged toward the target air-fuel ratio KCMD with high stability against behavioral changes such as changes in the operating conditions of the internal combustion engine 1 or characteristic changes thereof. A response delay of the internal combustion engine 1 is also appropriately compensated for.

Figure 9:
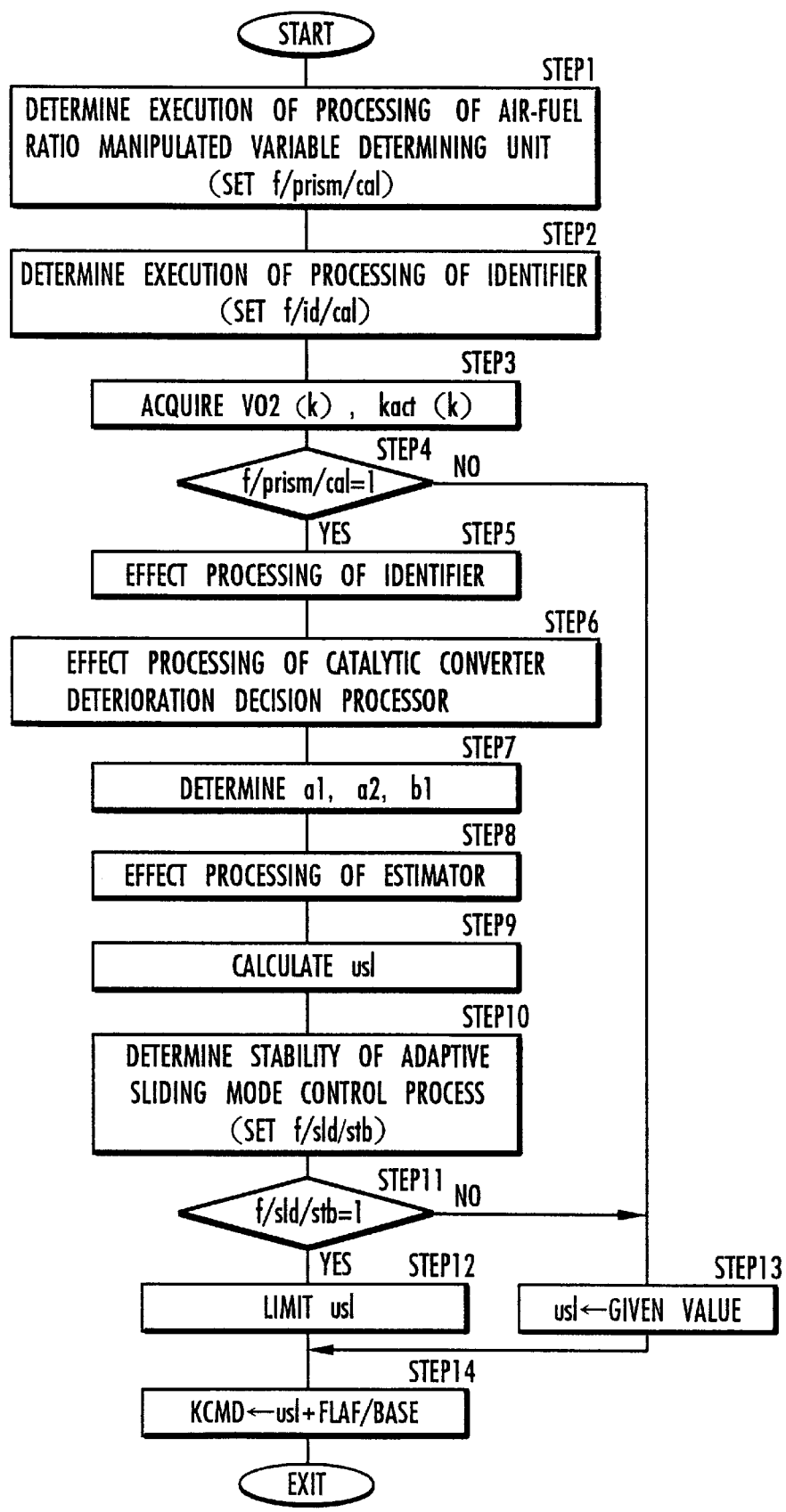
FIG. 9 is a flowchart of a main routine of an exhaust-side main processor of the system shown in FIG. 1.

Concurrent with the above control for the internal combustion engine 1, the exhaust-side main processor 13 executes a main routine shown in FIG. 9 in control cycles of a constant period.

As shown in FIG. 9, the exhaust-side main processor 13 decides whether the processing thereof (the processing of the identifier 25, the estimator 26, the sliding mode controller 27, and the catalytic converter deterioration decision processor 28) is to be executed or not, and sets a value of a flag f/prism/cal indicative of whether the processing is to be executed or not in STEP1. When the value of the flag f/prism/cal is "0", it means that the processing of the exhaust-side main processor 13 is not to be executed, and when the value of the flag f/prism/cal is "1", it means that the processing of the exhaust-side main processor 13 is to be executed.

Figure 10:
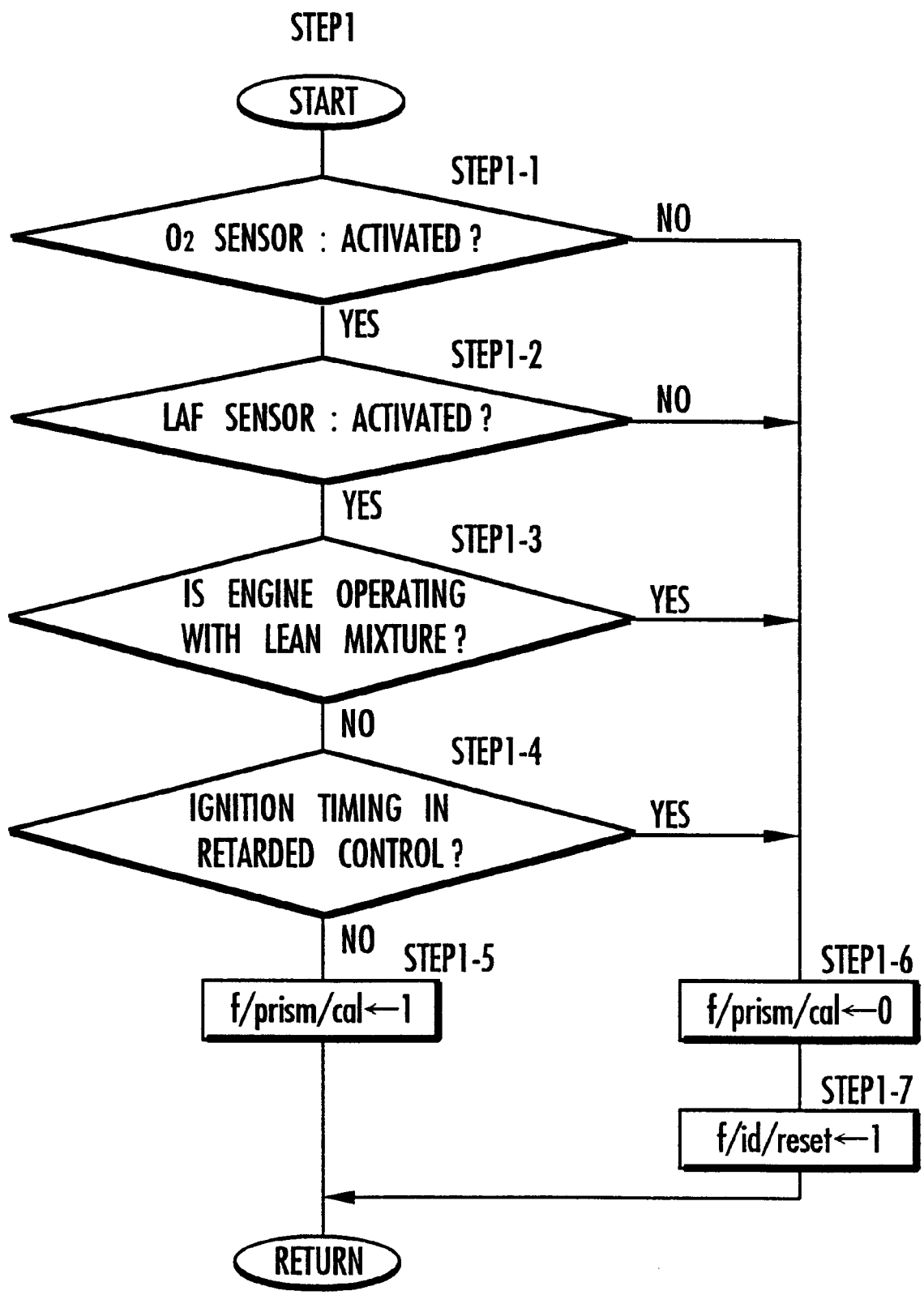
FIGS. 10 through 12 are flowcharts of subroutines of the main routine shown in FIG. 9.

The deciding subroutine in STEP1 is shown in detail in FIG. 10. As shown in FIG. 10, the exhaust-side main processor 13 decides whether the $O_2$ sensor 6 and the LAF sensor 5 are activated or not respectively in STEP1-1, STEP1-2. If neither one of the $O_2$ sensor 6 and the LAF sensor 5 is activated, since detected data from the $O_2$ sensor 6 and the LAF sensor 5 for use by the exhaust-side main processor 13 are not accurate enough, the value of the flag f/prism/cal is set to "0" in STEP1-6. Then, in order to initialize the identifier 25 as described later on, the value of a flag f/id/reset indicative of whether the identifier 25 is to be initialized or not is set to "1" in STEP1-7. When the value of the flag f/id/reset is "1", it means that the identifier 25 is to be initialized, and when the value of the flag f/id/reset is "0", it means that the identifier 25 is not to be initialized.

The exhaust-side main processor 13 decides whether the internal combustion engine 1 is operating with a lean air-fuel mixture or not in STEP1-3. The exhaust-side main processor 13 decides whether the ignition timing of the internal combustion engine 1 is retarded for early activation of the catalytic converter 3 immediately after the start of the internal combustion engine 1 or not in STEP1-4. If the conditions of these steps are satisfied, then since the target air-fuel ration KCMD calculated to adjust the output VO2/OUT of the $O_2$ sensor 6 to the target value VO2/TARGET is not used for the fuel control for the internal combustion engine 1, the value of the flag f/id/cal is set to "0" in STEP1-6, and the value of the flag f/id/reset is set to "1" in order to initialize the identifier 25 in STEP1-7. However, if the ignition timing of the internal combustion engine 1 is not retarded for early activation of the catalytic converter 3 after the start of the internal combustion engine, the f/prism/cal is set to "1" as indicated in STEP1-5.

In FIG. 9, after the above deciding subroutine, the exhaust-side main processor 13 decides whether a process of identifying (updating) the gain coefficients a1, a1, b1 with the identifier 25 is to be executed or not, and sets a value of a flag f/id/cal indicative of whether the process of identifying (updating) the gain coefficients a1, a1, b1 is to be executed or not in STEP2. When the value of the flag f/id/cal is "0", it means that the process of identifying (updating) the gain coefficients a1, a1, b1 is not to be executed, and when the value of the flag f/id/cal is "1", it means that the process of identifying (updating) the gain coefficients a1, a1, b1 is to be executed.

Figure 11:
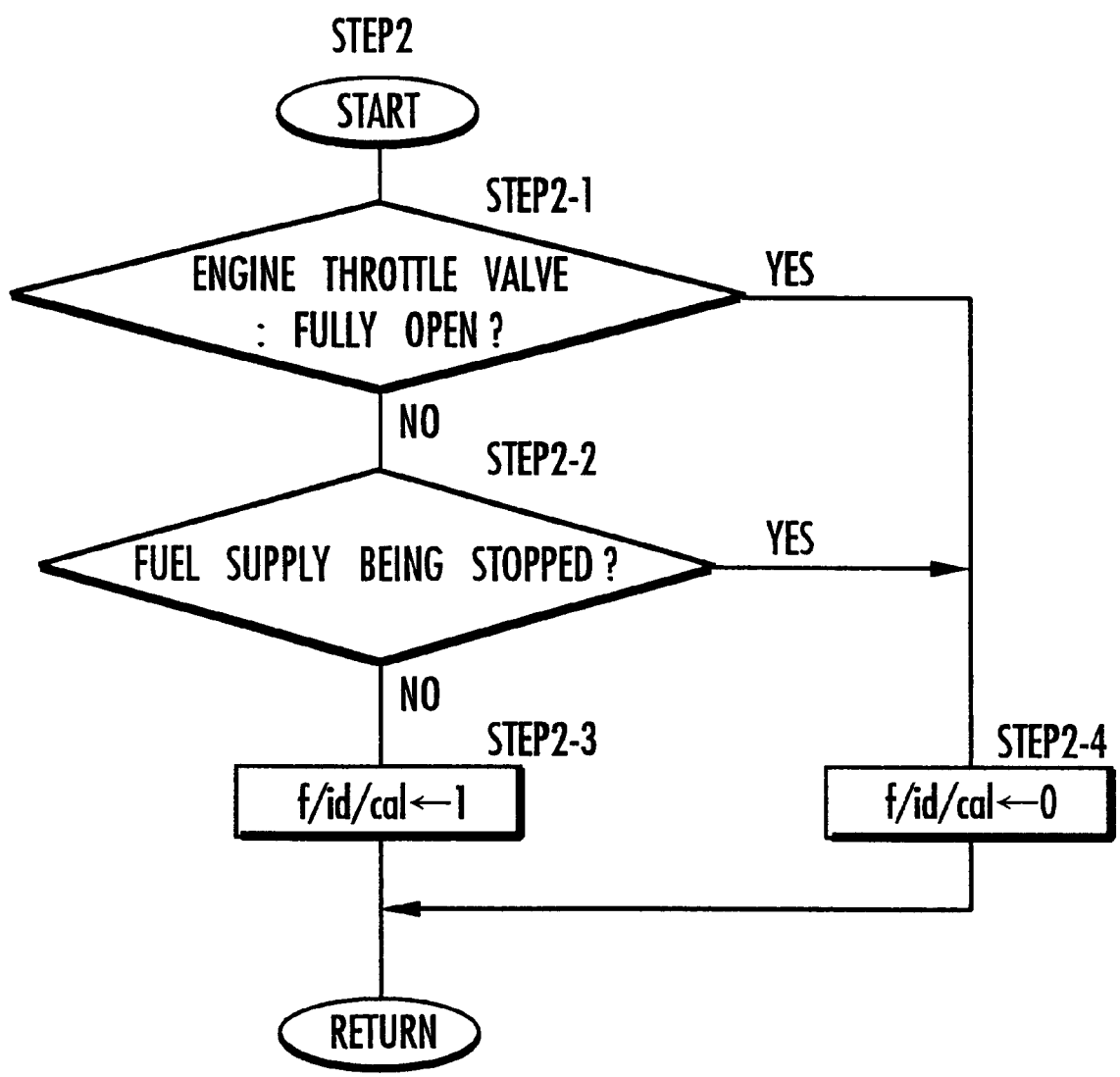

The deciding subroutine of STEP2 is shown in detail in FIG. 11.

The exhaust-side main processor 13 decides whether the throttle valve of the internal combustion engine 1 is fully open or not in STEP2-1. The exhaust-side main processor 13 decides whether the supply of fuel to the internal combustion engine 1 is being stopped or not in STEP2-2. If either one of the conditions of these steps is satisfied, then since it is difficult to adjust the gain coefficients a1, a1, b1 appropriately, the value of the flag f/id/cal is set to "0" in STEP2-4. If neither one of the conditions of these steps is satisfied, then the value of the flag f/id/cal is set to "1" to identify (update) the gain coefficients a1, a1, b1 with the identifier 25 in STEP2-3.

Referring back to FIG. 9, the exhaust-side main processor 13 acquires the latest differential outputs kact(k) (=KACT−FLAF/BASE), VO2(k) (=VO2/OUT−VO2/TARGET) respectively from the subtractors 11, 12 in STEP3. Specifically, the subtractors 11, 12 select latest ones of the time-series data read and stored in the non-illustrated memory in STEPa shown in FIG. 8, calculate the differential outputs kact(k), VO2(k), and give the calculated differential outputs kact(k), VO2(k) to the exhaust-side main processor 13. The differential outputs kact(k), VO2(k) given to the exhaust-side main processor 13, as well as data given in the past, are stored in a time-series manner in a memory (not shown) in the exhaust-side main processor 13.

Then, in STEP4, the exhaust-side main processor 13 determines the value of the flag f/prism/cal set in STEP1. If the value of the flag f/prism/cal is "0", i.e., if the processing of the exhaust-side main processor 13 is not to be executed, then the exhaust-side main processor 13 forcibly sets the SLD manipulating input Usl (the target differential air-fuel ratio kcmd) to be determined by the sliding mode controller 27, to a predetermined value in STEP13. The predetermined value may be a fixed value (e.g., "0") or the value of the SLD manipulating input Usl determined in a preceding control cycle.

After the SLD manipulating input Usl is set to the predetermined value in STEP13, the exhaust-side main processor 13 adds the reference value FLAF/BASE to the SLD manipulating input Usl for thereby determining a target air-fuel ratio KCMD in the present control cycle in STEP14. Then, the processing in the present control cycle is finished.

If the value of the flag f/prism/cal is "1" in STEP4, i.e., if the processing of the exhaust-side main processor 13 is to be executed, then the exhaust-side main processor 13 effects the processing of the identifier 25 in STEP5.

Figure 12:
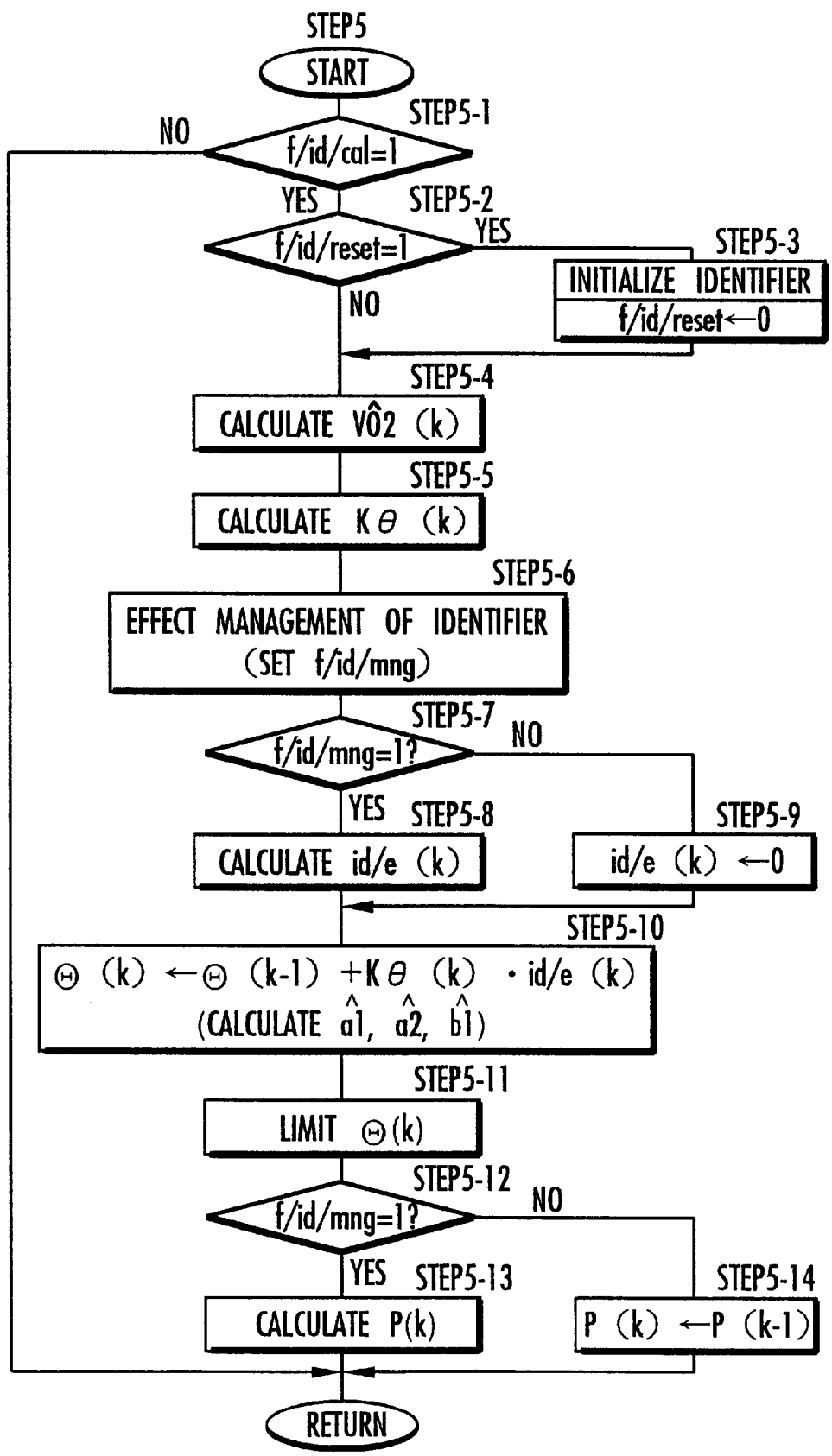

The processing subroutine of STEP5 is shown in detail in FIG. 12.

The identifier 25 determines the value of the flag f/id/cal set in STEP2 in STEP5-1. If the value of the flag f/id/cal is "0", then since the process of identifying the gain coefficients a1, a1, b1 with the identifier 25 is not carried out, control immediately goes back to the main routine shown in FIG. 9.

If the value of the flag f/id/cal is "1", then the identifier 25 determines the value of the flag f/id/reset set in STEP1 with respect to the initialization of the identifier 25 in STEP5-2. If the value of the flag f/id/reset is "1", the identifier 25 is initialized in STEP5-3. When the identifier 25 is initialized, the identified gain coefficients a1 hat, a2 hat, b1 hat are set to predetermined initial values (the identified gain coefficient vector Θ according to the equation (4) is initialized), and the elements of the matrix P (diagonal matrix) according to the equation (9) are set to predetermined initial values. The value of the flag f/id/reset is reset to "0".

Then, the identifier 25 calculates the identified differential output VO2(k) hat, which is the output of the exhaust system model that is expressed using the present identified gain coefficients a1(k−1) hat, a2(k−1) hat, b1(k−1) hat, using the past data VO2(k−1), VO2(k−2), kact(k−d−1) of the differential outputs VO2, kact calculated in each control cycle in STEP3, and the values of the identified gain coefficients a1(k−1) hat, a2(k−1)hat, b1(k−1) hat, according to the equation (3) or the equation (6) equivalent thereto in STEP5-4.

The identifier 25 then calculates the vector Kθ(k) to be used in determining the new identified gain coefficients a1 hat, a2 hat, b1 hat according to the equation (9) in STEP5-5. Thereafter, the identifier 25 carries out a management process described below in STEP5-6.

When the gain coefficients a1, a2, b1 of the exhaust system model are to be sequentially identified, they should preferably be identified in a particular behavioral state of the object exhaust system E. For example, it is easier to obtain identified gain coefficients a1 hat, a2 hat, b1 hat that are appropriate for calculating the target air-fuel ratio and determining the deteriorated state of the catalytic converter 3 by identifying the gain coefficients a1, a2, b1 in a behavioral state of the object exhaust system E in which the air-fuel ratio is changed from a leaner value to a richer value than by identifying the gain coefficients a1, a2, b1 in a behavioral state of the object exhaust system E in which the air-fuel ratio is changed from a richer value to a leaner value.

In the present invention, therefore, the process of identifying the gain coefficients a1, a2, b1, or more precisely the process of updating the identified gain coefficients a1 hat, a2 hat, b1 hat, is carried out in a behavioral state of the object exhaust system E in which the air-fuel ratio is changed from a leaner value to a richer value. The management process is a process of specifying such a behavioral state of the object exhaust system E.

Figure 13:
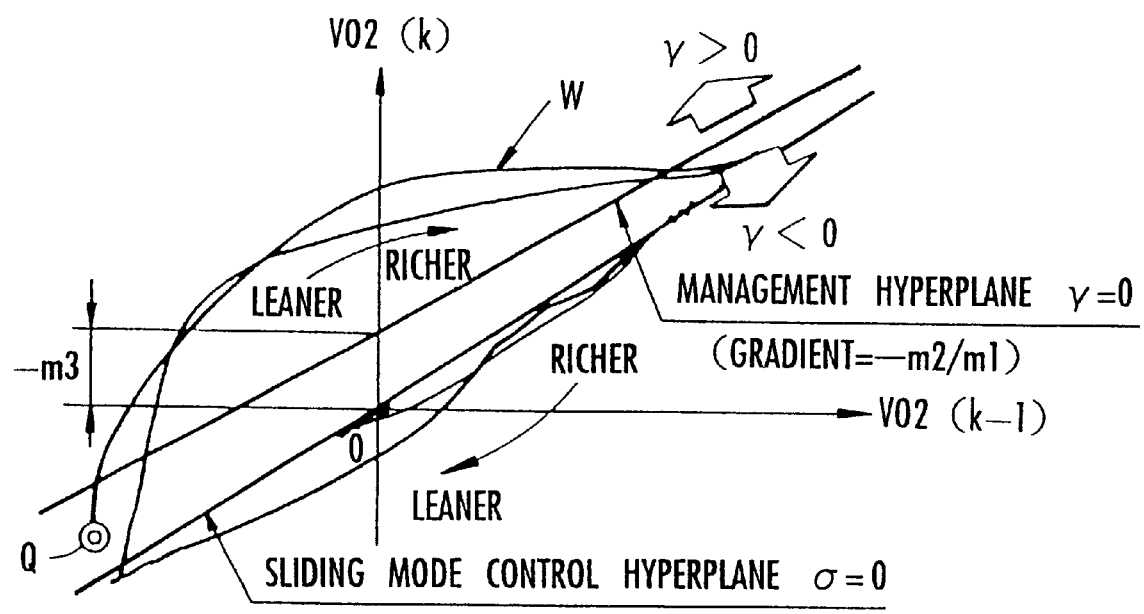
FIGS. 13 through 15 are diagrams illustrating partial processes of the subroutine shown in FIG. 12.

As shown in FIG. 13, according to the control process of the present embodiment which uses the adaptive sliding mode control process, the state quantity X (VO2(k), VO2(k−1)) of the differential output VO2 of the O$_2$ sensor 6 changes from its initial state at a point Q along a path w with respect to the hyperplane σ=0 (see FIG. 4). Basically, a state in which the state quantity X changes above the hyperplane σ=0 (at this time, the value of the linear function σ determined by the state quantity X is positive) is equal to a state in which the air-fuel ratio is changed from a leaner value to a richer value, and a state in which the state quantity X changes below the hyperplane σ=0 (at this time, the value of the linear function σ determined by the state quantity X is negative) is equal to a state in which the air-fuel ratio is changed from a richer value to a leaner value.

Consequently, whether the object exhaust system E is in a behavioral state in which the air-fuel ratio recognized by the output VO2/OUT (the detected value of the oxygen concentration) of the O$_2$ sensor 6 is changed from a leaner value to a richer value or not can be determined based on whether the value of the linear function a is positive or negative. However, if whether the object exhaust system E is in a behavioral state in which the air-fuel ratio is changed from a leaner value to a richer value or not is determined based on whether the value of the linear function σ is positive or not, then the decision about whether the object exhaust system E is in a behavioral state in which the air-fuel ratio is changed from a leaner value to a richer value or not may be changed when the state quantity X slightly varies from above the hyperplane σ=0. Therefore, it is not preferable to carry out the process of identifying the gain coefficients a1, a2, b1, i.e., updating the identified gain coefficients a1 hat, a2 hat, b1 hat, depending on that decision.

In the present embodiment, a management function γ defined using the time-series data of the differential output VO2 according to the following equation (40) is introduced:

$$\gamma(k)=m1 \cdot VO2(k)+m2 \cdot VO2(k-1)+m3 \quad (40)$$

The coefficients m1, m2, m3 of the management function γ are established such that a management hyperplane (in this case, a straight line) expressed by γ=0 is positioned slightly above (in the region of σ>0) the sliding mode control hyperplane σ=0. In this embodiment, the coefficient m1 of the management function γ is set to "1" in view of the fact that the coefficient s1 of the linear function a is set to "b 1".

If the management function γ is γ≧0, then the object exhaust system E is certainly in a behavioral state in which the air-fuel ratio is changed from a leaner value to a richer value. Therefore, whether the object exhaust system E is in such a behavioral state or not can stably be determined based on whether the management function γ is of a positive value (including "0") or not.

The management process in STEP5-6 determines, using the management function γ thus defined, whether the object exhaust system E is in a behavioral state in which the air-fuel ratio recognized by the output VO2/OUT (the detected value of the oxygen concentration) of the $O_2$ sensor 6 is changed from a leaner value to a richer value or not, i.e., whether the object exhaust system E is in a behavioral state that is suitable for the identifier 25 to identify the gain coefficients a1, a2, b1 or not. The management process is specifically carried out as follows:

The identifier 25 calculates the value of the management function γ according to the above equation (40), using the latest differential output VO2(k) acquired in STEP3 (see FIG. 9) and the differential output VO2(k-1) in the preceding control cycle. If the management function γ thus determined is γ>0, then the identifier 25 sets a flag f/id/mng to "1", and if the management function γ is γ<0, then the identifier 25 sets the flag f/id/mng to "0". When the flag f/id/mng is "1", it indicates that the object exhaust system E is in a behavioral state in which the air-fuel ratio is changed from a leaner value to a richer value. When the flag f/id/mng is "0", it indicates otherwise.

Thus, the value of the flag f/id/mng indicates whether the object exhaust system E is in a behavioral state in which the air-fuel ratio is changed from a leaner value to a richer value, i.e., whether the object exhaust system E is in a behavioral state that-is suitable for the identifier 25 to identify the gain coefficients a1, a2, b1, or to up-date the identified gain coefficients a1 hat, a2 hat, b1 hat.

After having carried out the management process, the identifier 25 determines the value of the flag f/id/mng in STEP5-7. If f/id/mng=1, i.e., if the object exhaust system E is in a behavioral state in which the air-fuel ratio is changed from a leaner value to a richer value, then the identifier 25 calculates the identified error id/e(k), i.e., the difference between the identified differential output VO2 hat and the actual differential output VO2 (see the equation (7)); in STEP5-8. If f/id/mng=0, then the identifier 25 forcibly sets the value of the identified error id/e to "0" in STEP5-9.

Thereafter, the identifier 25 calculates a new identified gain coefficient vector Θ(k), i.e., new identified gain coefficients a1(k) hat, a2(k) hat, b1(k) hat, according to the equation (8) using the identified error id/e(k) determined in STEP5-8 or STEP5-9 and Kθ calculated in SETP5-5 in STEP5-10.

Figure 14:
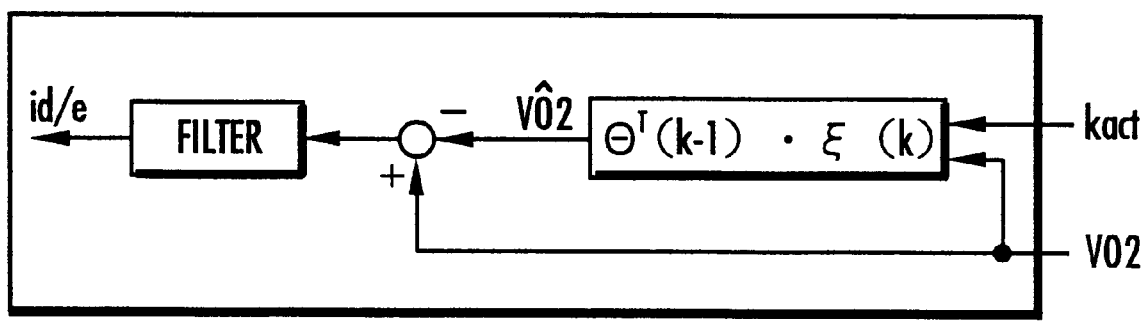

The identified error id/e obtained in STEP5-8 may basically be calculated according to the equation (7). In the present embodiment, however, as shown in FIG. 14, a value (=VO2-VO2 hat) calculated according to the equation (7) from the differential output VO2 acquired in each control cycle in STEP3 (see FIG. 9), and the identified differential output VO2 hat calculated in each control cycle in STEP5-4 is filtered with low-pass characteristics to calculate the identified error id/e.

This is because since the object exhaust system E including the catalytic converter 3 generally has low-pass characteristics, it is preferable to attach importance to the low-frequency behavior of the exhaust system E in appropriately identifying the gain coefficients a1, a2, b1 of the exhaust system model.

Both the differential output VO2 and the identified differential output VO2 hat may be filtered with the same low-pass characteristics. For example, after the differential output VO2 and the identified differential output VO2 hat have separately been filtered, the equation (7) may be calculated to determine the identified error idle.

However, determining the identified error idle by filtering the result of the calculation of the equation (7) as with the present embodiment offers the following advantages: If the resolutions of the differential output kact of the LAF sensor 5 and the differential output VO2 of the $O_2$ sensor 6, which are supplied to the exhaust-side main processor 13, are lower than the calculating resolution of the exhaust-side main processor 13, then-the result of the calculation of the equation (7) exhibits relatively large step-wise changes. By filtering the result of the calculation of the equation (7), any changes of the identified error idle can be smoothed.

The above filtering is carried out by a moving average process which is a digital filtering process, for example.

After having calculated the new identified gain coefficients a1(k) hat, a2(k) hat, b1(k) hat, the identifier 25 limits the values of the identified gain coefficients a1 hat, a2 hat, b1 hat (elements of the identified gain coefficient vector Θ), are limited to meet predetermined conditions in STEP5-11, as described below.

The predetermined conditions for limiting the values of the identified gain coefficients a1 hat, a2 hat, bc hat include a condition (hereinafter referred to as a first limiting condition) for limiting combinations of the values of the identified gain coefficients a1 hat, a2 hat, and a condition (hereinafter referred to as a second limiting condition) for limiting the value of the identified gain coefficient b1 hat.

Prior to describing the first and second limiting conditions and the specific processing details of STEP5-11, the reasons for limiting the values of the identified gain coefficients a1 hat, a2 hat, b1 hat will be described below.

The inventors of the present invention have found that if the values of the identified gain coefficients a1 hat, a2 hat, b1 hat are not particularly limited, while the output signal VO2/OUT of the $O_2$ sensor 6 is being stably controlled at the target value VO2/TARGET, there are developed a situation in which the target air-fuel ratio KCMD determined by the sliding mode-controller 27 changes smoothly with time, and a situation in which the target air-fuel ratio KCMD oscillates with time at a high frequency. Neither of these situations poses problems in controlling the output VO2/ OUT of the $O_2$ sensor 6 at the target value VO2/TARGET. However, the situation in which the target air-fuel ratio KCMD oscillates with time at a high frequency is not preferable in smoothly operating the internal combustion engine 1 that is controlled on the basis of the target air-fuel ratio KCMD. In this situation, the air-fuel ratio of the internal combustion engine 1 frequently varies, making unstable the values of the identified gain coefficients a1 hat, a2 hat, b1 hat that are sequentially calculated by the identifier 25, and hence making it difficult to determine the deteriorated state of the catalytic converter 3 based on the identified gain coefficients a1 hat, a2 hat, b1 hat.

A study of the above phenomenon by the inventors has shown that whether the target air-fuel ratio KCMD determined by the sliding mode controller 27 changes smoothly or oscillates at a high frequency depends strongly on the combinations of the values of the identified gain coefficients a1 hat, a2 hat identified by the identifier 25 and the value of the identified gain coefficient b1 hat.

In the present embodiment, the first and second limiting conditions are established appropriately, and the combinations of the values of the identified gain coefficients a1 hat, a2 hat and the value of the identified gain coefficient b1 hat are appropriately limited to eliminate the situation in which the target air-fuel ratio KCMD oscillates at a high frequency and to prevent the calculation of the identified gain coefficients a1 hat, a2 hat, b1 hat from becoming unstable in that situation.

According to the present embodiment, the first and second limiting conditions are established as follows:

With respect to the first limiting condition for limiting the values of the identified gain coefficients a1 hat, a2 hat, the study by the inventors indicates that whether the target air-fuel ratio KCMD determined by the sliding mode controller 27 changes smoothly or oscillates at a high frequency is closely related to combinations of the coefficient values $\alpha 1$, $\alpha 2$ in the equations (12)–(14) which are determined by the values of the gain coefficients a1, a2, i.e., the coefficient values $\alpha 1$, $\alpha 2$ used for the estimator 26 to determine the estimated differential output VO2 (k+d) bar (the coefficient values $\alpha 1$, $\alpha 2$ are the first-row, first-column element and the first-row, second-column element of the matrix $A^d$ which is a power of the matrix A defined by the equation (12)).

Figure 15:
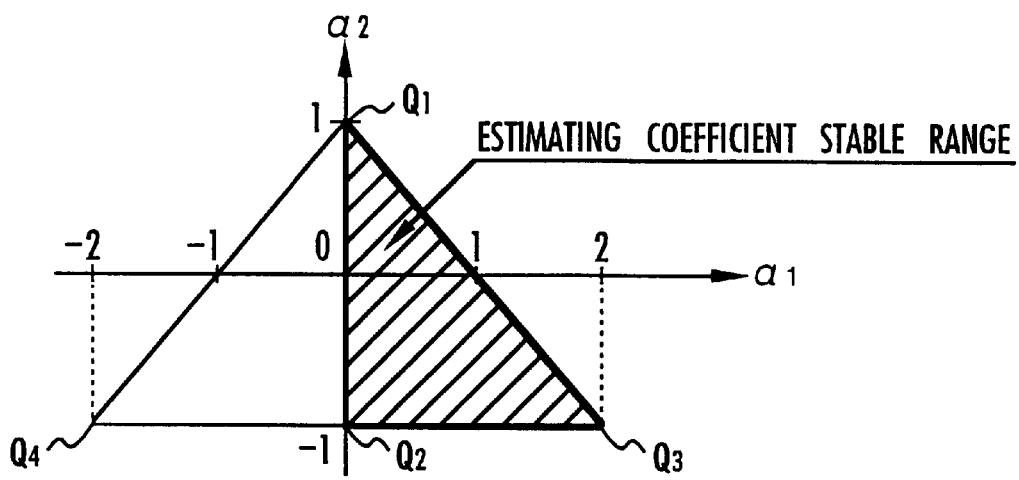

Specifically, as shown in FIG. 15, when a coordinate plane whose coordinate components or axes are represented by the coefficient values $\alpha 1$, $\alpha 2$ is established, if a point on the coordinate plane which is determined by a combination of the coefficient values $\alpha 1$, $\alpha 2$ lies in a hatched range, which is surrounded by a triangle $Q_1 Q_2 Q_3$ (including the boundaries) and will hereinafter be referred to as an estimating coefficient stable range, then the target air-fuel ratio KCMD tends to be smooth.

Therefore, the combinations of the values of the gain coefficients a1, a2 identified by the identifier 25, i.e., the combinations of the values of the identified gain coefficients a1 hat, a2 hat, should be limited such that the point on the coordinate plane shown in FIG. 15 which corresponds to the combination of the coefficient values $\alpha 1$, $\alpha 2$ determined by the values of the gain-coefficients a1, a2 or the values of the identified gain coefficients a1 hat, a2 hat will lie within the estimating coefficient stable range.

In FIG. 15, a triangular range $Q_1 Q_{4\,Q3}$ on the coordinate plane which contains the estimating coefficient stable range is a range that determines combinations of the coefficient values $\alpha 1$, $\alpha 2$ which makes theoretically stable a system defined according to the following equation (41), i.e., a system defined by an equation similar to the equation (12) except that VO2(k), VO2(k-1) on the right side of the equation (12) are replaced respectively with VO2(k) bar, VO2(k-1) bar (VO2(k) bar, VO2(k-1) bar mean respectively an estimated differential output determined before the dead time d by the estimator 26 and an estimated differential output determined in a preceding cycle by the estimator 26).

$$\overline{VO2}(k+d) = \alpha 1 \cdot \overline{VO2}(k) + \alpha 2 \cdot \overline{VO2}(k-1) + \sum_{j=1}^{d} \beta_j \cdot kcmd(k-j) \quad (41)$$

The condition for the system defined according to the equation (41) to be stable is that a pole of the system (which is given by the following equation (42)) exists in a unit circle on a complex plane:

Pole of the system according to the equation (41)

$$= \frac{\alpha 1 \pm \sqrt{\alpha 1^2 + 4 \cdot \alpha 2}}{2} \quad (42)$$

The triangular range $Q_1 Q_4 Q_3$ shown in FIG. 15 is a range for determining the combinations of the coefficient values $\alpha 1$, $\alpha 2$ which satisfy the above condition. Therefore, the estimating coefficient stable range is a range indicative of those combinations where $\alpha 1 \geq 0$ of the combinations of the coefficient values $\alpha 1$, $\alpha 2$ which make stable the system defined by the equation (41).

Since the coefficient values $\alpha 1$, $\alpha 2$ are determined by a combination of the values of the gain coefficients a1, a2, a combination of the values of the gain coefficients a1, a2 is determined by a combination of the coefficient values $\alpha 1$, $\alpha 2$. Therefore, the estimating coefficient stable range shown in FIG. 15 which determines preferable combinations of the coefficient values $\alpha 1$, $\alpha 2$ can be converted into a range on a coordinate plane shown in FIG. 16 whose coordinate components or axes are represented by the gain coefficients a1, a2. Specifically, the estimating coefficient stable range shown in FIG. 15 is converted into a range enclosed by the imaginary lines in FIG. 16, which is a substantially triangular range having an undulating lower side and will hereinafter be referred to as an identifying coefficient stable range, on the coordinate plane shown in FIG. 16. Stated otherwise, when a point on the coordinate plane shown in FIG. 16 which is determined by a combination of the values of the gain coefficients a1, a2 resides in the identifying coefficient stable range, a point on the coordinate plane shown in FIG. 15 which corresponds to the combination of the coefficient values $\alpha 1$, $\alpha 2$ determined by those values of the gain coefficients a1, a2 resides in the estimating coefficient stable range.

Figure 16:
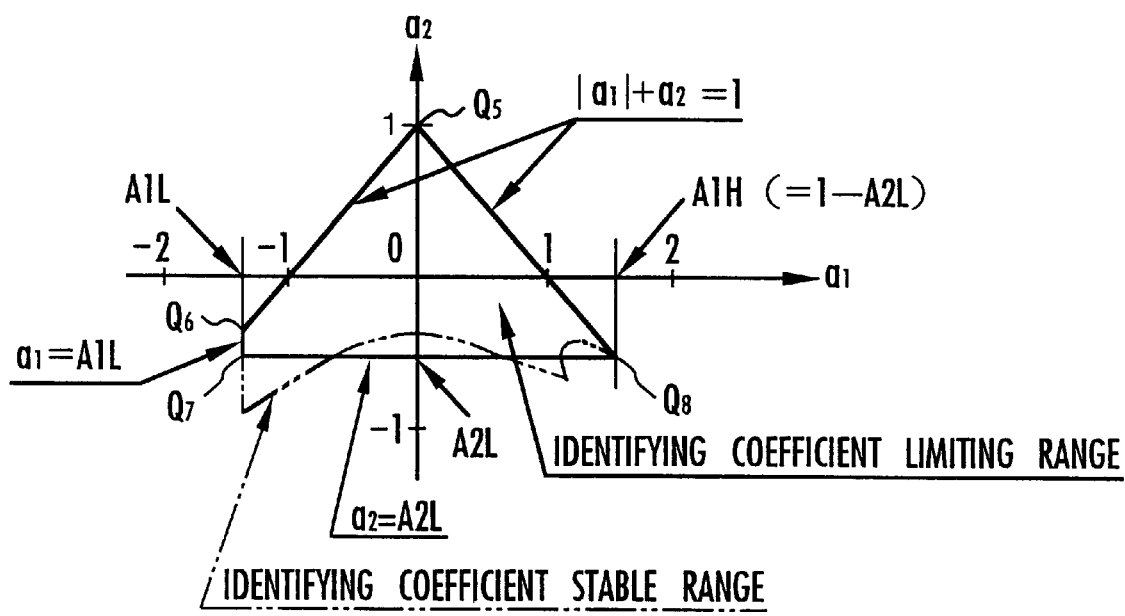
FIG. 16 is a diagram illustrating a subroutine of the subroutine shown in FIG. 12.

Consequently, the first limiting condition for limiting the values of the identified gain coefficients a1 hat, a2 hat determined by the identifier 25 should preferably be basically established such that a point on the coordinate plane shown in FIG. 16 which is determined by those values of the identified gain coefficients a1 hat, a2 hat reside in the identifying coefficient stable range.

However, since a boundary (lower side) of the identifying coefficient stable range indicated by the imaginary lines in FIG. 16 is of a complex undulating shape, a practical process for limiting the point on the coordinate plane shown in FIG. 16 which is determined by the values of the identified gain coefficients a1 hat, a2 hat is liable to be complex.

For this reason, according to the present embodiment, the identifying coefficient stable range is substantially approximated by a quadrangular range $Q_5 Q_6 Q_7 Q_8$ enclosed by the solid lines in FIG. 16, which has straight boundaries and will hereinafter be referred to as an identifying coefficient limiting range. As shown in FIG. 16, the identifying coefficient limiting range is a range enclosed by a polygonal line (including line segments $Q_5 Q_6$ and $Q_5 Q_8$) expressed by a functional expression $|a1|+a2=1$, a straight line (including a line segment $Q_6Q_7$) expressed by a constant-valued functional expression $a1=A1L$ (A1L: constant), and a straight line (including a line segment $Q_7Q_8$) expressed by a constant-valued functional expression $a2=A2L$ (A2L: constant). The first limiting condition for limiting the values of the identified gain coefficients a1 hat, a2 hat is established such that the point on the coordinate plane shown in FIG. 16 which is determined by those values of the identified gain coefficients a1 hat, a2 hat lies in the identifying coefficient limiting range, and the values of the identified gain coefficients a1 hat, a2 hat are limited such that the point determined by those values of the identified gain coefficients a1 hat, a2 hat lies in the identifying coefficient limiting range. Although part of the lower side of the identifying coefficient limiting range deviates from the identifying coefficient stable range, it has experimentally been confirmed that the point determined by the identified gain coefficients a1 hat, a2 hat determined by the identifier 25 does not actually fall in the deviating range. Therefore, the deviating range will not pose any practical problem.

The above identifying coefficient limiting range is given for illustrative purpose only, and may be equal to or may substantially approximate the identifying coefficient stable range, or may be of any shape insofar as most or all of the identifying coefficient limiting range belongs to the identifying coefficient stable range. Thus, the identifying coefficient limiting range may be established in various configurations in view of the ease with which to limit the values of the identified gain coefficients a1 hat, a2 hat and the practical controllability. For example, while the boundary of an upper portion of the identifying coefficient limiting range is defined by the functional expression $|a|+a2=1$ in the illustrated embodiment, combinations of the values of the gain coefficients a1, a2 which satisfy this functional expression are combinations of theoretical stable limits where a pole of the system defined by the equation (42) exists on a unit circle on a complex plane. Therefore, the boundary of the upper portion of the identifying coefficient limiting range may be determined by a functional expression $|a1|+a2=r$ (r is a value slightly smaller than "1" corresponding to the stable limits, e.g., 0.99) for higher control stability.

The above identifying coefficient stable range shown in FIG. 16 as a basis for the identifying coefficient limiting range is given for illustrative purpose only. The identifying coefficient stable range which corresponds to the estimating coefficient stable range shown in FIG. 15 is affected by the dead time d (more precisely, its set value) and has its shape varied depending on the dead time d, as can be seen from the definition of the coefficient values $\alpha 1$, $\alpha 2$ (see the equation (12)). Irrespective of the shape of the identifying coefficient stable range, the identifying coefficient limiting range may be established, as described above, in a manner to match the shape of the identifying coefficient stable range.

In the present embodiment, the second limiting condition for limiting the value of the gain coefficient b1 identified by the identifier 25, i.e., the value of the identified gain coefficient b1 hat, is established as follows:

The inventors have found that the situation in which the time-depending change of the target air-fuel ratio KCMD is oscillatory at a high frequency tends to happen also when the value of the identified gain coefficient b1 hat is excessively large or small. According to the present embodiment, an upper limit value B1H and a lower limit value B1L (B1H>B1L>0) for the identified gain coefficient b1 hat are determined in advance through experimentation or simulation. Then, the second limiting condition is established such that the identified gain coefficient b1 hat is equal to or smaller than the upper limit value B1H and equal to or greater than the lower limit value B1L (B1L≦b1 hat≦B1H).

Figure 17:
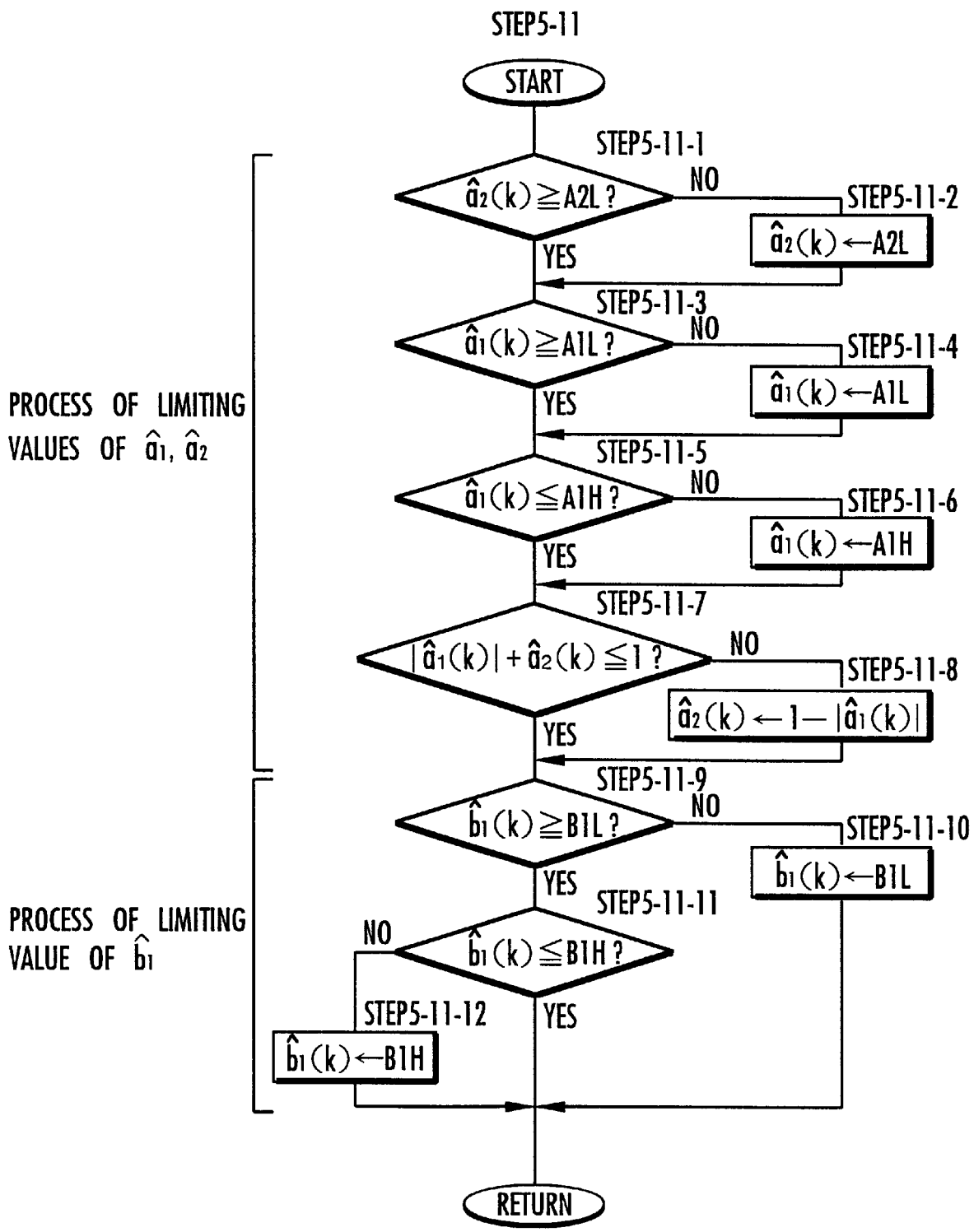
FIGS. 17 through 19 are flowcharts of subroutines of the main routine shown in FIG. 9.

A process of limiting the values of the identified gain coefficients a1 hat, a2 hat, b1 hat according to the first and second limiting conditions is carried out by in STEP5-11 as follows:

As shown in FIG. 17, the identifier 25 limits combinations of the identified gain coefficients a1(k) hat, a2(k) hat determined in STEP5-10 shown in FIG. 12 according to the first limiting condition in STEP5-11-1 through STEP5-11-8.

Specifically, the identifier 25 decides whether or not the value of the identified gain coefficient a2(k) hat determined in STEP5-10 is equal to or greater than a lower limit value A2L (see FIG. 16) for the gain coefficient a2 in the identifying coefficient limiting range in STEP5-11-1.

If the value of the identified gain coefficient a2(k) is smaller than A2L, then since a point on the coordinate plane shown in FIG. 16, which is expressed by (a1(k) hat, a2(k) hat), determined by the combination of the values of the identified gain coefficients a1(k) hat, a2(k) hat does not reside in the identifying coefficient limiting range, the value of a2(k) hat is forcibly changed to the lower limit value A2L in STEP5-11-2. Thus, the point (a1(k) hat, a2(k) hat) on the coordinate plane shown in FIG. 16 is limited to a point in a region on and above a straight line, i.e., the straight line including the line segment $Q_7Q_8$, expressed by at least $a2=A2L$.

Then, the identifier 25 decides whether or not the value of the identified gain coefficient a1(k) hat determined in STEP5-10 is equal to or greater than a lower limit value A1L (see FIG. 16) for the gain coefficient a1 in the identifying coefficient limiting range in STEP5-11-3, and then decides whether or not the value of the identified gain coefficient a1(k) hat is equal to or smaller than an upper limit value A1H (see FIG. 16) for the gain coefficient a1 in the identifying coefficient limiting range in STEP5-11-5. The upper limit value A1H for the gain coefficient a1 in the identifying coefficient limiting range is represented by A1H=1−A2L because it is an a1 coordinate of the point $Q_8$ where the polygonal line $|a1|+a2=1(a1>0)$ and the straight line $a2=A2L$ intersect with each other, as shown in FIG. 16.

If the value of the identified gain coefficient a1(k) hat is smaller than the lower limit value A1L or greater than the upper limit value A1H, then since the point (a1(k) hat, a2(k) hat) on the coordinate plane shown in FIG. 16 does not reside in the identifying coefficient limiting range, the value of a1(k) hat is forcibly changed to the lower limit value A1L or the upper limit value A1H in STEP5-11-4, STEP5-11-6.

Thus, the point (a1(k) hat, a2(k) hat) on the coordinate plane shown in FIG. 16 is limited to a region on and between a straight line, i.e., the straight line including the line segment $Q_6A_7$, expressed by a1=A1L, and a straight line, i.e., the straight line passing through the point $Q_8$ and perpendicular to the a1 axis, expressed by a1=A1H.

The processing in STEP5-11-3 and STEP5-11-4 and the processing in STEP5-11-5 and STEP5-11-6 may be switched around. The processing in STEP5-11-1 and STEP5-11-2 may be carried out after the processing in STEP5-11-3 through STEP5-11-6.

Then, the identifier 25 decides whether the present values of a1(k) hat, a2(k) hat after STEP5-11-1 through STEP5-11-6 satisfy an inequality $|a1|+a1 \leq 1$ or not, i.e., whether the point (a1(k) hat, a2(k) hat) is positioned on or below or on or above the polygonal line (including line segments $Q_5Q_6$ and $Q_5Q_8$) expressed by the functional expression $|a1|+a2=1$ in STEP5-11-7.

If $|a1|+a2 \leq 1$, then the point (a1(k) hat, a2(k) hat) determined by the values of a1(k) hat, a2(k) hat after STEP5-11-1 through STEP5-11-6 exists in the identifying coefficient limiting range (including its boundaries).

If $|a1|+a2 > 1$, then since the point (a1(k) hat, a2(k) hat) deviates upwardly from the identifying coefficient limiting range, the value of the a2(k) hat is forcibly changed to a value (1−|a1(k) hat|) depending on the value of a1(k) hat in STEP5-11-8. Stated otherwise, while the value of a1(k) hat is being kept unchanged, the point (a1(k) hat, a2(k) hat) is moved onto a polygonal line expressed by the functional expression $|a1|+a2=1$, i.e., onto the line segment $Q_5Q_6$ or the line segment $Q_5Q_8$ which is a boundary of the identifying coefficient limiting range.

Through the above processing in STEP5-11-1 through 5-11-8, the values of the identified gain coefficients a1(k) hat, a2(k) hat are limited such that the point (a1(k) hat, a2(k) hat) determined thereby resides in the identifying coefficient limiting range. If the point (a1(k) hat, a2(k) hat) corresponding to the values of the identified gain coefficients a1(k) hat, a2(k) hat that have been determined in STEP5-10 exists in the identifying coefficient limiting range, then those values of the identified gain coefficients a1(k) hat, a2(k) hat are maintained.

The value of the identified gain coefficient a1(k) hat relative to the primary autoregressive term of the discrete-system model is not forcibly changed insofar as the value resides between the lower limit value A1L and the upper limit value A1H of the identifying coefficient limiting range. If a1(k) hat<A1L or a1(k) hat>A1H, then since the value of the identified gain coefficient a1(k) hat is forcibly changed to the lower limit value A1L which is a minimum value that the gain coefficient a1 can take in the identifying coefficient limiting range or the upper limit value A1H which is a maximum value that the gain coefficient a1 can take in the identifying coefficient limiting range, the change in the value of the identified gain coefficient a1(k) hat is minimum. Stated otherwise, if the point (a1(k) hat, a2(k) hat) corresponding to the values of the identified gain coefficients a1(k) hat, a2(k) hat that have been determined in STEP5-7 deviates from the identifying coefficient limiting range, then the forced change in the value of the identified gain coefficient a1(k) hat is held to a minimum.

After having limited the values of the identified gain coefficients a1(k) hat, a2(k) hat, the identifier 25 limits the identified gain coefficient b1(k) hat according to the second limiting condition in STEP5-11-9 through STEP5-11-12.

Specifically, the identifier 25 decides whether or not the value of the identified gain coefficient b1(k) hat determined in STEP5-10 is equal to or greater than the lower limit value B1L in STEP5-11-9. If the lower limit value B1L is greater than the value of the identified gain coefficient b1(k) hat, the value of b1(k) hat is forcibly changed to the lower limit value B1L in STEP5-11-10.

The identifier 25 decides whether or not the value of the identified gain coefficient b1(k) hat is equal to or greater than the upper limit value B1H in STEP5-11-11. If the upper limit value B1H is smaller than the value of the identified gain coefficient b1(k) hat, the value of b1(k) hat is forcibly changed to the upper limit value B1H in STEP5-11-12.

Through the above processing in STEP5-11-9 through 5-11-12, the value of the identified gain coefficient b1(k) hat is limited to a range between the lower limit value B1L and the upper limit value B1H.

After the identifier 25 has limited the combination of the values of the identified gain coefficients a1(k) hat, a2(k) hat and the identified gain coefficient b1(k) hat, control returns to the sequence shown in FIG. 12.

The preceding values a1(k−1) hat, a2(k−1) hat, b1(k−1) hat of the identified gain coefficients used for determining the identified gain coefficients a1(k) hat, a2(k) hat, b1(k) hat in STEP5-10 shown in FIG. 12 are the values of the identified gain coefficients limited according to the first and second limiting conditions in STEP5-11 in the preceding control cycle.

Referring back to FIG. 12, after having limited the identified gain coefficients a1(k) hat, a2(k) hat, b1(k) hat as described above, the identifier 25 determines the value of the flag f/id/mng set in the management process STEP5-6 in-STEP5-12. If f/id/mng=1, then the identifier 25 updates the matrix P(k) according to the equation (10) for the processing of a next control cycle in STEP5-13, after which control returns to the main routine shown in FIG. 9. If f/id/mng=0, then since the values of the identified gain coefficients a1(k) hat, a2(k) hat, b1(k) hat have not been updated in STEP5-10, the identifier 25 maintains the present matrix P(k−1) as the matrix P(k) in STEP5-14, after which control returns to the main routine shown in FIG. 9.

The above process is the processing sequence of the identifier 25 which is carried out in STEP5 shown in FIG. 9.

After the processing sequence of the identifier 25 has been carried out as described above, the catalytic converter deterioration decision processor 27 of the exhaust-side main processor 13 performs its own processing sequence in STEP 6 in FIG. 9.

The processing sequence of the catalytic converter deterioration decision processor 28 will be described below with reference to FIG. 18.

The catalytic converter deterioration decision processor 27 calculates an estimated value (hereinafter referred to as an estimated exhaust gas flow rate ab/SV) of the present flow rate of the exhaust gas generated by the internal combustion engine 1 (in the present embodiment, the flow rate of the exhaust gas at the time the rotational speed of the internal combustion engine 1 is 1500 rpm is used as a reference), using the present rotational speed NE and intake pressure PB of the internal combustion engine 1 according to the following equation (43) in STEP 6-1:

$$ab/SV = \frac{NE}{1500} \cdot PB \cdot X/SV \tag{43}$$

where the coefficient X/SV is of a predetermined value depending on the displacement, etc. of the internal combustion engine 1.

The atmospheric pressure may be taken into account in calculating the estimated exhaust gas flow rate ab/SV. Rather than estimating the flow rate of the exhaust gas of the internal combustion engine 1 (the flow rate of the exhaust gas flowing through the catalytic converter 3) according to the above calculation, it may be recognized based on the fuel supply quantity or intake quantity of the internal combustion engine 1, or may directly be detected by a flow sensor or the like.

Then, the catalytic converter deterioration decision processor 27 determines whether the estimated exhaust gas flow rate ab/SV determined in STEP6-1 is a flow rate in the high flow rate range (see FIG. 6) or not in STEP6-2. If the estimated exhaust gas flow rate ab/SV determined in STEP6-1 is a flow rate in the high flow rate range, then the catalytic converter deterioration decision processor 28 calculates the deterioration determining data A1/H, A2/H, B1/H corresponding to the high flow rate range, i.e., performs a filtering process to determine a central value of the least square of the data of each of the identified gain coefficients a1 hat, a2 hat, b1 hat determined in the high flow rate range, in STEP6-3. Then, control proceeds to STEP6-6.

If the estimated exhaust gas flow rate ab/SV is not a flow rate in the high flow rate range, then the catalytic converter deterioration decision processor 28 determines whether the estimated exhaust gas flow rate ab/SV is a flow rate in the medium flow rate range or not in STEP6-4. If the estimated exhaust gas flow rate ab/SV is a flow rate in the medium flow rate range, then the catalytic converter deterioration decision processor 28 calculates the deterioration determining data A1/M, A2/M, B1/M corresponding to the medium flow rate range, i.e., performs a filtering process to determine a central value of the least square of the data of each of the identified gain coefficients a1 hat, a2 hat, b1 hat determined in the medium flow rate range, in STEP6-5. Then, control proceeds to STEP6-6.

If the estimated exhaust gas flow rate ab/SV does not fall in either the high flow rate range or the medium flow rate range, then control directly goes to STEP6-6.

The deterioration determining data A1/H, A2/H, B1/H are calculated in STEP6-3 and the deterioration determining data A1/M, A2/M, B1/M are calculated in STEP6-5 as follows:

Since the deterioration determining data A1/H, A1/M, A2/H, A2/M, B1/H, B1/M are calculated in the same manner, either one of these deterioration determining data A1/H, A1/M, A2/H, A2/M, B1/H, B1/M is used as a typical example and denoted by CX, and the identified gain coefficient corresponding to the deterioration determining data CX is denoted by c hat (e.g., if CX=A1/H, then c hat=a1 hat) in the following description of the calculating process.

In STEP6-3 or STEP6-5, the catalytic converter deterioration decision processor 27 sequentially updates the deterioration determining data CX, which is a central value of the least square of the data of each identified gain coefficient c hat, according to a recursive formula expressed by the following equation (44), each time the data of each identified gain coefficient c hat in the corresponding exhaust gas flow rate range is calculated by the identifier 25:

$$CX(k) = CX(k-1) + \frac{qX(k-1)}{1+qX(k-1)} \cdot \left(\hat{C}(k) - CX(k-1)\right) \quad (44)$$

where qX(k) is a parameter that is updated according to a recursive formula expressed by the following equation (45) each time the value of the deterioration determining data CX is updated by the equation (44), and established for each deterioration determining data CX:

$$qX(k) = \left(1 - \frac{qX(k-1)}{1+qX(k-1)}\right) \cdot qX(k-1) \quad (45)$$

If the flow rate of the exhaust gas is not a flow rate in the flow rate range corresponding to the deterioration determining data CX, then the calculations according to the equations (44), (45) are not carried out, but the deterioration determining data CX and the corresponding parameter qX remain to be of the present values. For example, if the flow rate of the exhaust gas is a flow rate in the high flow rate range (YES in STEP6-2), then the deterioration determining data A1/M, A2/M, B1/M and the values of the corresponding parameters qX are not updated.

The parameter qX has an initial value of "1" for any one of the deterioration determining data CX. The value of the parameter qX is finally converged to "0" when the calculation according to the equation (45) is repeated, and when the value of the parameter qX is converged to "0", the value of the deterioration determining data CX is not updated even if the calculation according to the equation (44) is carried out. In the present embodiment, therefore, each time the number of times that the calculations according to the equations (44), (45) are carried out reaches a predetermined number with respect to each deterioration determining data CX, the value of the parameter qX is reset to "1". The latest values of the deterioration determining data CX and the corresponding parameter qX are stored in a nonvolatile memory (e.g., EEPROM) so that they will not be lost when the internal combustion engine 1 is shut off, and will be used as initial values when internal combustion engine 1 is operated next time.

In the present embodiment, inasmuch as the central value of the least square of the data of each identified gain coefficient c hat is used as the deterioration determining data CX, the value of the parameter qX is sequentially updated according to the equation (45). However, the value of the parameter qX may be determined according to the equation (46) given below. If the equation (46) is used, then depending on how $\eta_1$, $\eta_2$ in the equation (46) are established, each deterioration determining data CX may be calculated according to a fixed gain method, a degressive gain method, a method of weighted least squares, a fixed tracing method, etc. other than a method of least squares. According to the method of least squares employed in the present invention, both the values of $\eta_1$, $\eta_2$ in the equation (46) are set to "1".

$$qX(k) = \frac{1}{\eta_1(k)} \cdot \left(1 - \frac{\eta_2(k) \cdot qX(k-1)}{\eta_1(k) + \eta_2(k) \cdot qX(k-1)}\right) \cdot qX(k-1) \quad (46)$$

where $0 < \eta_1 \leq 1$, $0 \leq \eta_2 < 2$

In the present embodiment, the value of the parameter qX is periodically reset to "1". Immediately after the value of the parameter qX is reset to "1", the deterioration determining parameter CX updated according to the equation (44) depending on the parameter qX may vary, resulting in a reduction in the accuracy of the deterioration determining parameter CX. In order to avoid the above drawback, it is preferable to determine the deterioration determining parameter CX according to a method of weighted least squares. In such a case, the parameter qx may be updated according to the equation (46) where the values of $\eta_1$, $\eta_2$ are set to $0 < \eta_1 < 1$, $\eta_2 = 1$, and the deterioration determining parameter CX may be determined using the parameter qX according to the equation (44). If the method of weighted least squares is thus used, then it is not necessary to periodically reset the parameter qX, and the deterioration determining parameter CX can stably be determined accurately.

Referring back to FIG. 18, after the deterioration determining data A1/H, A2/H, B1/H, A1/M, A2/M, B1/M are determined, the catalytic converter deterioration decision processor 27 determines, in STEP6-6, a level LV/A1 of the degree of deterioration of the catalytic converter 3 (hereinafter referred to as a temporary deterioration level LV/A 1) temporarily recognized based on the values of the deterioration determining data A1/H, A1/M corresponding to the identified gain coefficient a1 hat, as follows:

In the present embodiment, threshold values X/A1H1, X/A1H2 (X/A1H1<X/A1H2) are established in advance with respect to the deterioration determining data A1/H, as shown in FIG. 5(*a*), and threshold values X/A1M1, X/A1M2 (X/A1M1<X/A1M2) are also established in advance with respect to the deterioration determining data A1/M, as shown in FIG. 5(*a*). In FIG. 5(*a*), X/A1H1=X/A1M1 and X/A1H2=X/A1M2 for illustrative purpose. Since the deterioration determining data A1/H in the high flow rate range is slightly greater than the deterioration determining data A1/M in the medium flow rate range, actually, X/A1H1>X/A1M1 and X/A1H2>X/A1M2.

In STEP6-6, the catalytic converter deterioration decision processor 27 compares the magnitude of the value of the latest deterioration determining data A1/H corresponding to the high flow rate range with the corresponding threshold values X/A1H1, X/A1H2, and determines a preliminary temporary deterioration level LV/A1H (one of three levels 0–2) from the result of comparison according to Table 1, shown below (see items without parentheses in uppermost and middle rows in Table 1). Similarly, the catalytic converter deterioration decision processor 28 compares the magnitude of the value of the latest deterioration determining data A1/M corresponding to the medium flow rate range with the corresponding threshold values X/A1M1, X/A1M2, and determines a preliminary temporary deterioration level LV/A1M (one of three levels 0–2) from the result of comparison according to Table 1, shown below (see items with parentheses in uppermost and middle rows in Table 1).

recognized as corresponding to the identified gain coefficient a2 hat, based on the values of the deterioration determining data A2/H, A2/M corresponding to the identified gain coefficient a2 hat in STEP6-7.

As shown in FIG. 5(b), threshold values X/A2H1, X/A2H2 (X/A2H1>X/A2H2) are established in advance with respect to the deterioration determining data A2/H, and threshold values X/A2M1, X/A2M2 (X/A2M1>X/A2M2) are also established in advance with respect to the deterioration determining data A2/M. Since the deterioration determining data A2/H in the high flow rate range is slightly smaller than the deterioration determining data A2/M in the medium flow rate range, X/A2H1<X/A2M1 and X/A2H2<X/A2M2.

The catalytic converter deterioration decision processor 27 determines preliminary temporary deterioration levels LV/A2H, LV/A2M (one of three levels 0–2) corresponding respectively to the deterioration determining data A2/H, A2/M according to Table 2, shown below, and determines a

TABLE 1

| A1/H (A1/M) | A1/H ≦ X/A1H1 (A1/M ≦ X/A1M1) | X/A1H1 < A1/H ≦ X/A1H2 (X/A1M1 < A1/M ≦ X/A1M2) | A1/H > X/A1H2 (A1/M > X/A1M2) |
|---|---|---|---|
| LV/A1H (LV/A1M | 0 (0) | 1 (1) | 2 (2) |
| LV/A1 | | max (LV/A1H, LV/A1M) | |

In this case, a process of determining the temporary deterioration levels LV/A1H, LV/A1M respectively from the values of the deterioration determining data A1/H, A1/M is carried out when the parameter qX (see the equations (44), (45) corresponding to the deterioration determining data A1/H, A1/M is converted to a sufficiently small value that is equal to or smaller than a predetermined value (at this time, the values of the deterioration determining data A1/H, A1/M greater one (=max (LV/A2H, LV/A2M)) of the preliminary temporary deterioration levels LV/A2H, LV/A2M as a temporary deterioration level LV/A2 corresponding to the identified gain coefficient a2 hat.

In Table 2, items without parentheses in uppermost and middle rows are related to the deterioration determining data A2/H, and items with parentheses are related to the deterioration determining data A2/M.

TABLE 2

| A2/H (A2/M) | A2/H ≧ X/A1H1 (A2/M ≧ X/A1M1) | X/A2H1 > A2H ≧ X/A2H2 (X/A2M1 > A2M ≧ X/A2M2) | A2/H < X/A2H2 (A2/M < X/A2M2) |
|---|---|---|---|
| LV/A2H (LV/A2M | 0 (0) | 1 (1) | 2 (2) |
| LV/A2 | | max (LV/A2H, LV/A2M) | | are also substantially converged). If the parameter qX is not converged, the values of the corresponding temporary deterioration levels LV/A1H, LV/A1M remain to be the present values, i.e., the values determined when the parameter qX was previously converged.

After the temporary deterioration levels LV/A1H, LV/A1M corresponding respectively to the deterioration determining data A1/H, A1/M are determined, the catalytic converter deterioration decision processor 27 determines a greater one of the temporary deterioration levels LV/A1H, LV/A1M, i.e., max (LV/A1H, LV/A1M), as a temporary deterioration level LV/A1 corresponding to the identified gain coefficient a1 hat (see the lowest row in Table 1). This is the processing carried out in STEP6-6.

Then, as with STEP6-6, the catalytic converter deterioration decision processor 27 determines a temporary deterioration level LV/A2 of the catalytic converter 3 that is A process of determining the temporary deterioration levels LV/A2H, LV/A2M is carried out when the parameter qX (see the equations (44), (45) corresponding thereto is converted to a sufficiently small value that is equal to or smaller than a predetermined value, as with STEP6-6.

Then, as with STEP6-6, STEP6-7, the catalytic converter deterioration decision processor 27 determines a temporary deterioration level LV/b1 of the catalytic converter 3 that is recognized as corresponding to the identified gain coefficient b1 hat, based on the values of the deterioration determining data B1/H, B1/M corresponding to the identified gain coefficient b1 hat in STEP6-8.

As shown in FIG. 5(c), threshold values X/B1H1, X/B1H2 (X/B1H1<X/B1H2) are established in advance with respect to the deterioration determining data B1/H, and threshold values X/B1M1, X/B1M2 (X/B1M1<X/B1M2) are also established in advance with respect to the deterioration determining data B1/M. Since the deterioration determining data B1/H in the high flow rate range is slightly greater than the deterioration determining data B1/M in the medium-flow rate range, X/B1H1>X/B1M1 and X/B1H2>X/B1M2.

The catalytic converter deterioration decision processor 27 determines preliminary temporary deterioration levels LV/B1H, LV/B1M (one of three levels 0–2) corresponding respectively to the deterioration-determining data B1/H, B1/M according to Table 3, shown below, and determines a smaller one (=min (LV/B1H, LV/B1M)) of the preliminary temporary deterioration levels LV/B1H, LV/B1M as a temporary deterioration level LV/B1 corresponding to the identified gain coefficient b1 hat.

In Table 3, items without parentheses in uppermost and middle rows are related to the deterioration determining data B1/H, and items with parentheses are related to the deterioration determining data B1/M. The smaller one of the preliminary temporary deterioration levels LV/B1M, LV/B1M is determined as a temporary deterioration level LV/B1 because, as shown in FIG. 5(c), in the deterioration levels of 2 or more of the catalytic converter 3, the temporary deterioration levels LV/B1M, LV/B1M defined as described above are reduced as the deterioration of the catalytic converter 3 progresses.

TABLE 3

| B1/H (B1/M) | B1/H ≤ X/B1H1 (B1/M ≤ X/B1M1) | X/B1H1 < B1/H ≤ X/B1H2 (X/B1M1 > B1M ≥ X/B1M2) | B1/H > X/B1H2 (B1/M > X/B1M2) |
|---|---|---|---|
| LV/B1H (LV/B1M | 0 (0) | 1 (1) | 2 (2) |
| LV/B1 | | max (LV/B1H, LV/B1M) | |

A process of determining the temporary deterioration levels LV/B1M, LV/B1M is carried out when the parameter qX (see the equations (44), (45) corresponding thereto is converted to a sufficiently small value that is equal to or smaller than a predetermined value, as with STEP6-6.

After having determined the temporary deterioration levels LV/A1, LV/A2, LV/B1 corresponding to the identified gain coefficients a1 hat, a2 hat, b1 hat, the catalytic converter deterioration decision processor 27 combines these temporary deterioration levels LV/A1, LV/A2, LV/B1 to determine a deterioration level of the catalytic converter 3 in STEP6-9.

Specifically, the catalytic converter deterioration decision processor 27 determines a deterioration level of the catalytic converter 3 from a greater one (=max (LV/A1, LV/A2), hereinafter denoted by LV/A) of the temporary deterioration levels LV/A1, LV/A2 corresponding respectively to the identified gain coefficients a1 hat, a2 hat, and the temporary deterioration level LV/B1 corresponding to the identified gain coefficient b1 hat, according to Table 4, shown below.

TABLE 4

| LV/A | 0 | 1 | 2 | 2 |
|---|---|---|---|---|
| LV/B1 | 0 or 1 | 2 | 1 | 0 |
| Deterioration level | 0 | 1 | 2 | 3 |

In Table 4, it is premised that when either one of the temporary deterioration levels LV/A1, LV/A2 relative to the identified gain coefficients a1 hat, a2 hat changes from "0" to "1" or from "1" to "0", the temporary deterioration level LV/B1 relative to the identified gain coefficient b1 hat also changes from "1" to "2" or from "2" to "1". The timing of such level changing may be displaced due to an error of the deterioration determining data A1/H, A1/M, A2/H, A2/M, B1/H, B1M.

In view of such possible timing variations, it is more preferable to determine a deterioration level of the catalytic converter 3 according to Table 5, shown below, for example.

TABLE 5

| LV/A | 0 | 0 | 1 | 1 | 2 | 2 | 1 | 2 |
|---|---|---|---|---|---|---|---|---|
| LV/B1 | 0 or 1 | 2 | 2 | 1 | 1 | 2 | 0 | 0 |
| D.L. | 0 | | 1 | | 2 | | | 3 |

LV/A = max (LV/A1, LV/A2)

After having thus determined the deterioration level, the catalytic converter deterioration decision processor 27 controls the deterioration indicator 29 to operate depending on the value of the deterioration level in STEP6-10. Specifically, if the value of the deterioration level is maximum "3" (see FIG. 5), then since the deterioration of the catalytic converter 3 is in considerable progress, the catalytic converter deterioration decision processor 28 controls the deterioration indicator 29 to indicate the deteriorated state as a prompt to replace the catalytic converter 3.

The above processing represents the process that is carried out by the catalytic converter deterioration decision processor 27 in STEP6 shown in FIG. 9.

In FIG. 9, after the processing of the catalytic converter deterioration decision processor 27 has been carried out, the exhaust-side main processor 13 determines the values of the gain coefficients a1, a2, b1 in STEP 7. Specifically, if the value of the flag f/id/cal set in STEP2 is "1", i.e., if the gain coefficients a1, a2, b1 have been identified by the identifier 25, then the gain coefficients a1, a2, b1 are set to the latest identified gain coefficients a1(k) hat, a2(k) hat, b1(k) hat determined by the identifier 25 in STEP5 (limited in STEP5-11). If the value of the flag f/id/cal is "0", i.e., if the gain coefficients a1, a2, b1 have not been identified by the identifier 25, then the gain coefficients a1, a2, b1 are set to predetermined values, respectively.

Then, the exhaust-side main processor 13 effects a processing operation of the estimator 26, i.e., calculates the estimated differential output VO2 bar, in STEP 8.

The estimator 26 calculates the coefficients α1, α2, βj (j=1, 2, . . . , d) to be used in the equation (13), using the gain coefficients a1, a2, b1 determined in STEP7 (these values are basically the identified gain coefficients a1 hat, a2 hat, b1 hat) as described above.

Then, the estimator 26 calculates the estimated differential output VO2 (k+d) bar (the estimated value of the differential output VO2 after the total dead time d from the time of the present control cycle) according to the equation (13), using the time-series data VO2(k), VO2(k−1), from before the present control cycle, of the differential output VO2 of the $O_2$ sensor calculated in each control cycle in STEP3, the time-series data kact(k−j) (j=0, . . . , d1), from before the present control cycle, of the differential output kact of the LAF sensor 5, the time-series data kcmd(k−j) (=Usl(k−j), j=1, . . . , d2−1), from before the preceding control cycle, of the target differential air-fuel ratio kcmd (=the SLD manipulating input Usl) given in each control cycle from the sliding mode controller 27, and the coefficients α1, α2, βj calculated as described above.

Then, the exhaust-side main processor 13 calculates the SLD manipulating input Usl (=the target differential air-fuel ratio kcmd) with the sliding mode controller 27 in STEP9.

Specifically, the sliding mode controller 27 calculates a value σ(k+d) bar (corresponding to an estimated value, after the total dead time d, of the linear function σ defined according to the equation (15)), after the total dead time d from the present control cycle, of the linear function σ bar defined according to the equation (25), using the time-series data VO2 (k+d) bar, VO2 (k+d−1) bar of the estimated differential output VO2 bar (the present and preceding values of the estimated differential output VO2 bar) determined by the estimator 2 in STEP8.

Then, the sliding mode controller 27 accumulatively adds values σ(k+d) bar. That is, the sliding mode controller 27 adds the σ(k+d) bar calculated in the present control cycle to the sum determined in the preceding control cycle, thus calculating an integrated value of σ(k+d) bar which corresponds to the term on the right end of the equation (27). In the present embodiment, the sliding mode controller 27 keeps the integrated value of σ(k+d) bar in a predetermined allowable range. If the integrated value of σ(k+d) bar exceeds the upper or lower limit of the allowable range, then the sliding mode controller 27 forcibly limits the integrated value of σ(k+d) bar to the upper or lower limit of the allowable range. This is because if the integrated value of σ(k+d) bar were excessive, the adaptive control law Uadp determined according to the equation (27) would be excessive, tending to impair the controllability.

Then, the sliding mode controller 27 calculates the equivalent control input Ueq, the reaching control law input Urch, and the adaptive control law Uadp according to the respective equations (24), (26), (27), using the time-series data VO2(k+d)bar, VO2(k+d−1) bar of the present and past values of the estimated differential output VO2 bar determined by the estimator 2 in STEP8, the value σ(k+d) bar of the linear function σ and its integrated value which are determined as described above, and the gain coefficients a1, a2, b1 determined in STEP 7 (these values are basically the latest identified gain coefficients a1(k) hat, a2(k) hat, b1(k) hat).

The sliding mode controller 27 then adds the equivalent control input Ueq, the reaching control law input Urch, and the adaptive control law Uadp to calculate the SLD manipulating input Usl, i.e., the input (=the target differential air-fuel ratio kcmd) to be applied to the object exhaust system E for converging the output signal VO2/OUT of the $O_2$ sensor 6 toward the target value VO2/TARGET.

The above process represents the processing in STEP9. The SLD manipulating input Usl (=the target differential air-fuel ratio kcmd) thus determined in each control cycle is stored in a time-series fashion in a memory (not shown), and will be used in the above processing operation of the estimator 26.

After the SLD manipulating input Usl has been calculated, the exhaust-side main processor 13 determines the stability of the adaptive sliding mode control process carried out by the sliding mode controller 27, and sets a value of a flag f/sld/stb indicative of whether the SLD controlled state is stable or not in STEP 10.

Figure 19:
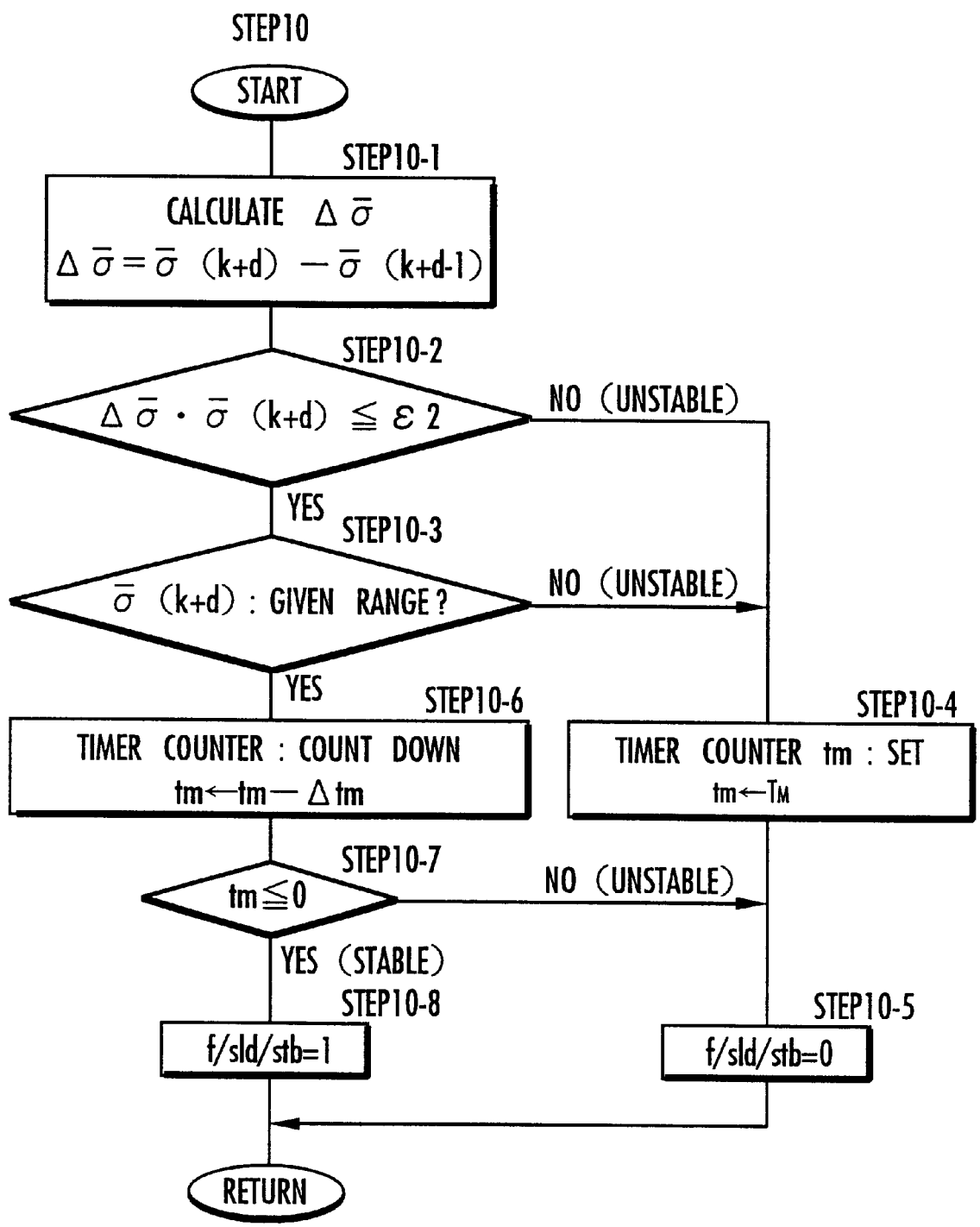

The stability determining subroutine is carried out as shown in FIG. 19.

As shown in FIG. 19, the exhaust-side main processor 13 calculates a difference Δσ bar (corresponding to a rate of change of the switching function σ bar) between the present value σ(k+d) bar of the switching function a bar calculated in STEP9 and a preceding value σ(k+d−1) bar thereof in STEP10-1.

Then, the exhaust-side main processor 13 decides whether or not a product Δσ bar ·σ(k+d) bar (corresponding to the time-differentiated function of a Lyapunov function σ $bar^2$/2 relative to the σ bar) of the difference Δσ bar and the present value σ(k+d) bar is equal to or smaller than a predetermined value $\epsilon 2$ ($\geq 0$) in STEP10-2.

When the difference Δσ bar ·σ(k+d) bar is greater than $\epsilon 2$, the differential outputs VO2(K+d), VO2(k+d−1) change away from the hyperplane σ=0 with σ $bar^2$ increasing, and hence the adaptive sliding mode control process is considered to be unstable, i.e., the SLD manipulating input Usl calculated in STEP9 is inappropriate. Therefore, if Δσ bar ·σ(k+d) bar>$\epsilon 2$ in STEP10-2, then the adaptive sliding mode control process is judged as being unstable, and the value of a timer counter tm (count-down timer) is set to a predetermined initial value TM (the timer counter tm is started) in order to inhibit the determination of the target air-fuel ratio KCMD using the SLD manipulating input Usl calculated in STEP9 for a predetermined time in STEP10-4. Thereafter, the value of the flag f/sld/stb is set to "0" (the flag f/sld/stb=0 represents that the adaptive sliding mode control process is unstable) in STEP10-5.

While the value $\epsilon 2$ used in the decision step of STEP10-2 may theoretically be "0", it should preferably be slightly greater than "0" in view of the effect of probabilistic disturbance.

If Δσ bar ·σ(k+d) bar$\leq \epsilon 2$ in STEP10-2, then the exhaust-side main processor 13 decides whether the present value σ(k+d) bar of the linear function σ bar falls within a predetermined range or not in STEP10-3.

If the present value σ(k+d) bar of the linear function σ bar does not fall within the predetermined range, the differential outputs VO2(K+d), VO2(k+d−1) are spaced widely apart from the hyperplane σ=0, and hence the adaptive sliding mode control process is considered to be unstable, i.e., the SLD manipulating input Usl calculated in STEP9 is inappropriate. Therefore, if the present value σ(k+d) bar of the linear function σ bar does not fall within the predetermined range in STEP10-3, then the adaptive sliding mode control process is judged as being unstable, and the processing of STEP10-4 and STEP10-5 is executed to start the timer counter tm and set the value of the flag f/sld/stb to "0".

If the present value σ(k+d) bar of the linear function σ bar falls within the predetermined range in STEP10-3, then the exhaust-side main processor 13 counts down the timer counter tm for a predetermined time Δtm in STEP10-6. The exhaust-side main processor 13 then decides whether or not the value of the timer counter tm is equal to or smaller than "0", i.e., whether a time corresponding to the initial value TM has elapsed from the start of the timer counter tm or not, in STEP10-7.

If tm>0, i.e., if the timer counter tm is still measuring time and its set time has not yet elapsed, then since the adaptive sliding mode control process tends to be unstable before substantial time has not elapsed since the adaptive sliding mode control process was judged as being unstable in STEP10-2 or STEP10-3, the value of the flag f/sld/stb is set to "0" in STEP10-5.

If tm$\leq$0 in STEP10-7, i.e., if the set time of the timer counter tm has elapsed, then the adaptive sliding mode control process is judged as being stable, and the value of the flag f/sld/stb is set to "1" (the flag f/sld/stb=1 represents that the adaptive sliding mode control process is stable) in STEP10-8.

The exhaust-side main processor 13 determines the stability of the adaptive sliding mode control process carried out by the sliding mode controller 27 according to the subroutine shown in FIG. 19. If the adaptive sliding mode control process is judged as being unstable, then the value of the flag f/sld/stb is set to "0", and if the adaptive sliding mode control process is judged as being stable, then the value of the flag f/sld/stb is set to "1".

In the present embodiment, the stability of the adaptive sliding mode control process is determined by judging the conditions of STEP10-2, STEP10-3. However, the stability of the adaptive sliding mode control process may be determined by judging either one of the conditions of STEP10-2, STEP10-3, e.g., by judging the condition of STEP10-2. Alternatively, the stability of the adaptive sliding mode control process may be determined by comparing the magnitude (absolute value) of the difference $\Delta\sigma$ corresponding to the rate of change of the linear function a bar with a predetermined value.

Referring back to FIG. 9, after a value of the flag f/sld/stb indicative of the stability of the adaptive sliding mode control process carried out by the sliding mode controller 27 has been set, the exhaust-side main processor 13 determines the value of the flag f/sld/stb in STEP11. If the value of the flag f/sld/stb is "1", i.e., if the adaptive sliding mode control process is judged as being stable, then the sliding mode controller 27 limits the SLD manipulating input Usl calculated in STEP9 in STEP12. Specifically, the value of the SLD manipulating input Usl or a range in which the value of the SLD manipulating input Usl can vary is limited to a certain range, and if the present value Usl(k) of the SLD manipulating input Usl calculated in STEP9 exceeds a given upper or lower limit, then the value of the SLD manipulating input Usl is forcibly limited to the upper or lower limit. If a change of the present value Usl(k) of the SLD manipulating input Usl calculated in STEP9 from a preceding value Usl(k−1) thereof exceeds a predetermined quantity, then the value of the SLD manipulating input Usl is forcibly set to a value which is equal to the sum of the preceding value Usl(k−1) and the predetermined quantity.

After having limited the SLD manipulating input Usl as described above, the sliding mode controller 27 calculates the target air-fuel ratio KCMD according to the equation (28) in STEP 14. Then, the processing of the present control cycle is finished.

If the value of the flag f/sld/stb is "0", i.e., if the adaptive sliding mode control process is judged as being unstable, then the exhaust-side main processor 13 sets the value of the SLD manipulating input Usl in the present control cycle forcibly to a predetermined value, i.e., either a fixed value or a preceding value of the SLD manipulating input Usl, in STEP 13. Thereafter, the sliding mode controller 27 calculates the target air-fuel ratio KCMD according to the equation (28) in STEP14, followed by an end put to the processing of the present control cycle.

The target air-fuel ratio KCMD that is finally determined in STEP14 is stored as time-series data for respective control cycles in a memory (not shown). When the general feedback controller 15, etc. is to use the target air-fuel ratio KCMD determined by the exhaust-side main processor 13 (see STEPf in FIG. 8), the general feedback controller 15 selects the latest target air-fuel ratio KCMD from the stored time-series data thereof.

The operation of the system according to the present embodiment has been described in detail above.

The operation of the system will be summarized as follows: The exhaust-side main processor 13 sequentially determines the target air-fuel ratio KCMD (corresponding to the target input for the object exhaust system E) for the exhaust gas introduced into the catalytic converter 3 so as to adjust (converge) the output signal VO2/OUT (corresponding to the output of the object exhaust system E as the plant) of the $O_2$ sensor 6 downstream of the catalytic converter 3 to the target value VO2/TARGET therefor. The amount of fuel supplied to the internal combustion engine 1 as the actuator for generating the input (the air-fuel ratio of the exhaust gas) to the object exhaust system E is feedback-controlled according to the target air-fuel ratio KCMD based on the target air-fuel ratio KCMD and the output KACT of the LAF sensor 5 upstream of the catalytic converter 3. By adjusting the output signal VO2/OUT of the $O_2$ sensor 6 downstream of the catalytic converter 3 to the target value VO2/TARGET, the catalytic converter 3 can maintain its optimum exhaust gas purifying performance without being affected by its own aging.

Concurrent with the above fuel control for the internal combustion engine 1, the exhaust-side main processor 13 determines a deterioration level representing the deteriorated state (degree of deterioration) of the catalytic converter 3 based on the data of the identified gain coefficients a1 hat, a2 hat, b1 hat of the exhaust system model that are sequentially determined by the identifier 25. Depending on the determined deterioration level, the deteriorated state of the catalytic converter 3 is indicated by the deterioration indicator 29.

The system according to the present embodiment is thus capable of determining the deteriorated state (determining the deterioration level) of the catalytic converter 3 without interrupting, but concurrent with, the control of the air-fuel ratio while the internal combustion engine 1 is operating in an ordinary state in which the air-fuel ratio of the internal combustion engine 1 is controlled in order to achieve an optimum purifying capability of the catalytic converter 3.

The deteriorated state is determined using the deterioration determining data which are central values of the least squares of the data of the identified gain coefficients a1 hat, a2 hat, b1 hat, and the deterioration determining data are classified according to the flow rate ranges of the exhaust gas at the time the identified gain coefficients a1 hat, a2 hat, b1 hat are determined. Therefore, the deterioration determining data A1/H, A1/M, A2/H, A2/M, B1/H, B1/M determined based on combinations of the identified gain coefficients a1 hat, a2 hat, b1 hat and the flow rate ranges are distinctly correlated to the deteriorated state of the catalytic converter 3. As a result, when the deterioration level of the catalytic converter 3 is determined from the deterioration determining data A1/H, A1/M, A2/H, A2/M, B1/H, B1/M, the deteriorated state of the catalytic converter 3 can be determined with accuracy.

In the present embodiment, the target air-fuel ratio KCMD of the internal combustion engine 1 is calculated using the sliding mode controller 27 which is resistant to the effect of disturbances, the estimator 26 which compensates for the effect of the dead times d1, d2 of the object exhaust system E and the air-fuel manipulating system, and the identifier 25 which sequentially identifies on a real-time basis the gain coefficients a1, a2, b1 which are parameters of the exhaust system model that expresses the behavior of the object exhaust system E. Therefore, it is possible to accurately determine the target air-fuel ratio KCMD optimum for controlling the output VO2/OUT of the $O_2$ sensor 6 at the target value VO2/TARGET therefor.

The air-fuel ratio of the internal combustion engine 1 is controlled to converge the output KACT of the LAF sensor 5 to the target air-fuel ratio KCMD primarily by the adaptive controller 18 which is a controller of the recursive type capable of accurately compensating for the effect of behavioral changes of the internal combustion engine 1. Thus, the output VO2/OUT of the $O_2$ sensor 6 can stably be controlled at the target value VO2/TARGET therefor. Therefore, the behavior of the object exhaust system E is stabilized, and the identified gain coefficients a1 hat, a2 hat, b1 hat which are identified values of the gain coefficients a1, a2, b1 can stably be determined by the identifier 25. Since the identified gain coefficients a1 hat, a2 hat, b1 hat can stably be determined, the deteriorated state of the catalytic converter 3 can stably be determined based on the identified gain coefficients a1 hat, a2 hat, b1 hat.

In the present invention, the identifier 25 calculates (updates) the identified gain coefficients a1 hat, a2 hat, b1 hat when the object exhaust system E is in a behavioral state in which the air-fuel ratio is changed from a leaner value to a richer value. The above behavioral state of the object exhaust system E can simply and reliably be recognized using the management function γ defined using the time-series data of the differential output VO2 of the $O_2$ sensor 6. Therefore, it is possible to control the air-fuel ratio of the internal combustion engine 1 and also to determine the identified gain coefficients a1 hat, a2 hat, b1 hat that are highly reliable and suitable for evaluating the deteriorated state of the catalytic converter 3.

In calculating the identified error id/e used to sequentially update the identified gain coefficients a1 hat, a2 hat, b1 hat, the identified differential output VO2 hat corresponding to the output VO2/OUT of the $O_2$ sensor 6 on the exhaust system model and the actual differential output VO2 of the $O_2$ sensor 6 are subjected to a filtering process of the same frequency characteristics (low-pass characteristics), in view of the frequency characteristics (low-pass characteristics) of the object exhaust system E. Therefore, it is possible to identify the gain coefficients a1, a2, b1 in a manner to cause the frequency characteristics of the exhaust system model to match the actual frequency characteristics of the object exhaust system E, for thereby determining the identified gain coefficients a1 hat, a2 hat, b1 hat that match the behavioral characteristics of the object exhaust system E. Therefore, the reliability of the identified gain coefficients a1 hat, a2 hat, b1 hat is increased.

In sequentially calculating the identified gain coefficients a1 hat, a2 hat, b1 hat, the above limiting process is performed to determine the identified gain coefficients a1 hat, a2 hat, b1 hat which are suitable to make smooth and stable the target air-fuel ratio KCMD and the air-fuel ratio of the internal combustion engine 1 controlled thereby. At the same time, it is possible to stably determine an identified gain coefficient b1 hat highly reflecting the deteriorated state of the catalytic converter 3 while eliminating an identified gain coefficient b1 hat which is not suitable for evaluating the deteriorated state of the catalytic converter 3.

Furthermore, in the exhaust system model and the processing operation of the identifier 25, the output KACT from the LAF sensor 5 and the output VO2/OUT from the $O_2$ sensor 6 are not directly used, but the difference kact between the output KACT from the LAF sensor 5 and the reference value FLAF/BASE and the difference VO2 between the output VO2/OUT from the $O_2$ sensor 6 and the target value VO2/TARGET (reference value) are used. Therefore, the algorithm of the processing operation of the identifier 25 is constructed easily, and the accuracy of the processing operation of the identifier 25 is increased. This holds true for the processing operation of the estimator 26 and the sliding mode controller 27.

In the present embodiment, since the highly reliable identified gain coefficients a1 hat, a2 hat, b1 hat can be determined, the deteriorated state of the catalytic converter 3 can accurately be determined based on the identified gain coefficients a1 hat, a2 hat, b1 hat.

A second embodiment of the present invention will be described below with reference to FIGS. 20 and 21. The second embodiment differs from the first embodiment only with respect to a portion of the process of determining the deteriorated state of the catalytic converter, and the system details thereof will not be described below, using reference characters identical to those in the first embodiment. Various processing details (system operation) which are identical to those in the first embodiment will not be described in detail below, using the figures described above. In the second embodiment, the internal combustion engine 1 is mounted as a propulsion source on a motor vehicle such as an automobile or a hybrid vehicle, and the system shown in FIG. 1 is mounted on the motor vehicle. In the present invention, there is provided a sensor (not shown) for detecting the vehicle speed of the motor vehicle.

In the first embodiment, each time the identified gain coefficients a1 hat, a2 hat, b1 hat are determined in STEP5, the deterioration determining data A1/H, A1/M, A2/H or A2/M, B1/H, B1/M are updated to determine the deterioration level of the catalytic converter 3. However, in a situation where the output VO2/OUT of the $O_2$ sensor 6 is maintained extremely stably at the target value VO2/TAEGET, the differential output kact of the LAF sensor 5 and the differential output VO2 of the $O_2$ sensor 6 used to determine the identified gain coefficients a1 hat, a2 hat, b1 hat are kept substantially constant, and information for appropriately determining the identified gain coefficients a1 hat, a2 hat, b1 hat becomes insufficient (many values of kact, VO2 are not available). Therefore, the determined values of the identified gain coefficients a1 hat, a2 hat, b1 hat are liable to have errors with respect to their true values (so-called drifting occurs). If the deterioration determining data A1/H, A1/M, A2/H, A2/M, B1/H, B1/M are updated using the identified gain coefficients a1 hat, a2 hat, b1 hat with such errors, and the deterioration level of the catalytic converter 3 is determined based on the deterioration determining data thus updated, then the determined deterioration level is low in accuracy.

The second embodiment is arranged to avoid the above shortcoming, and will be described below.

In the second embodiment, it is determined in each control cycle whether the differential output kact of the LAF sensor 5 and the differential output $vO_2$ of the $O_2$ sensor 6 are substantially constant or not, or stated otherwise whether the output KACT of the LAF sensor 5 and the output VO2/OUT of the $O_2$ sensor 6 are substantially constant or not. Since a situation where the differential output kact of the LAF sensor 5 and the differential output VO2 of the $O_2$ sensor 6 are substantially constant occurs when the intake quantity of the internal combustion engine 1, specifically the intake quantity per combustion cycle which depends on the intake pressure PB, is kept substantially constant, or when the vehicle speed of the motor vehicle on which the internal combustion engine 1 is mounted is kept substantially constant, it is also determined in each control cycle whether the intake quantity of the internal combustion engine 1 and the vehicle speed of the motor vehicle are substantially constant or not. Based on these determined results, it is determined whether the identified gain coefficients a1 hat, a2 hat, b1 hat obtained in each control cycle are appropriate for determining the deteriorated state of the catalytic converter 3 or not. Only if the identified gain coefficients a1 hat, a2 hat, b1 hat are appropriate for determining the deteriorated state of the catalytic converter 3, the deterioration determining data A1/H, A1/M, A2/H, A2/M, B1/H, B1/M are updated using those identified gain coefficients a1 hat, a2 hat, b1 hat, and the deterioration level of the catalytic converter 3 is determined using the updated deterioration determining data.

Specifically, such a process is carried out by the catalytic converter deterioration decision processor 27 (see FIG. 3) in STEP6 shown in FIG. 9 according to a flow-chart of FIG. 20.

First, the catalytic converter deterioration decision processor 27 calculates an estimated exhaust gas flow rate ab/SV in STEP6-1, and then determines whether the identified gain coefficients a1 hat, a2 hat, b1 hat determined in STEP5 (see FIG. 9) in the present control cycle are appropriate for determining the deteriorated state of the catalytic converter 3 or not, and sets a flag f/pe in STEP6-1. If the flag f/pe is "1", it indicates that the identified gain coefficients a1 hat, a2 hat, b1 hat are appropriate for determining the deteriorated state of the catalytic converter 3, and if the flag f/pe is "0", it indicates that the identified gain coefficients a1 hat, a2 hat, b1 hat are not appropriate for determining the deteriorated state of the catalytic converter 3.

Figure 21:
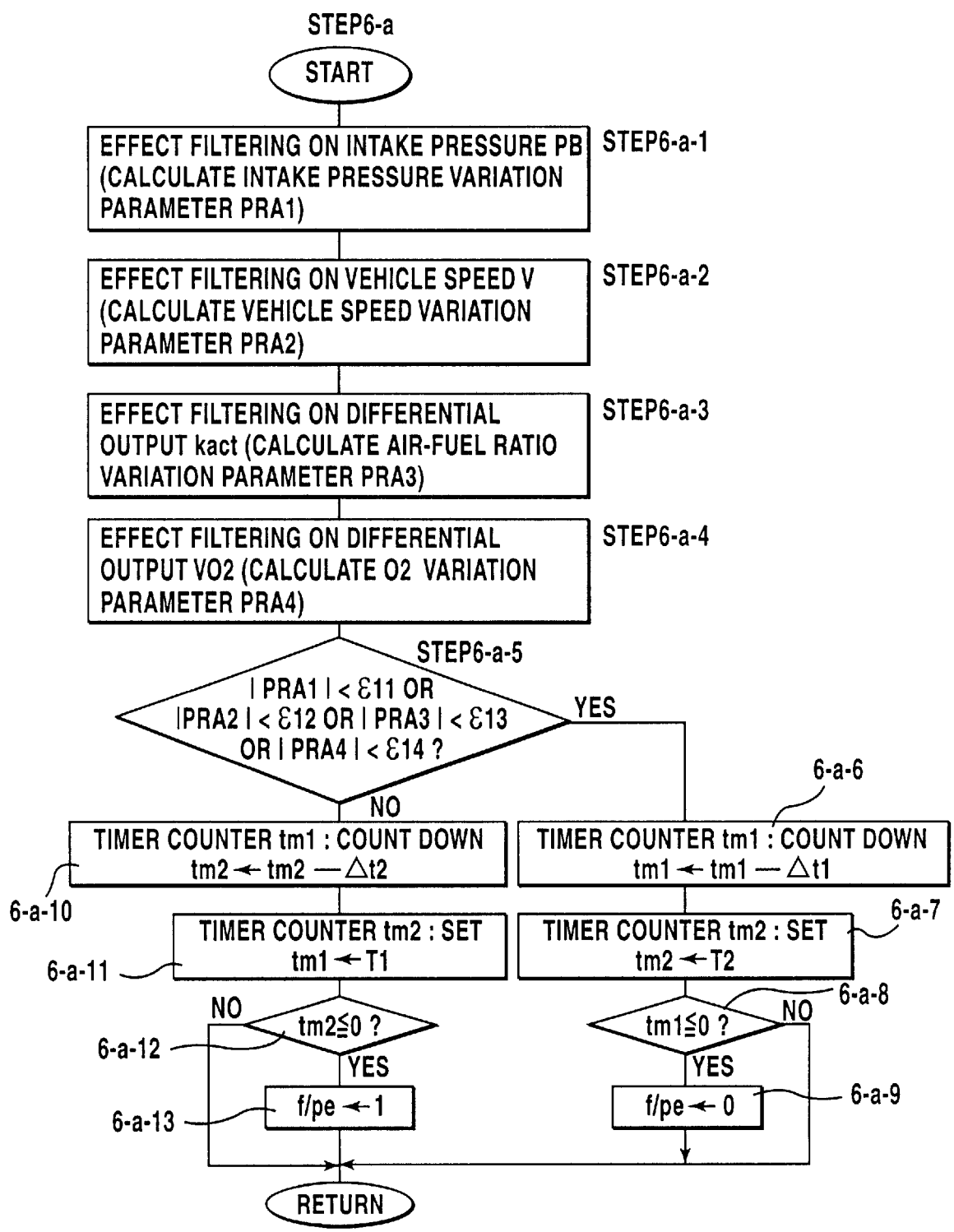

The decision process in STEP6-$a$ is performed as shown in FIG. 21. The catalytic converter deterioration decision processor 28 effects a high-pass filtering process on the detected data of the intake pressure PB, the detected data of the vehicle speed V, the data of the differential output kact of the LAF sensor 5, and the detected data of the differential output VO2 of the $O_2$ sensor 6, thus determining an intake pressure variation parameter PRA1, a vehicle speed variation parameter PRA2, an air-fuel ratio variation parameter PRA3, and $O_2$ variation parameter PRA4, which represent varied states of the data, in STEP6-$a$-1 through STEP6-$a$-4.

The filtering process is carried out by adding changes of the values of the data in each control cycle, i.e., the differences between present and previous values, over a predetermined number of control cycles (e.g., 3 control cycles) from the present to the past. Therefore, the above variation parameters PRA1–PRA4 obtained by the above filtering process correspond to rates of change of the intake pressure PB, the vehicle speed V, the differential output kact of the LAF sensor 5, and the differential output VO2 of the $O_2$ sensor 6, respectively. If the intake pressure variation parameter PRA1 is close to "0", then it means that the intake pressure PB is substantially constant, i.e., its time-dependent variation is small. This holds true for the other variation parameters PRA2–PRA4.

The fact that the intake pressure PB is substantially constant is equivalent to the fact that the intake quantity of the internal combustion engine 1 is substantially constant. The fact that the differential output kact and the differential output VO2 are substantially constant is equivalent to the fact that the output KACT of the LAF sensor 5 and the output VO2/OUT of the $O_2$ sensor 6 are substantially constant.

After having determined the variation parameters PRA1–PRA4, the catalytic converter deterioration decision processor 27 compares the absolute values of the variation parameters PRA1–PRA4 with respective corresponding threshold values $\epsilon_{11}$, $\epsilon_{12}$, $\epsilon_{13}$, $\epsilon_{14}$, which are sufficiently small positive values, in STEP6-$a$-5.

If the state in which any of the absolute values |PRA1|, |PRA2|, |PRA3|, |PRA4|0 of the variation parameters PRA1–PRA4 is smaller than the corresponding one of the threshold values $\epsilon_{11}$, $\epsilon_{12}$, $\epsilon_{13}$, $\epsilon_{14}$, i.e., any of the intake pressure PB, the vehicle speed V, the differential output kact, and the differential output VO2 is substantially constant, continues for a predetermined time T1, then the catalytic converter deterioration decision processor 28 determines that it is not appropriate to use the identified gain coefficients a1 hat, a2 hati b1 hat determined by the identifier 25 in STEP5 for determining the deteriorated state of the catalytic converter 3. If the state in which all of the absolute values |PRA1|, |PRA2|, |PRA3|, |PRA4| of the variation parameters PRA1–PRA4 are equal to or greater than the corresponding threshold values $\epsilon_{11}$, $\epsilon_{12}$, $\epsilon_{13}$, $\epsilon_{14}$, i.e., all of the intake pressure PB, the vehicle speed V, the differential output kact, and the differential out-put VO2 suffer time-dependent variations, continues for a predetermined time T2, then the catalytic converter deterioration decision processor 28 determines that it is appropriate to use the identified gain coefficients a1 hat, a2 hat, b1 hat determined by the identifier 25 in STEP5 for determining the deteriorated state of the catalytic converter 3.

If any of the conditions |PRA1|<$\epsilon_{11}$, |PRA2|<$\epsilon_{12}$, |PRA3|<$\epsilon_{13}$, |PRA4|<$\epsilon_{14}$ is satisfied in STEP6-$a$-5, then the catalytic converter deterioration decision processor 27 counts down the value of a timer counter tm1 (count-down timer) whose initial value is set to the time T1, by a predetermined value $\Delta t$ in each control cycle, to see if that state continues for the time T1 in STEP6-$a$-6. The catalytic converter deterioration decision processor 28 initializes the value of a timer counter tm2 (count-down timer) to the time T2 in STEP6-$a$-7.

Then, the catalytic converter deterioration decision processor 27 determines whether the timer counter tm1 becomes "0" or lower, i.e., whether the state in which any of the conditions |PRA1|<$\epsilon_{11}$, |PRA2|<$\epsilon_{12}$, |PRA3|<$\epsilon_{13}$, |PRA4|<$\epsilon_{14}$ has continued for the time T1 or not, in STEP6-$a$-8. If tm1$\leq$0, then the catalytic converter deterioration decision processor 28 determines that it is not appropriate to use the identified gain coefficients a1 hat, a2 hat, b1 hat determined by the identifier 25 in STEP5 for determining the deteriorated state of the catalytic converter 3, and sets the value of the flag f/pe to "0" in STEP6-$a$-9. If tm1>0 in STEP6-$a$-8, then the catalytic converter deterioration decision processor 28 keeps the value of the flag f/pe as it is (the initial value of the flag f/pe is "1"). Thereafter, control returns to the flowchart of FIG. 20.

If all of the conditions |PRA1|$\geq$$\epsilon_{11}$, |PRA2|$\geq$$\epsilon_{12}$, |PRA3|$\geq$$\epsilon_{13}$, |PRA4|$\geq$$\epsilon_{14}$ are satisfied in STEP6-$a$-5, i.e., all of the intake pressure PB, the vehicle speed V, the differential output kact, and the differential output VO2 suffer certain time-dependent variations, then the catalytic converter deterioration decision processor 27 counts down the value of the timer counter tm2 which measures the time T2, by a predetermined value $\Delta t$ in each control cycle, in STEP6-$a$-10. The catalytic converter deterioration decision processor 28 initializes the value of the timer counter tm1 relative to STEP6-$a$-6 to the time T1, i.e., its initial value, in STEP6-$a$-11.

The catalytic converter deterioration decision processor 27 determines whether the timer counter tm2 becomes "0" or lower, i.e., whether the state in which any of the conditions |PRA1|$\geq$$\epsilon_{11}$, |PRA2|$\geq$$\epsilon_{12}$, |PRA3|$\epsilon_{13}$, |PRA4|$\geq$$\epsilon_{14}$ has continued for the time T1 or not, in STEP6-$a$-12. If tm2$\geq$0, then the catalytic converter deterioration decision processor 28 determines that it is appropriate to use the identified gain coefficients a1 hat, a2 hat, b1 hat determined by the identifier 25 in STEP5 for determining the deteriorated state of the catalytic converter 3, and sets the value of the flag f/pe to "1" in STEP6-$a$-13. If tm2>0 in STEP6-$a$-12, then the catalytic converter deterioration decision processor 28 keeps the value of the flag f/pe as it is. Thereafter, control returns to the flowchart of FIG. 20.

In the above process, if the state in which any of the intake pressure PB, the vehicle speed V, the differential output kact, and the differential output VO2 is substantially constant (YES in STEP6-*a*-5) continues for the time t1, then it is determined that it is not appropriate to use the identified gain coefficients a1 hat, a2 hat, b1 hat determined by the identifier 25 in STEP5 for determining the deteriorated state of the catalytic converter 3 (the flag f/pe is set to f/pe=0). If the above state does not continue for the time T1, but is temporary, then since the above drifting of the identified gain coefficients a1 hat, a2 hat, b1 hat will not immediately occur, it is not determined that it is not appropriate to use the identified gain coefficients a1 hat, a2 hat, b1 hat for determining the deteriorated state of the catalytic converter 3 (the flag f/pe remains to be f/pe=1).

After it has been determined that it is not appropriate to use the identified gain coefficients a1 hat, a2 hat, b1 hat for determining the deteriorated state of the catalytic converter 3, if the state in which all of the intake pressure PB, the vehicle speed V, the differential output kact, and the differential output VO2 suffer certain time-dependent variations (YES in STEP6-*a*-5) continues for the time T2, then it is determined that it is appropriate to use the identified gain coefficients a1 hat, a2 hat, b1 hat determined by the identifier 25 in STEP5 for determining the deteriorated state of the catalytic converter 3 (the flat f/pe is set to f/pe=0). The continuation of the state for the time T2 is used as a condition in order to exclude a situation in which the intake pressure PB, the vehicle speed V, the differential output kact, and the differential output VO2 temporarily vary due to noise.

In the present embodiment, the times T1, T2 are selected such that T1>T2. This is because the above drifting of identified gain coefficients a1 hat, a2 hat, b1 hat which is caused when the intake pressure PB, the vehicle speed V, the differential output kact, and the differential output VO2 are kept substantially constant progresses relatively slowly, and the above drifting is eliminated relatively quickly when the intake pressure PB, the vehicle speed V, the differential output kact, and the differential output VO2 vary.

Referring back to FIG. 20, after having made the decision and having set the flag f/pe STEP6-*a*, the catalytic converter deterioration decision processor 27 determines the values of the flag f/pe in STEP6-*b*. If f/pe=1, i.e., if it is determined that the identified gain coefficients a1 hat, a2 hat, b1 hat determined by the identifier 25 in STEP5 are appropriate for determining the deteriorated state of the catalytic converter 3, then the catalytic converter deterioration decision processor 28 performs the processing in STEP6-2 through STEP6-10 to determine the deterioration level of the catalytic converter 3.

If f/pe=0 in STEP6-*b*, then control skips the processing in STEP6-2 through STEP6-10 and returns to the main routine shown in FIG. 9. In this case, the deterioration level of the catalytic converter 3 is not updated, but is maintained at its present value.

The processing details of the flowchart shown in FIG. 20 other than those described above are exactly the same as those described above according to the first embodiment.

In the second embodiment, in the situation where the differential output kact of the LAF sensor 5 and the differential output VO2 of the $O_2$ sensor 6 are kept substantially constant, or in the situation where the intake pressure PB of the internal combustion engine 1 and the vehicle speed V of the motor vehicle are kept substantially constant, making it likely to keep the differential outputs kact, VO2 substantially constant, i.e., in the situation where the identified gain coefficients a1 hat, a2 hat, b1 hat determined by the identifier 25 in STEP5 are drifted and suffer steady errors, the deterioration level of the catalytic converter 3 is not determined using the identified gain coefficients a1 hat, a2 hat, b1 hat, but is kept at the present value.

Accordingly, the reliability of the determined deteriorated state (the deterioration level) of the catalytic converter 3 is increased.

In the present embodiment, if any of the intake pressure PB, the vehicle speed V, the differential output kact, and the differential output VO2 is kept substantially constant, the deteriorated state of the catalytic converter 3 is not determined. While the motor vehicle is actually running, the above state does not usually continue for a long period of time. Therefore, the opportunity to determine the deteriorated state of the catalytic converter 3 is not greatly limited compared with the system according to the first embodiment, and the deteriorated state of the catalytic converter 3 can be determined in various operation states of the internal combustion engine 1.

In the present embodiment, if any of the intake pressure PB, the vehicle speed V, the differential output kact, and the differential output VO2 is kept substantially constant, the deteriorated state of the catalytic converter 3 is not determined. However, the deteriorated state of the catalytic converter 3 may not be determined if a plurality of ones of the intake pressure PB, the vehicle speed V, the differential output kact, and the differential out-put VO2 are kept substantially constant, and may be determined otherwise. Alternatively, only either one of the intake pressure PB, the vehicle speed V, the differential output kact, and the differential output VO2 may be monitored, and the deteriorated state of the catalytic converter 3 may not be determined if the monitored data is kept substantially constant.

In the present embodiment, the intake pressure PB is used as a substitute for the intake quantity of the internal combustion engine 1. However, the intake quantity may be estimated from the intake pressure PB and the fuel injection quantity of the internal combustion engine 1, or may be directly detected by a flow sensor, and if the estimated or detected intake quantity is kept substantially constant, then the deteriorated state of the catalytic converter 3 may not be determined.

While the first and second embodiments have been described above, the present invention is not limited to those embodiments, but various variations and modifications may be made therein as described below.

In the above embodiments, all of the identified gain coefficients a1 hat, a2 hat, b1 hat determined by the identifier 25 are used to determine the deteriorated state of the catalytic converter 3. However, the deteriorated state of the catalytic converter 3 may be determined based on one or two of the identified gain coefficients a1 hat, a2 hat, b1 hat.

For example, if the deteriorated state of the catalytic converter 3 is to be determined based on either the identified gain coefficient a1 hat or a2 hat, then the temporary deterioration level LV/A1 shown in Table 1 above which corresponds to the identified gain coefficient a1 hat, or the temporary deterioration level LV/A2 shown in Table 2 above which corresponds to the identified gain coefficient a2 hat can directly be used to determine the deteriorated state of the catalytic converter 3 as being classified in three levels, i.e., the deterioration level 0, the deterioration level 1, and two or more deterioration levels (the deterioration level 2 or the deterioration level 3) shown in FIG. 5. In this case, if more threshold values are used for comparison with the deterioration determining data A1/H, A1/M or A2/H, A2/M, the deteriorated state of the catalytic converter 3 can be determined as being classified in more deterioration levels.

If the deteriorated state of the catalytic converter 3 is to be determined based on both the identified gain coefficients a1 hat, a2 hat, then the deteriorated state of the catalytic converter 3 can be determined as being classified into three levels, i.e., the levels 0–2, using a greater one (=max (LV/A1, LV/A2) of the temporary deterioration level LV/A1 shown in Table 1 and the temporary deterioration level LV/A2 shown in Table 2.

If it is sufficient to determine the deteriorated state of the catalytic converter 3 as being classified in the deterioration level 0 or the deterioration level 1 shown in FIG. 5, e.g., if the service life of the catalytic converter 3 expires in the deterioration level 1 and the catalytic converter 3 is to be replaced with a brand-new one, then it is possible to determine the deteriorated state of the catalytic converter 3 based on only the identified gain coefficient b1 hat. In this case, the deterioration level of the catalytic converter 3 is determined as "1" if one of the deterioration determining data B1/H determined as described above with respect to the high flow rate range and the deterioration determining data B1/M determined as described above with respect to the medium flow rate range, or both the deterioration determining data B1/H, B1/M exceed the corresponding threshold values X/B1M 2, X/B1M2 (see FIG. 5(c)). Otherwise, the deterioration level of the catalytic converter 3 is determined as "0".

Alternatively, using the temporary deterioration level LV/B1 shown in Table 3, the deterioration levels up to the level 1 shown in FIG. 5 may be determined as being classified in three levels.

As the deterioration of the catalytic converter 3 progresses to a certain extent, as shown in FIG. 5(c), the identified gain coefficient b1 hat or the values of the corresponding deterioration determining data B1/H, B1/M change from an increasing tendency to a decreasing tendency, i.e., the values of the deterioration determining data B1/H, B1/M reach a maximum value while the deterioration of the catalytic converter 3 is in progress. Therefore, the deteriorated state of the catalytic converter 3 cannot be determined as being classified in four levels, i.e., the deterioration levels 0–3, shown in FIG. 5 only by comparing the values of the deterioration determining data B1/H, B1/M with the corresponding threshold values X/B1H1, X/B1H2, X/B1M1, X/B1M2 shown in FIG. 5(c). According to a process to be described below, however, it is possible to determine the deteriorated state of the catalytic converter 3 as being classified in four levels, i.e., the deterioration levels 0–3, shown in FIG. 5, based on only the identified gain coefficient b1 hat. Such a process will be described below according to a third embodiment of the present invention.

Figure 18:
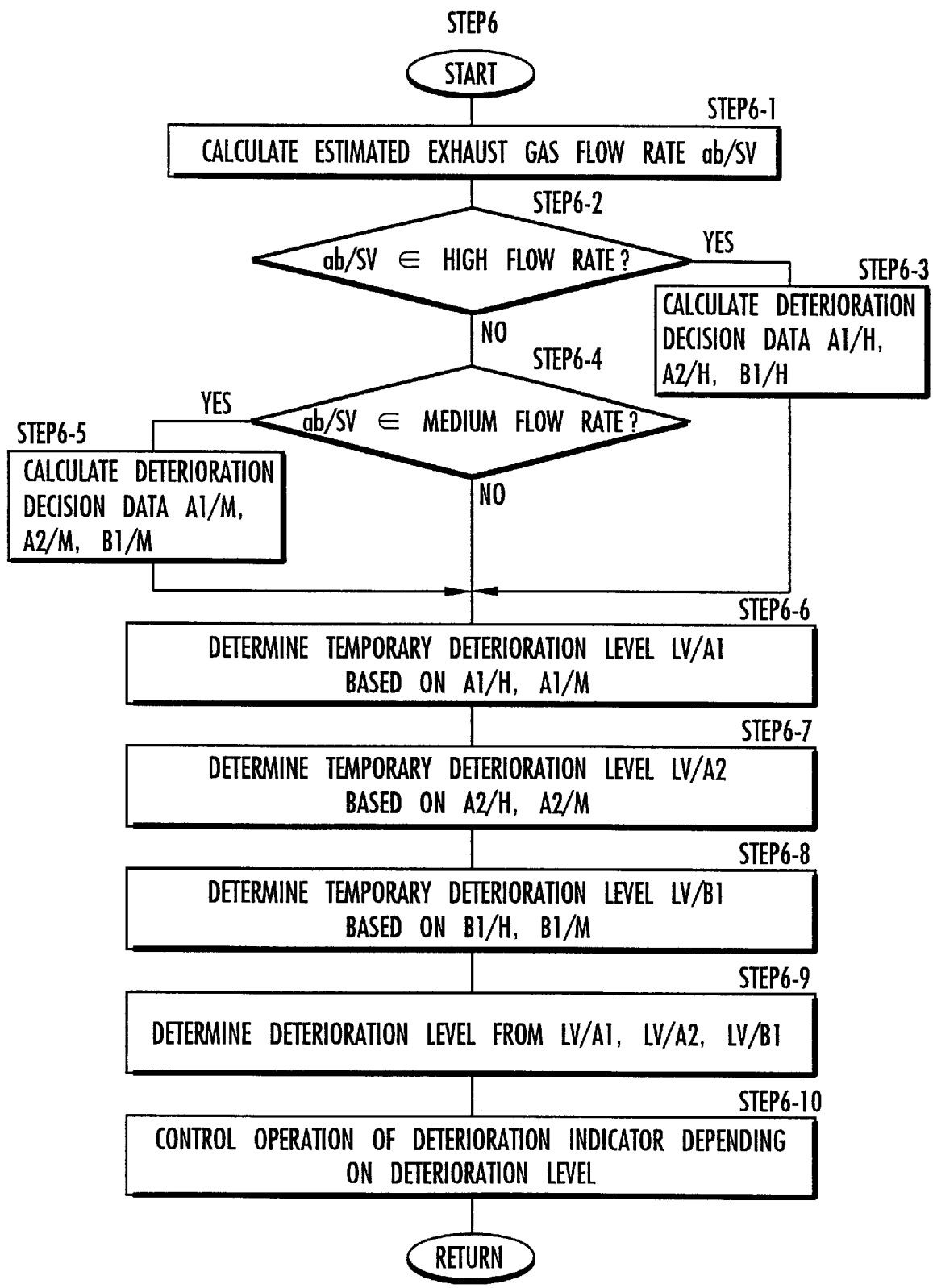
Figure 22:
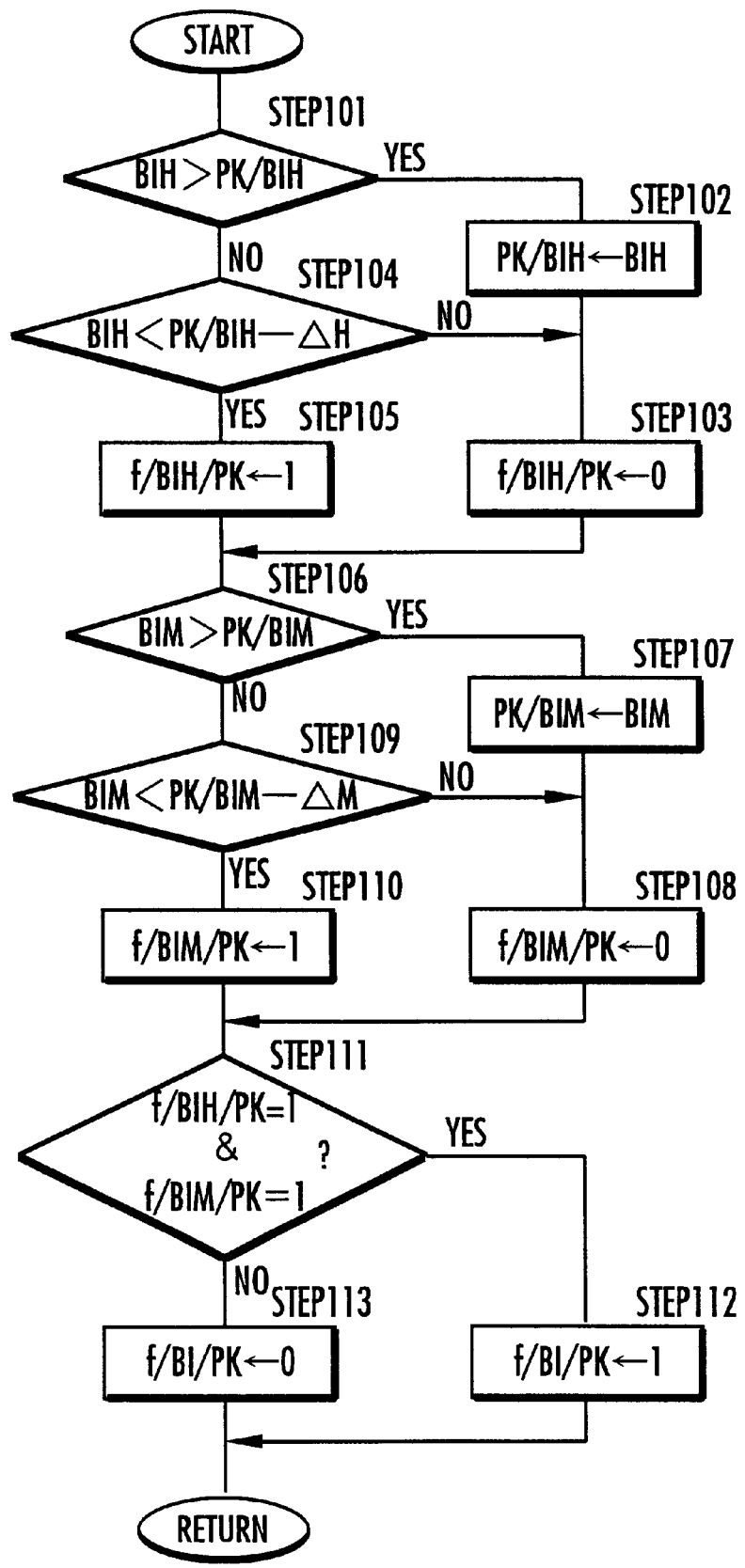
FIG. 22 is a flowchart of a method of determining a deteriorated state of a catalytic converter for purifying an exhaust gas, according to a third embodiment of the present invention.

According to the third embodiment, each time the deterioration determining data B1/H, B1/M corresponding to the identified gain coefficient b1 hat are newly determined according to the processing in STEP6-1 through STEP6-5 shown in FIG. 18 or 20, a processing sequence shown in the flowchart of FIG. 22 is executed.

First, the value of the newly determined deterioration determining data B1/H and a parameter PK/B1M (hereinafter referred to as a maximum parameter PK/B1M) holding the maximum value of the deterioration determining data B1/H determined from the brand-new state of the catalytic converter 3 to the present time are compared with each other in STEP101. The maximum parameter PK/B1M has an initial value "0", for example.

If B1/H>PK/B1M, then the maximum parameter PK/B1M is updated into the value of the new deterioration determining data B1/H in STEP102. Then, the value of a flat f/B1H/PK, which is "1" if the deterioration determining data B1/H has a maximum value and "0" if not, is set to "0" in STEP103.

If B1/H≦PK/B1M, then it is determined whether the value of the deterioration determining data B1/H is smaller than the value of the present maximum parameter PK/B1M by a predetermined quantity ΔH (>0) or not in STEP104. If B1/H<PK/B1M−ΔH, then the deterioration determining data B1/H is judged as having a maximum value, and the value of the flag f/B1H/PK is set to "1" in STEP105. If B1/H≧PK/B1M−ΔH, then since the value of the deterioration determining data B1/H in its increasing tendency may temporarily be reduced due to noise or the like, control goes to STEP103 in which the value of the flat f/B1H/PK is set to "0".

The deterioration determining data B1/M is also processed in exactly the same manner as described above. A maximum parameter PK/B1 M corresponding to the deterioration determining data B1/M is updated, and the value of a flag f/B1M/PK is set in STEP 106 through STEP110. A predetermined quantity ΔM used in STEP109 corresponds to the predetermined quantity ΔH used in STEP104. As with STEP104, the processing in STEP109 is carried out to prevent the flag f/B1M/PK from being set to "1" in error (the deterioration determining data B1/M is regarded as having a maximum value) when the value of the deterioration determining data B1/M in its increasing tendency temporarily is reduced.

The values of the maximum parameters PK/B1M, PK/B1 M and the flags f/B1H/PK, f/B1M/PK are stored in a nonvolatile memory (not shown) so that they will not be lost when the internal combustion engine 1 is shut off.

According to the above processing, information indicative of whether each of the deterioration determining data B1/H, B1/M has had a maximum value or not is stored as the value of one of the flags f/B1H/PK, f/B1M/PK.

Then, it is determined whether both the values of the flags f/B1H/PK, f/B1M/PK are "1" or not in STEP111. If both the values of the flags f/B1H/PK, f/B1M/PK are "1", then the value of a flag f/B1/PK, which is "1" if both the deterioration determining data B1/H, B1/M have had a maximum value and "0" if not, is set to "1" in STEP112. If the condition of STEP109 is not satisfied, the value of the flag f/B1/PK is set to "0" in STEP113. The value of the flag f/B1/PK is also stored in a non-illustrated nonvolatile memory.

Other than setting the value of the flag f/B1/PK as described above, a temporary deterioration level LV/B1 is determined according to Table 3 in the same manner as the foregoing embodiments. From the temporary deterioration level LV/B1 and the flag f/B1/PK, the deterioration level of the catalytic converter 3 is determined according to Table 6, shown below, for example.

TABLE 6

| f/B1/PK | 0 | | 0 or 1 | 1 | 1 |
|---|---|---|---|---|---|
| LV/B1 | | 0 or 1 | 2 | 1 | 0 |
| Deterioration level | 0 | | 1 | 2 | 3 |

According to the above process, it is possible to determine the deteriorated state of the catalytic converter 3 as being classified in four levels, i.e., the deterioration levels 0–3, shown in FIG. 5, based on only the identified gain coefficient b1 hat.

The deteriorated state of the catalytic converter 3 may finally be determined based on a combination of the determined result according to the above process and the determined result described above based on the identified gain coefficient a1 hat or a2 hat.

In the above embodiment, the deteriorated state (degree of deterioration) of the catalytic converter 3 is determined as being classified in four levels. More threshold values may be used for comparison with the deterioration determining data A1/H, A1/M, A2/H, A2/M, B1/H, B1/M, the deteriorated state of the catalytic converter 3 can be determined as being classified in more deterioration levels.

In the above embodiments, the deteriorated state of the catalytic converter 3 is basically determined based on the magnitudes of the deterioration determining data A1/H, A1/M, A2/H, A2/M, B1/H, B1/M. However, it is also possible to determine the deteriorated state of the catalytic converter 3 based on the characteristics of changes of the deterioration determining data A1/H, A1/M, A2/H, A2/M, B1/H, B1/M. For example, the rate at which the deterioration determining data A1/H, A1/M increase as the deterioration of the catalytic converter 3 progresses, i.e., the gradient of a line tangential to the curve shown in FIG. 5(*a*), is gradually reduced. Therefore, each time the deterioration determining data A1/H, A1/M are newly determined, a change of the latest value from the preceding value is determined, and the determined change becomes smaller as the deterioration of the catalytic converter 3 progresses. Therefore, the deteriorated state of the catalytic converter 3 can be determined based on the change. Furthermore, since the deterioration determining data B1/H, B1/M have a maximum value, as described above, if the deteriorated state of the catalytic converter 3 may be determined as being classified into a state before both or one of the deterioration determining data A1/H, A1/M has a maximum value and a state after both or one of the deterioration determining data A1/H, A1/M has a maximum value, then the deteriorated state of the catalytic converter 3 can be determined based on the value of the flag f/B1H/PK, f/B1M/PK, or f/B1/PK.

In the above embodiments, the deterioration determining data A1/H, A1/M, A2/H, A2/M, B1/H, B1/M are determined by performing a filtering process on the data of the identified gain coefficients a1 hat, a2 hat, b1 hat to determine central values of their least squares. However, a filtering process may be effected on the identified gain coefficients a1 hat, a2 hat, b1 hat to determine their average value or weighted average value for use as the deterioration determining data.

In the above embodiments, the deterioration determining data A1/H, A1/M, A2/H, A2/M, B1/H, B1/M which are determined by performing a filtering process on the data of the identified gain coefficients a1 hat, a2 hat, b1 hat are used to determine the deteriorated state of the catalytic converter 3. However, if the accuracy of the determined deteriorated state of the catalytic converter 3 may not be so high, the data of the identified gain coefficients a1 hat, a2 hat, b1 hat may directly be used to determine the deteriorated state of the catalytic converter 3.

Specifically, in the above embodiments and modifications, the deterioration determining data A1/H, A1/M are replaced with the identified gain coefficient a1 hat obtained in the corresponding flow rate ranges, the deterioration determining data A2/H, A2/M are replaced with the identified gain coefficient a2 hat obtained in the corresponding flow rate ranges, and the deterioration determining data B1/H, B1/M are replaced with the identified gain coefficient b1 hat obtained in the corresponding flow rate ranges. As described in the above embodiments and modifications, the values of those identified gain coefficients a1 hat, a2 hat, b1 hat are compared with suitable threshold values to determine the deteriorated state (the deterioration level) of the catalytic converter 3.

In the above embodiments, the deterioration determining data are determined as being classified in the high and medium flow rate ranges. However, the deterioration determining data may be determined as being classified in more flow rate ranges. Alternatively, if the internal combustion engine 1 is operated such that the exhaust gas generated thereby flows in a limited flow rate range, then the deterioration determining data may be determined without being classified in flow rate ranges, and the deteriorated state of the catalytic converter 3 may be determined based on the determined deterioration determining data.

In the above embodiments, the model of the object exhaust system E (the exhaust system model) is expressed according to the equation (1). However, the exhaust system model may be expressed according to an equation in which the secondary autoregressive term (the term of VO2 (k−1) is be dispensed with, or more autoregressive terms including the term of VO2 (k−2), for example, are added.

In the above embodiments, the model of the object exhaust system E used to determine the deteriorated state of the catalytic converter 3 and the model of the object exhaust system E used to control the air-fuel ratio of the internal combustion engine 1, i.e., to calculate the target air-fuel ratio KCMD, are the same as each other, and the parameters (gain coefficients) a1, a2, b1 of the model are identified by the same identifier 25. However, different models of the object exhaust system E may be established to determine the deteriorated state of the catalytic converter 3 and control the air-fuel ratio of the internal combustion engine 1, and the parameters of those models may be identified by respective identifiers.

In the above embodiments, the deteriorated state of the catalytic converter 3 is determined while controlling the air-fuel ratio of the internal combustion engine 1 at an air-fuel ratio for achieving an optimum purifying capability of the catalytic converter 3. However, in determining the deteriorated state, the air-fuel ratio of the internal combustion engine 1 may not necessarily be required to be controlled as described above, but even while the internal combustion engine 1 is operating in another mode, it is possible to identify the parameters (gain coefficients) a1, a2, b1 of the exhaust system model and determine the deteriorated state of the catalytic converter 3 based on the identified values.

In the above embodiments, the adaptive sliding mode control process is employed to calculate the target air-fuel ratio KCMD. However, the ordinary sliding mode control process which does not use the adaptive control law may be employed to calculate the target air-fuel ratio KCMD.

Moreover, the effect of the total dead time d is compensated for by the estimator 26 in calculating the target air-fuel ratio KCMD. However, if the dead times of the object exhaust system E and the air-fuel ratio manipulating system are negligibly small, then the estimator 26 may be dispensed with. In this modification, the processing operation of the sliding mode controller 27 and the identifier 25 may be performed with d=d1=0.

In the above embodiments, the $O_2$ sensor 6 is used as the second exhaust gas sensor. However, for maintaining the desired purifying performance of the catalytic converter 3, any of various other sensors may be employed insofar as they can detect the concentration of a certain component of the exhaust gas downstream of the catalytic converter to be controlled. For example, a CO sensor is employed if the carbon monoxide (CO) in the exhaust gas downstream of the catalytic converter is controlled, an NOx sensor is employed if the nitrogen oxide (NOx) in the exhaust gas downstream of the catalytic converter is controlled, and an HC sensor is employed if the hydrocarbon (HC) in the exhaust gas downstream of the catalytic converter is controlled. If a three-way catalytic converter is employed, then it can be controlled to maximize its purifying performance irrespective of which of the above gas components is detected for its concentration. If a reducing catalytic converter or an oxidizing catalytic converter is employed, then its purifying performance can be increased by directly detecting a gas component to be purified.

For determining the deteriorated state of the catalytic converter 3, an exhaust gas sensor other than the LAF sensor 5 may be used as the second exhaust gas sensor, and may comprise a CO sensor, an NOx sensor, a HC sensor, or the like. The first and second exhaust gas sensors may be selected such that when the object exhaust system E is modeled and the parameters of the model are identified, the identified values and the deteriorated state of the catalytic converter 3 are correlated to each other relatively distinctly.

In the above embodiments, the differential output kact from the LAF sensor 5, the differential output VO2 from the $O_2$ sensor 6, and the target differential air-fuel ratio kcmd are employed in performing the processing operation of the identifier 25, the estimator 26, and the sliding mode controller 27. However, the output KACT of the LAF sensor 5, the output VO2/OUT of the $O_2$ sensor 6, and the target air-fuel ratio KCMD may directly be employed in performing the processing operation of the identifier 25, the estimator 26, and the sliding mode controller 27. The reference value FLAF/BASE relative to the differential output kact (=KACT−FLAF/BASE) may not necessarily be of a constant value, but may be established depending on the rotational speed NE and intake pressure PB of the internal combustion engine 1.

In the above embodiment, in order to reliably achieve the optimum purifying capability of the catalytic converter 3, the identifier 25, the estimator 26, and the sliding mode controller 27 are used to calculate the target air-fuel ratio KCMD, and the air-fuel ratio of the internal combustion engine 1 is feedback-controlled using the adaptive controller 18. However, if the purifying capability of the catalytic converter 3 is not required to be so strict, the target air-fuel ratio KCMD may be calculated and the air-fuel ratio of the internal combustion engine 1 may be feedback-controlled according to a general PID control process.

In the above embodiments, in the deterioration level 3 shown in FIG. 5, the deterioration indicator 29 indicates the deteriorated state as a prompt to replace the catalytic converter 3. However, the timing to cause the deterioration indicator 29 to indicate the deteriorated state may be determined depending on the type and capability of the catalytic converter 3 whose deteriorated state is to be determined. The deterioration indicator 29 may indicate different deteriorated states in the respective deterioration levels.

In the above embodiments, the deteriorated state of the catalytic converter 3 which is disposed in the exhaust pipe 2 of the internal combustion engine 1 is determined. However, if the deteriorated state of the catalytic converter 3 alone is to be determined, then an air-fuel mixture which is the same as the air-fuel mixture supplied to the internal combustion engine 1 may be combusted by a combustion device other than the internal combustion engine 1, and an exhaust gas produced by the combustion device may be supplied to the catalytic converter 3 for the determination of the deteriorated state of the catalytic converter

INDUSTRIAL APPLICABILITY

A method of determining a deteriorated state of a catalytic converter for purifying an exhaust gas according to the present invention is useful as a method of determining a deteriorated state of a catalytic converter for purifying an exhaust gas emitted from a combustion device such as an internal combustion engine, and is particularly suitable for determining a deteriorated state of a catalytic converter mounted on an automobile, a hybrid vehicle, or the like.

What is claimed is:

1. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor; and determining a deteriorated state of said catalytic converter based on data of the identified value of said parameter;

wherein said model comprises a model expressing said object exhaust system for generating the output of said second exhaust gas sensor from the output of said first exhaust gas sensor via at least one of a response delay element and a dead time element, and includes, as said parameter, at least one of a coefficient relative to the output of said first exhaust gas sensor and a coefficient relative to the output of said second exhaust gas sensor.

2. A method according to claim 1, wherein said step of determining the deteriorated state of said catalytic converter comprises the step of:

determining the deteriorated state of said catalytic converter based on at least one of the magnitude of the data of the identified value of said parameter and the characteristics of changes of the value of said data, said changes attending on the progress of the deterioration of said catalytic converter.

3. A method according to claim 1, further comprising the step of:

indicating the determined deteriorated state of said catalytic converter.

4. A method according to claim 1, wherein said first exhaust gas sensor comprises a sensor for producing an output representing the air-fuel ratio of said air-fuel mixture from which the exhaust gas entering said catalytic converter is produced, and said second exhaust gas sensor comprises a sensor for producing an output representing the content of a particular component of the exhaust gas that has passed through said catalytic converter.

5. A method according to claim 1, wherein said catalytic converter comprises a catalytic converter disposed in the exhaust passage of an internal combustion engine which combusts said air-fuel mixture therein.

6. A method according to claim 5, further comprising the step of:
controlling the air-fuel ratio of said internal combustion engine in order to converge the output of said second exhaust gas sensor to a predetermined target value when the exhaust gas is supplied to said exhaust passage upon operation of said internal combustion engine;
wherein said value of the parameter is identified and said deteriorated state of said catalytic converter is evaluated concurrent with said step of controlling the air-fuel ratio of said internal combustion engine.

7. A method according to claim 6, wherein said step of controlling the air-fuel ratio of said internal combustion engine comprises the steps of:
calculating a target air-fuel ratio of said internal combustion engine in order to converge the output of said second exhaust gas sensor to said target value; and
controlling the air-fuel ratio of said internal combustion engine according to a feedback control process in order to converge the air-fuel ratio represented by the output of said first exhaust gas sensor to said target air-fuel ratio.

8. A method according to claim 7, wherein said target air-fuel ratio is calculated by a sliding mode controller.

9. A method according to claim 7 or 8, wherein said target air-fuel ratio is calculated by an algorithm determined in advance using the data of the identified value of said parameter.

10. A method according to claim 7, wherein the air-fuel ratio of said internal combustion engine is controlled according to the feedback control process by a recursive-type controller.

11. A method according to claim 1, wherein said catalytic converter comprises a catalytic converter disposed in the exhaust passage of an internal combustion engine which combusts said air-fuel mixture therein.

12. A method according to claim 11, wherein said step of determining the deteriorated state of said catalytic converter comprises the steps of:
determining whether the identified value of said parameter is appropriate for determining the deteriorated state of said catalytic converter or not based on at least one of the data of the output of said first exhaust gas sensor, the data of the output of said second exhaust gas sensor, and an intake quantity of said internal combustion engine; and
determining the deteriorated state of said catalytic converter based on the identified value of said parameter which is determined as being appropriate.

13. A method according to claim 12, wherein said step of determining whether the identified value of said parameter is appropriate for determining the deteriorated state of said catalytic converter or not comprises the step of:
determining whether the identified value of said parameter is appropriate for determining the deteriorated state of said catalytic converter or not, based on whether at least one of the output of said first exhaust sensor, the output of said second exhaust sensor, and the intake quantity of said internal combustion engine is maintained at a substantially constant level when the data of the outputs of said first and second exhaust gas sensors used to determine the identified value of said parameter are detected.

14. A method according to claim 11, wherein said internal combustion engine comprises an internal combustion engine mounted as a propulsive source on a motor vehicle, and wherein said step of determining the deteriorated state of said catalytic converter comprises the steps of:
determining whether the identified value of said parameter is appropriate for determining the deteriorated state of said catalytic converter or not based on at least one of the data of the output of said first exhaust gas sensor, the data of the output of said second exhaust gas sensor, an intake quantity of said internal combustion engine, and a vehicle speed of said motor vehicle; and
determining the deteriorated state of said catalytic converter based on the identified value of said parameter which is determined as being appropriate.

15. A method according to claim 14, wherein said step of determining whether the identified value of said parameter is appropriate for determining the deteriorated state of said catalytic converter or not comprises the step of:
determining whether the identified value of said parameter is appropriate for determining the deteriorated state of said catalytic converter or not, based on whether at least one of the output of said first exhaust sensor, the output of said second exhaust sensor, the intake quantity of said internal combustion engine, and the vehicle speed of said vehicle is maintained at a substantially constant level when the data of the outputs of said first and second exhaust gas sensors used to determine the identified value of said parameter are detected.

16. A method according to claim 1, wherein said model comprises a model expressing said object exhaust system as a discrete-time system for generating the output of said second exhaust gas sensor from the output of said first exhaust gas sensor via at least one of a response delay element and a dead time element, and includes, as said parameter, at least one of a coefficient relative to the output of said first exhaust gas sensor and a coefficient relative to the output of said second exhaust gas sensor.

17. A method according to claim 16, wherein said step of identifying the value of said parameter comprises the steps of:
identifying the value of said parameter according to an algorithm for sequentially updating and identifying the value of said parameter in order to minimize an error between the output of said second exhaust gas sensor in said model and an actual output of said second exhaust gas sensor; and
filtering the output of said second exhaust gas sensor in said model and the actual output of said second exhaust gas sensor with the same frequency passing characteristics in calculating said error.

18. A method according to claim 16, wherein said step of identifying the value of said parameter comprises the step of:
limiting the identified value of said parameter.

19. A method according to claim 16, wherein said step of identifying the value of said parameter comprises the step of:
calculating the identified value of said parameter based on the difference between an actual output of said first exhaust gas sensor and a predetermined reference value and the difference between an actual output of said second exhaust gas sensor and a predetermined reference value, which differences are used as the data of the outputs of said first and second exhaust gas sensors.

20. A method according to claim 16, wherein said parameter includes the coefficient relative to the output of said first exhaust gas sensor, and said step of determining the deteriorated state of said catalytic converter comprises the step of:

determining the deteriorated state of said catalytic converter based on the data of the identified value of the coefficient relative to the output of said first exhaust gas sensor or the magnitude of the value of data generated by effecting a predetermined filtering process on the data of the identified value, and information on an extremal value which occurs in the value of said data as the deterioration of said catalytic converter progresses.

21. A method according to claim 16, wherein said parameter includes the coefficient relative to the output of said second exhaust gas sensor, and said step of determining the deteriorated state of said catalytic converter comprises the step of:

determining the deteriorated state of said catalytic converter based on the data of the identified value of the coefficient relative to the output of said second exhaust gas sensor or the magnitude of the value of data generated by effecting a predetermined filtering process on the data of the identified value.

22. A method according to claim 16, wherein said step of identifying the value of said parameter comprises the step of:

identifying the value of said parameter depending on a particular behavior of said object exhaust system.

23. A method according to claim wherein said step of sequentially identifying the value of said parameter comprises the step of:

recognizing the particular behavior of said object exhaust system based on the value of a function that is determined by a predetermined number of time-series data prior to the present of the output of said second exhaust gas sensor.

24. A method according to claim 1, wherein said step of determining the deteriorated state of said catalytic converter comprises the steps of:

determining whether the identified value of said parameter is appropriate for determining the deteriorated state of said catalytic converter or not based on at least one of the data of the output of said first exhaust gas sensor and the data of the output of said second exhaust gas sensor; and determining the deteriorated state of said catalytic converter based on the identified value of said parameter which is determined as being appropriate.

25. A method according to claim 24, wherein said step of determining whether the identified value of said parameter is appropriate for determining the deteriorated state of said catalytic converter or not comprises the step of:

determining whether the identified value of said parameter is appropriate for determining the deteriorated state of said catalytic converter or not, based on whether at least one of the output of said first exhaust sensor and the output of said second exhaust sensor is maintained at a substantially constant level when the data of the outputs of said first and second exhaust gas sensors used to determine the identified value of said parameter are detected.

26. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor; and determining a deteriorated state of said catalytic converter based on data of the identified value of said parameter, wherein said step of determining the deteriorated state of said catalytic converter comprises the step of:

using data generated by effecting a predetermined filtering process on the data of the identified value of said parameter as data for determining the deteriorated state of said catalytic converter, wherein the filtering process comprises a process of determining a central value of the least square of the data of the identified value of said parameter.

27. A method according to claim 26, further comprising the step of:

classifying and recognizing the flow rate of the exhaust gas supplied to said exhaust passage when the value of said parameter is identified, according to a plurality of regions, wherein said step of determining the deteriorated state of said catalytic converter comprises the steps of:

effecting said filtering process on the data of the identified value of said parameter in each of said regions to generate said data for determining the deteriorated state of said catalytic converter; and determining the deteriorated state of said catalytic converter using the data, which is generated in at least one of said regions, for determining the deteriorated state of said catalytic converter.

28. A method according to claim 26, wherein said step of determining the deteriorated state of said catalytic converter comprises the step of:

determining the deteriorated state of said catalytic converter based on at least one of the magnitude of the data for determining the deteriorated state of said catalytic converter and the characteristics of changes of the value of the data for determining the deteriorated state of said catalytic converter, said changes attending on the progress of the deterioration of said catalytic converter.

29. A method according to claim 1 or 26, wherein said step of determining the deteriorated state of said catalytic converter comprises the step of:

classifying and determining the deteriorated state of said catalytic converter in a plurality of degrees of deterioration.

30. A method according to claim 1 or 26, wherein said model has a plurality of parameters to be identified, and said step of determining the deteriorated state of said catalytic converter comprises the step of:

determining the deteriorated state of said catalytic converter based on data of identified values of said parameters.

31. A method according to claim 30, wherein said step of determining the deteriorated state of said catalytic converter comprises the steps of:

temporarily determining deteriorated states of said catalytic converter based on the respective data of the identified values of said parameters; and thereafter determining the deteriorated state of said catalytic converter based on a combination of the temporarily determined deteriorated states.

32. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor, wherein the step of identifying the value of said parameter comprises limiting the identified value of said parameter; and determining a deteriorated state of said catalytic converter based on data of the identified value of said parameter.

33. A method of evaluating a deteriorated state of a catalytic converter for purifying an exhaust gas produced when an air-fuel mixture is combusted, comprising the steps of:

supplying the exhaust gas downstream to an exhaust passage which has a first exhaust gas sensor and a second exhaust gas sensor that are disposed respectively upstream and downstream of the catalytic converter, for generating respective outputs depending on components of the exhaust gas;

detecting data of the outputs of said first exhaust gas sensor and said second exhaust gas sensor when the exhaust gas is supplied to said exhaust passage;

identifying the value of at least one parameter to be set of a model that is constructed as representing a behavior of an object exhaust system which ranges from said first exhaust gas sensor to said second exhaust gas sensor and includes said catalytic converter in said exhaust passage, based on the detected data of the outputs of said first exhaust gas sensor and said second exhaust gas sensor, wherein said step of identifying the value of said parameter comprises the step of:

calculating the identified value of said parameter based on the difference between an actual output of said first exhaust gas sensor and a predetermined reference value and the difference between an actual output of said second exhaust gas sensor and a predetermined reference value, which differences are used as the data of the outputs of said first and second exhaust gas sensors; and determining a deteriorated state of said catalytic converter based on data of the identified value of said parameter.

* * * * *

UNITED STATES PATENT AND TRADEMARK OFFICE
CERTIFICATE OF CORRECTION

| | |
|---|---|
| PATENT NO. | : 6,449,944 B1 |
| APPLICATION NO. | : 09/743906 |
| DATED | : September 17, 2002 |
| INVENTOR(S) | : Yuji Yasui et al. |

It is certified that error appears in the above-identified patent and that said Letters Patent is hereby corrected as shown below:

<u>IN THE DESCRIPTION</u> -

Column 69, line 37, delete "claim 1," and substitute therefor -- claim 4, --.

Column 71, line 28, after "claim" insert -- 22, --

Signed and Sealed this

Nineteenth Day of December, 2006

JON W. DUDAS
*Director of the United States Patent and Trademark Office*